(12) United States Patent
Akali et al.

(10) Patent No.: US 12,556,586 B2
(45) Date of Patent: *Feb. 17, 2026

(54) ADAPTIVE NETWORK SECURITY USING ZERO TRUST MICROSEGMENTATION

(71) Applicant: ColorTokens Inc., San Jose, CA (US)

(72) Inventors: Harish Akali, Acton, MA (US); Satyam Tyagi, Fremont, CA (US); Wyn Owen, San Jose, CA (US); Surya Kollimarla, Santa Clara, CA (US); Rajesh Khazanchi, Cupertino, CA (US)

(73) Assignee: ColorTokens Inc., San Jose, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 18/620,699

(22) Filed: Mar. 28, 2024

(65) Prior Publication Data

US 2024/0356979 A1  Oct. 24, 2024

Related U.S. Application Data

(63) Continuation of application No. 18/343,402, filed on Jun. 28, 2023.

(60) Provisional application No. 63/461,476, filed on Apr. 24, 2023.

(51) Int. Cl.
*H04L 29/00* (2006.01)
*H04L 9/40* (2022.01)

(52) U.S. Cl.
CPC .......... *H04L 63/20* (2013.01); *H04L 63/0263* (2013.01); *H04L 63/1425* (2013.01)

(58) Field of Classification Search
CPC .. H04L 63/20; H04L 63/0263; H04L 63/1425
See application file for complete search history.

(56) References Cited

U.S. PATENT DOCUMENTS

| | | | |
|---|---|---|---|
| 11,405,399 B2 | 8/2022 | Bhattacharya et al. | |
| 11,916,957 B1 * | 2/2024 | Cheh | H04L 63/1466 |
| 2006/0179472 A1 | 8/2006 | Chang et al. | |

(Continued)

OTHER PUBLICATIONS

Kim, Hyojoon, and Nick Feamster. "Improving network management with software defined networking." IEEE Communications Magazine 51.2 (2013): 114-119. (Year: 2013).

*Primary Examiner* — Jeffrey C Pwu
*Assistant Examiner* — Helai Salehi
(74) *Attorney, Agent, or Firm* — Banner & Witcoff, Ltd.

(57) ABSTRACT

Zero trust and micro-segmentation techniques may be collectively used to enhance network security. To establish, refine, and enforce a zero-trust least-privileged policy, the network may be segmented to put each device of the network into a respective network of one, which forces all network traffic to pass through a zero-trust gatekeeper. The gatekeeper may then monitor and analyze the traffic to establish, refine, and enforce the zero-trust least-privileged policy, which reduces network access to only a limited set of network actions and/or paths. Using the gatekeeper, network traffic may be monitored to progressively establish the policy as well as to continually refine the policy. Recommended actions may be determined based on the analysis of the monitored network traffic and provided to the user to allow user feedback on the communication rules of zero-trust policy.

20 Claims, 91 Drawing Sheets

(56) References Cited

U.S. PATENT DOCUMENTS

| | | | |
|---|---|---|---|
| 2013/0167219 A1* | 6/2013 | Jung | H04L 63/1458 |
| | | | 726/13 |
| 2014/0317683 A1 | 10/2014 | Mcbride et al. | |
| 2017/0078168 A1* | 3/2017 | Harris, Jr. | H04L 41/40 |
| 2018/0176182 A1 | 6/2018 | Raney et al. | |
| 2018/0176189 A1 | 6/2018 | Paul et al. | |
| 2018/0293389 A1 | 10/2018 | Mahaffey et al. | |
| 2020/0169584 A1 | 5/2020 | Penner et al. | |
| 2021/0314250 A1* | 10/2021 | Laplante | H04L 63/10 |
| 2022/0038490 A1 | 2/2022 | Thakur et al. | |
| 2022/0103598 A1* | 3/2022 | Vaidya | H04L 63/0218 |
| 2022/0337631 A1* | 10/2022 | Bhattacharya | H04L 63/0245 |
| 2023/0394146 A1 | 12/2023 | Dubin | |
| 2023/0403304 A1 | 12/2023 | Balmakhtar et al. | |
| 2024/0080323 A1* | 3/2024 | Balmakhtar | H04L 41/16 |
| 2024/0179158 A1 | 5/2024 | Kommula et al. | |

\* cited by examiner

ADAPTIVE NETWORK SECURITY USING ZERO TRUST MICROSEGMENTATION

CROSS REFERENCE TO RELATED APPLICATIONS

This patent application is a continuation patent application of U.S. patent application Ser. No. 18/343,402, filed Jun. 28, 2023, which claims priority to, and the benefit of, U.S. Provisional Patent Application No. 63/461,476, filed Apr. 24, 2023, each of which is incorporated herein by reference in its entirety.

BACKGROUND

Field

Aspects described herein generally relate to network security. More particularly, aspects described herein relate to zero trust network security techniques and network security implementations leveraging zero trust microsegmentation.

Related Art

Network security techniques are essential to protect computer networks and their data from a wide range of security threats. Traditionally, such approaches include access control techniques that involve restricting access to network resources by users or devices using firewalls, and network infrastructure devices. These approaches generally focus on controlling access to a local area network (LAN) from external entities, such as entities attempting to access LAN resources via the internet, or use Access Control Lists (ACLs) to control access from one Virtual LANs (VLANs) to another VLAN. These approaches do not address potential security concerns for internal traffic within the LAN amongst internal devices that are behind the firewall. That is, although coarse-grained network segmentation can be accomplished using firewalls and/or VLANs and ACLs, these approaches do not provide network communication visibility or control including inter-device communications within a LAN/VLAN.

Zero-trust techniques assume that all resources on the network, both inside and outside the network perimeter, are potentially malicious/compromised and cannot be trusted. Instead of relying on traditional network security models that assume that resources inside the network perimeter are inherently trustworthy. Zero-trust techniques require authentication and grant only limited authorization for all resources for the function they are intended for, regardless of whether they are located inside or outside the network. In other words, the default policy is to deny network traffic, and only when the identity and intent are established, limited access is granted for that purpose. However, zero trust and microsegmentation are difficult to implement and maintain, due to the laborious administration of access policies across all the devices connected to the network.

SUMMARY

To overcome limitations in the prior art described above, and to overcome other limitations that will be apparent upon reading and understanding the present disclosure, aspects described herein are directed to addressing security concerns on internal and/or external traffic using novel technology to implement zero trust and micro-segmentation techniques. Aspects of the disclosure include agentless zero-trust techniques, atomic segmentation techniques, progressive zero-trust techniques, and continuous zero-trust techniques, which are described in more detail below. Aspects of the various techniques may be combined and implemented together to realize one or more aspects of the disclosure.

Zero-trust and micro-segmentation techniques according to aspects of the disclosure aim to provide this visibility and control of inter-device communication regardless of whether the devices are within a LAN/VLAN or not. Traditionally, segmentation has been extremely difficult to implement and maintain as it puts an extensive burden on the network security and infrastructure teams, and slows down necessary changes and improvements desired by the business.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 1:
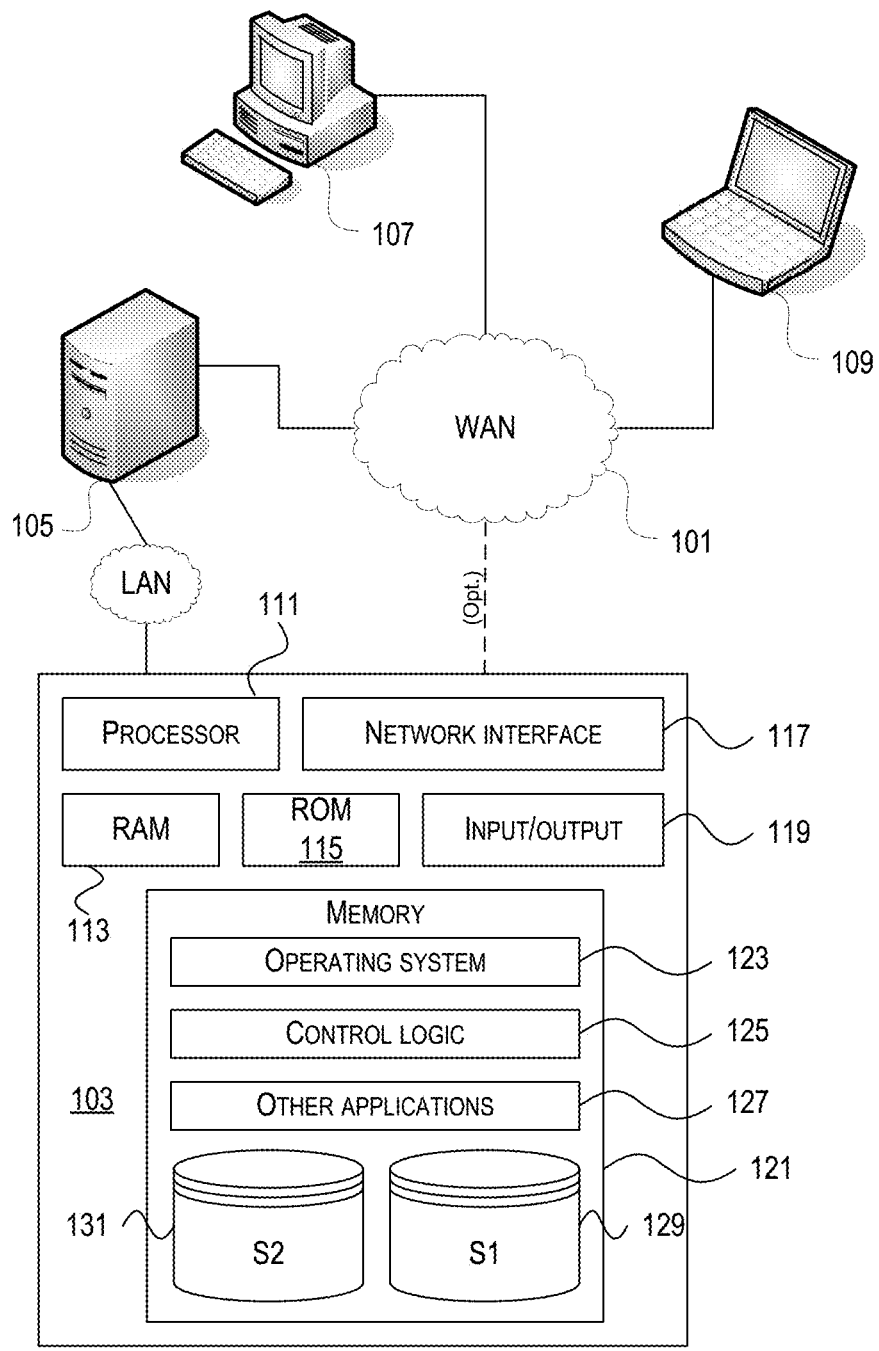
FIG. 1 shows an example computing environment in which one or more aspects described herein may be implemented.

The illustrative embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure. The connections shown in the figures between functional units or other elements can also be implemented as indirect connections, wherein a connection can be wireless or wired. Functional units can be implemented as hardware, software or a combination of hardware and software.

To overcome limitations in the prior art described above, and to overcome other limitations that will be apparent upon reading and understanding the present disclosure, aspects described herein are directed to addressing security concerns on internal and/or external traffic using novel technology to implement zero trust and micro-segmentation techniques. Aspects of the disclosure include agentless zero-trust techniques, atomic segmentation techniques, progressive zero-trust techniques, and continuous zero-trust techniques, which are described in more detail below. Aspects of the various techniques may be combined and implemented together to realize one or more aspects of the disclosure.

Agentless Zero Trust

An agentless zero-trust least-privilege network security model according to an aspect of the disclosure is a network security approach that limits network access to only what is required for users and devices to perform their tasks. This approach may include breaking down (e.g., segmenting, grouping) the network into smaller segments or groups (e.g. microsegments) and closely controlling access to each of the microsegments. Each of the microsegments may include one or more devices. In one or more aspects, the device(s) within a particular microsegment are under the same zero-trust least-privilege network security policy (where the devices within the microsegment/group may be in the same or different network). In aspects where two more devices are included in a microsegment, the two or more devices may be within the same local network, or may be in different networks. For example, the microsegment may include two devices that are within a same LAN (e.g., on the same Wi-Fi network), or may include one device in a first network that accesses a second network via the internet, where the second network includes a second device of the microsegment. That is, the microsegments may be defined independently of network infrastructure.

One or more users (e.g., network or system administrator) may monitor network traffic to identify approved connections and create policies configured to only allow the approved connections, thus increasing network security and protecting against cyber threats. Improving on conventional approaches, the agentless zero-trust techniques according to one or more aspects does not require agents to be deployed and installed on all secured assets. This advantageously reduces the complexity and costs compared to conventional approaches that utilize deployed agents. Further, because of regulations and/or technical constraints, agents may not be deployable on particular devices, which limits the use of conventional approaches that require deployed agents. Moreover, although coarse-grained network access can be accomplished using firewalls or VLANs, such methods do not provide network communication visibility or protection within network segments.

The model according to one or more aspects eliminates the need for agents to be deployed to secured assets and employs a gateway appliance (e.g., gatekeeper) that is configured to observe all network traffic and implement zero-trust policies. In this example, the gateway appliance may be logically positioned as a gateway for all network communication by isolating networks for each device using subnets of size one (e.g., creating an atomic network for each device). All network communication is routed through the gateway appliance, enabling observation of all traffic between devices of the LAN (e.g., east-west network traffic, where north-south traffic traverses the firewall). Using the gateway appliance, users may establish Zero Trust policies that specify the allowed communication paths and prevent unauthorized access. The gateway appliance may enforce the Zero Trust least privilege policy by only allowing explicitly authorized paths and blocking all other traffic. This method provides numerous advantages over the conventional Zero Trust approach, such as reducing complexity and management overhead, providing network communication visibility and security within network segments, and allowing fine-grained access controls without using agents.

Atomic Segmentation

In one or more aspects, the segmentation of devices may include establishing more granular segments, which may include segments of a singular device (i.e., atomic). Conventional segmentation approaches are more liberal and fall short of providing true least privilege security as access policies are defined between larger-sized segments, allowing many-to-many access that is not always necessary. Atomic Segmentation offers a more effective approach by creating and recommending policies at a granular level, ensuring true least privilege access between individual assets or smaller groups. This approach optimizes Zero Trust security and eliminates the convenience-based groupings of conventional approaches. In one or more aspects, automated tagging and/or templates may be used to standardize deployment automation and provide a streamlined solution for implementing least privilege security at scale.

Progressive Zero Trust

Conventional Zero Trust approaches require a detailed understanding of an enterprise's assets, subjects, and business processes to enforce policies effectively. Without this knowledge, legitimate requests may be denied due to insufficient information, resulting in business process and application failures. In particular, such an approach requires users to identify and define all allowable communication before Zero Trust can be enforced.

In one or more aspects, a progressive Zero Trust approach uses a progressive implementation that breaks down the Zero Trust process into smaller steps, allowing for incremental improvements in security that yield visible results in a shorter period. The progressive enforcement may include enforcement on one or more dimensions, where the different dimensions may have different degrees of restrictiveness. The dimensions may include, but are not limited to: internet/intranet (e.g., allow only limited internet while you evaluate intranet, etc.); inbound/outbound (e.g., allow only outbound or inbound while evaluating the other); ports; paths; users; groups; intra-groups; inter-segment/intra-segment traffic; application-specific traffic; etc.

In one or more aspects, the progressive zero trust technique may include gradually enhancing zero-trust enforcement for different access levels to the same asset. For example, making internet access more granular while keeping intranet access exposed, or allowing broader access to certain low-risk ports while making access to more sensitive ports more granular. This approach enhances zero-trust security by prioritizing access control measures and continuously improving them over time, rather than requiring immediate, comprehensive enforcement. For example, network communications may initially be openly allowed over intranet but only a limited set of ports and/or paths to specific groups and/or users will be allowed over Internet. The intranet allowed communications may then be restricted to a limited set allowed ports, and then even amongst these allowed ports, some sensitive ports maybe further restricted to only certain allowed paths.

Continuous Zero Trust

Conventional zero-trust security approaches involve building policies based on observed accesses and communications and enforcing those policies. However, this approach is not foolproof, as new accesses are required, policies are added, and more communication doors are opened without checking if previously opened communication paths are still needed. This could lead to potential security gaps that can be exploited by attackers, and over time, the security of the network becomes weaker and weaker as more and more access is granted. To address this challenge, one or more aspects include a continuous zero-trust optimization that includes continually monitoring and refining communication rules to ensure that only authorized and necessary communication is permitted. The optimization process may include reviewing (e.g., periodically) previously allowed communication rules, identifying and removing unused, obsolete, outdated, and/or no longer necessary rules, and refining communication rules consistent with zero-trust security principles.

In one or more aspects, the analyzed rules can be provided to the user to elicit feedback from the user on whether one or more actions should be taken to refine the communication rules. In providing the analysis to the user, one or more suggested/recommended actions may be proposed to the user and/or one or more suggested investigations into one or more particular rules can be proposed to the user. Based on the suggestion(s), the user may more closely review communication rule(s) and make any necessary modifications to the rule(s) to enhance the overall policy.

By employing Continuous Zero Trust Optimization, enterprises can enhance their security posture and ensure that their Zero Trust security measures remain effective and up to date, even as newer versions of applications may result in changes in network policies. This ongoing process of optimization enhances security by closing unnecessary holes and prioritizing access control measures. The result is a more robust and effective security approach that constantly looks to close open security doors and allows only what is essential for applications to function. This ongoing refinement of communication rules helps to reduce the attack surface and/or blast radius, and improve an organization's overall security posture while maintaining the least privilege access control principle.

Each of the above are discussed in more detail below.

By way of introduction, a system of one or more computers may be configured to perform particular operations or actions by virtue of having software, firmware, hardware, or a combination of them installed on the system that in operation causes or cause the system to perform the actions. One or more computer programs may be configured to perform particular operations or actions by virtue of including instructions that, when executed by data processing apparatus, cause the apparatus to perform the actions. As such, corresponding apparatus, systems, and computer-readable media are also within the scope of the disclosure.

Aspects discussed herein may relate to zero trust and micro-segmentation techniques. The network infrastructure may include a zero-trust gatekeeper that is configured to segment each device into an individualized subnet, which creates a unique "group of one" or "network of one," which allows all network traffic to be routed through the gatekeeper. The zero-trust gatekeeper may be configured to determine highly personalized zero trust security recommendation to the individualized devices.

The zero-trust gatekeeper may utilize a zero trust least privilege model that may reduce network access to only a limited set of network actions and/or paths. For example, the model may limit the network access for a respective device to only what is required for the device and/or user of the device to perform their respective tasks. In one or more aspects, the network may be broken down (e.g., segmented) into smaller segments or groups referred to as microsegments, and the access to each of these microsegments may be closely controlled. Each of the microsegments may include one or more devices. In one or more aspects, the device(s) within a particular microsegment are under the same zero-trust least-privilege network security policy (where the devices within the microsegment may be in the same or different network).

The user may monitor network traffic (e.g., using the gatekeeper as all traffic is routed through the gatekeeper) to identify approved connections and create policies that only allow those connections, thereby increasing network security and protecting against network and security threats while allowing for fine-grained access controls.

Before discussing the concepts of the disclosure in greater detail, several examples of a computing device that may be used in implementing and/or otherwise providing various aspects of the disclosure will first be discussed with respect to FIG. 1.

FIG. 1 illustrates one example of a network architecture and data processing devices that may be used to implement one or more illustrative aspects described herein. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), cloud-computing networks, and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability.

The components may include data server 103, second server 105 (e.g., a web server), and client computers 107, 109. Data server 103 provides overall access, control and administration of databases and control software for performing one or more illustrative aspects described herein. Data server 103 may be connected to second server 105 through which users interact with and obtain data as requested. Alternatively, data server 103 may act or include the functionality of the second server itself and be directly connected to the Internet. Data server 103 may be connected to second server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access second server 105 using an Internet browser, as is known in the art, or by executing a software application that communicates with second server 105 and/or data server 103 over a computer network (such as the Internet). The computing device 103 and/or 105, and/or the other network nodes 107 and/or 109, may host one or more databases. Databases may include, but are not limited to relational databases, non-relational databases, hierarchical databases, distributed databases, in-memory databases, flat file databases, XML databases, NoSQL databases, graph databases, and/or a combination thereof.

In one or more aspects, the environment illustrated in FIG. 1 may be, or form part of, a cloud-computing environment including one or more cloud computing networks. For example, data server 103 and/or second server 105 may be, or include, one or more cloud servers. Cloud servers may be a physical computing device that is configured to provide specific services or functionality to clients over a network, and/or may be (or include) one or more virtualized servers that are hosted and delivered through a cloud computing platform. The virtualized servers may run on one or more virtual machines (VMs) that are hosted on a physical server.

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, mobile device, or data processing device, e.g., laptops, desktops, tablets, smartphones, servers, micro-PCs, etc. Data server 103, e.g., may include a processor 111 controlling overall operation of the data server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with other aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first storage (S1) 129 and a second storage (S2) 131. The first storage 129 and/or second storage 131 may be a database in one or more aspects. In one or more aspects, the first storage 129 may include the second storage 131 (e.g., as a separate table, report, etc.). That is, the information can be stored in a single storage, or separated into different logical, virtual, or physical storages, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects described herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

Figure 2:
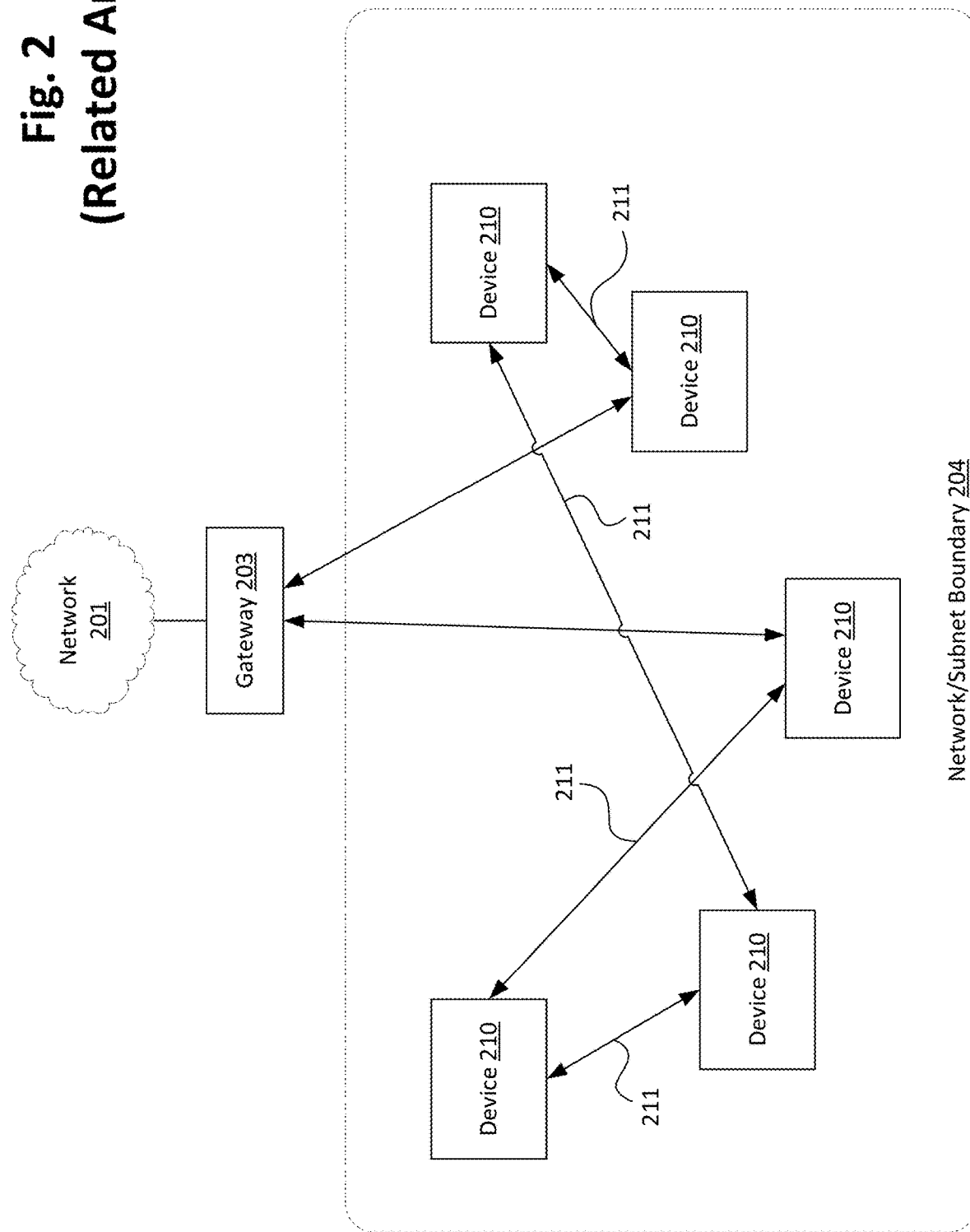
FIG. 2 illustrates an example network environment.

FIG. 2 illustrates an example network environment. The environment may include network 201 that includes one or more external networks (e.g. the Internet). Communications from the network 201 may access an internal network 204 via gateway 203. The network 204 may include one or more devices 210, where multiple devices 210 within the network may be configured to communicate with each other directly (e.g. via communication paths 211). Additionally, or alternatively, the device(s) 210 may be configured to communicate with one or more external devices in network 201 via gateway 203. The gateway 203 may include one or more network components, such as routers, switches, firewalls, intrusion detection and prevention systems, and/or other network components. The gateway 203 may control access to the network 204 from external entities. In this configuration, the network 201 may be a WAN while the network 204 is a LAN. In the environment illustrated in FIG. 2, communications 211 between devices 210 within the network 204 are not visible to gateway 203 and the gateway 203 has no way to control them.

Figure 3:
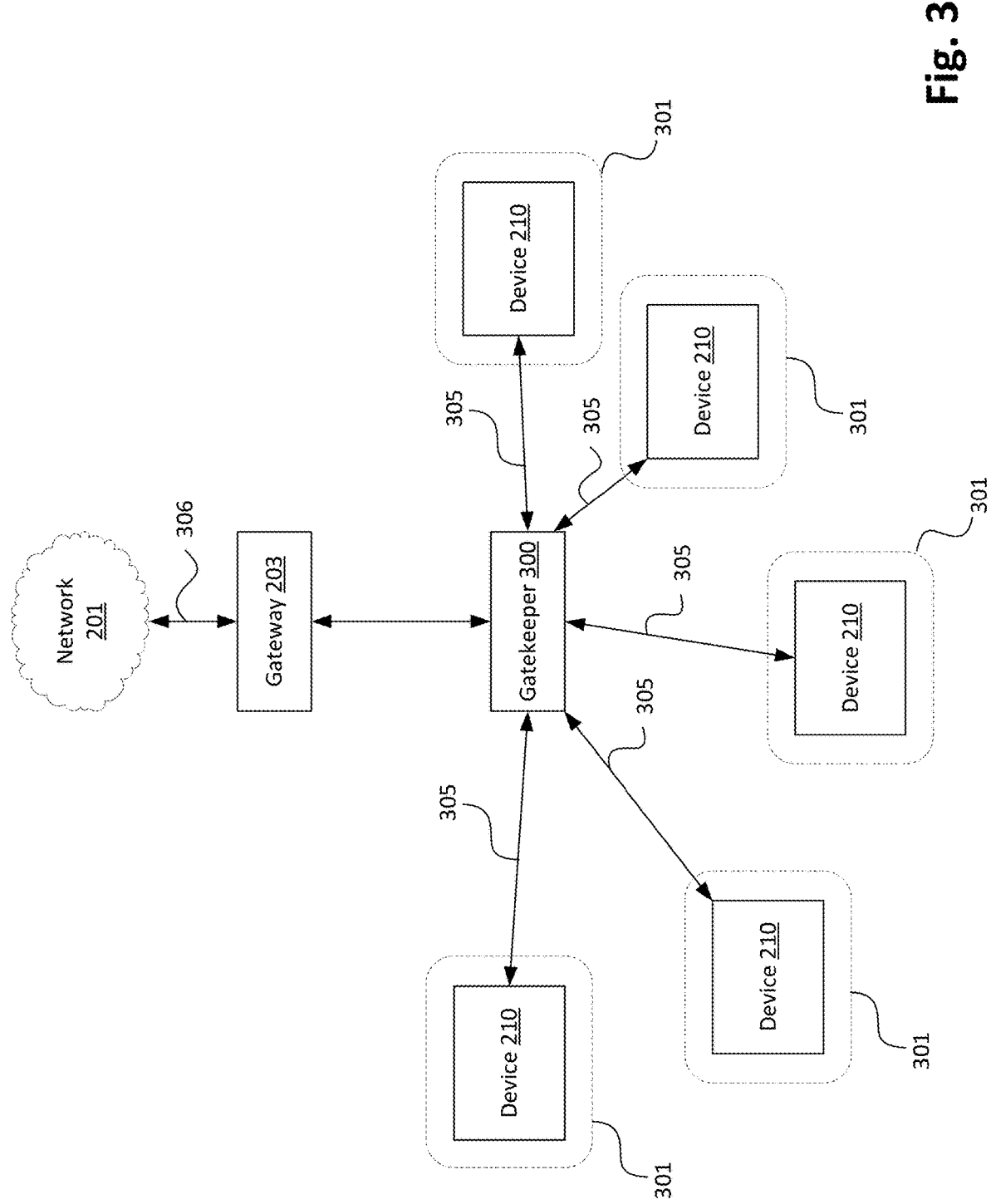
FIG. 3 illustrates an example network environment including a gatekeeper according to one or more aspects of the disclosure.
Figure 6:
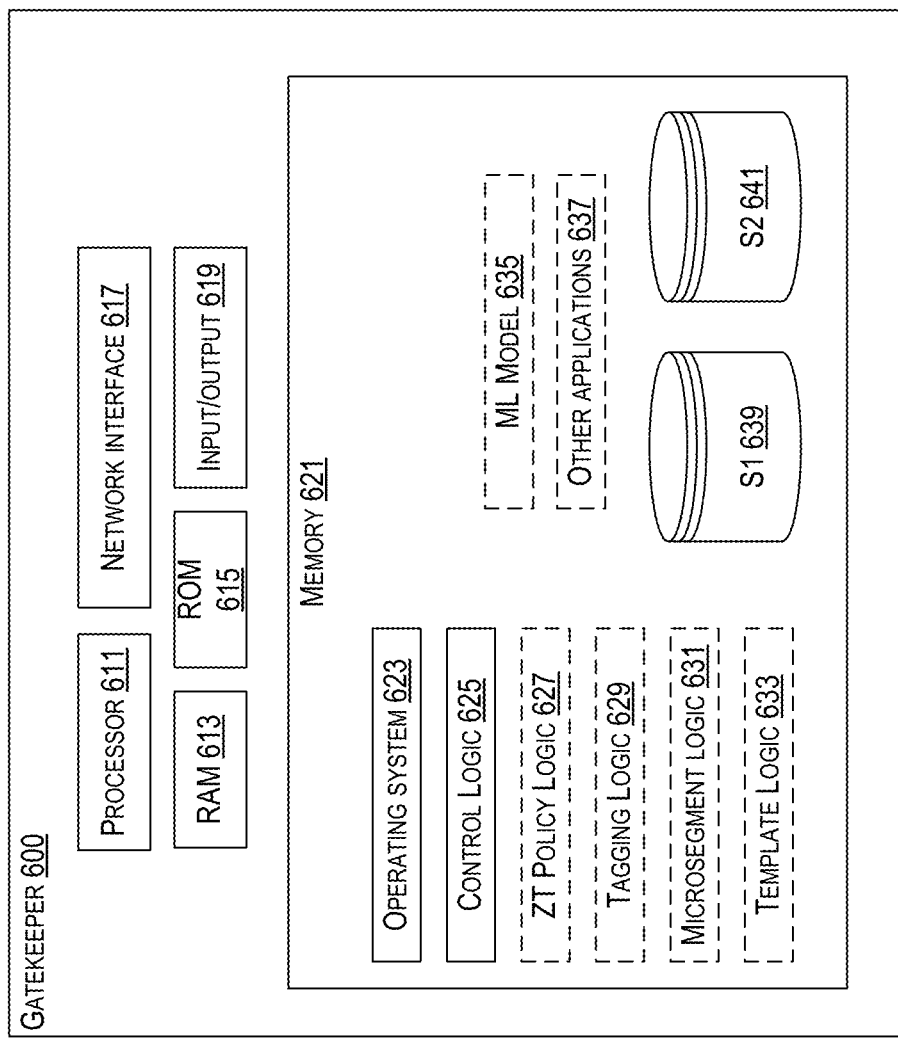
FIG. 6 illustrates an example gatekeeper according to one or more aspects of the disclosure.

FIG. 3 illustrates an example network environment including a zero-trust gatekeeper 300 according to one or more aspects of the disclosure. The zero-trust gatekeeper 300 may use one or more zero trust micro-segmentation techniques that may assume that all devices, both inside and outside the network perimeter, are potentially malicious and cannot be trusted. In one or more aspects, the zero-trust gatekeeper 300 may be implemented by device 103, but is not limited thereto. As described in more detail below, FIG. 6 illustrates a gatekeeper 600 according to one or more aspects. The gatekeeper 300 may be implemented by gatekeeper 600 in one or more aspects.

The zero-trust gatekeeper 300 may be deployed in the network environment to facilitate zero-trust least-privilege network techniques according to the disclosure. The gatekeeper 300 may be configured to implement one or more zero-trust least-privilege network security models security model that limits network access to only what is required for users and devices 210 to perform their tasks.

In this configuration, the gatekeeper 300 configures the network environment such that all network traffic within the environment traverses the zero-trust gatekeeper 300 to ensure that the zero-trust gatekeeper 300 sees all of the network traffic from the devices 210 and/or gateway 203. To facilitate the monitoring and gatekeeping functions of the gatekeeper 300, the gatekeeper 300 may isolate each of the devices 210 into an individualized subnet 301, which creates a unique "group of one" or "network of one." An individualized subnet 301 may also be referred to as a "discrete network," "singular network," "solitary network," an "atomic network," and/or an "atomic LAN." In one or more aspects, the zero-trust gatekeeper 300 may be configured to use subnetting to ensure that the network traffic traverses the zero-trust gatekeeper 300. The subnetting may segment each device 210 into an individualized subnet 301 using a "/32 subnet" or a "255.255.255.255" subnet mask. Additionally, or alternatively, the gatekeeper 300 may use software-defined firewalled networks, physical firewalls, and/or individual VLANs for the respective devices 210. The disclosure is not limited to these techniques and aspects of the disclosure are applicable to other networking techniques and structures that provide that the network traffic traverses the gatekeeper 300 so that the gatekeeper 300 may monitor the network traffic.

The subnets within the network environment may be created using the Dynamic Host Configuration Protocol (DHCP) by a DHCP server. In this example, the zero-trust gatekeeper 300 may be positioned within the network between the DHCP server and the devices acting as a DHCP relay. Alternatively, in one or more aspects, the zero-trust gatekeeper 300 may be configured as a DHCP server and configured to establish the subnets 301.

In one or more aspects, as discussed above, the DHCP may be used to completely isolate devices by assigning a /32 subnet or a 255.255.255.255 subnet mask, thereby forcing network traffic (e.g., communications 305) to be directed through the zero-trust gatekeeper 300. Stated differently, by assigning each device a subnet mask of /32 (i.e., 255.255.255.255), each device will route traffic through gatekeeper 305, rather than send traffic directly to other devices within the same network, because the subnet mask /32 indicates that a device is the only device in a particular subnet. Therefore, there are no other devices within the same network to which the device can send messages directly, and it must route traffic to all intended recipients rather than send messages directly to them. The zero-trust gatekeeper 300 may be configured to monitor and/or control network communications 305 using the zero-trust least privilege model. For example, the zero-trust gatekeeper 300 may be inserted within the network between an existing DHCP server and the devices acting as a DHCP relay. The DHCP server may assign internet protocol (IP) addresses to devices 210.

Before assigning the IP addresses, the subnet mask of the respective IP address may be changed to "/32" (or a 255.255.255.255 subnet mask may be used) and the gateway may be set as the IP address of the zero-trust gatekeeper 300. In this example, a subnet 301 may be created for each device 210, and all network communication may be forced, including east-west network communication that otherwise is direct between devices 210, to go through the zero-trust gatekeeper 300 acting as a gateway. The zero-trust gatekeeper 300 may then monitor and/or control network communications 305 using the zero-trust least privilege model. In one or more aspects, the zero-trust gatekeeper 300 may be configured to control the DHCP server to assign the IP addresses to devices 210.

Alternatively, in an aspect, the zero-trust gatekeeper 300 may be configured as a DHCP server and operable to assign the IP addresses to the devices 210. For example, the zero-trust gatekeeper 300 may be configured to assign IP addresses to devices 210 requesting them. Before assigning the IP addresses, the zero-trust gatekeeper 300 may be configured to change the subnet mask of the respective IP address to "/32" (or use a 255.255.255.255 subnet mask) and set the gateway as the IP address of the zero-trust gatekeeper 300. In this example, a subnet 301 may be created for each device 210, and all network communication may be forced to go through the zero-trust gatekeeper 300 acting as the gateway. With this subnet configuration, direct device-to-device communication within a subnet is no longer possible. In one or more aspects, one or more zero-trust policies may be additionally or alternatively determined by monitoring/observing network patterns using one or more network switches.

The zero-trust gatekeeper 300 may be configured to determine highly personalized zero trust security recommendations for the individualized devices 210 to provide a microsegmented network configuration. In one or more aspects, the zero-trust gatekeeper 300 may monitor and evaluate the network traffic (e.g., traffic telemetry, and/or other information and/or data) being routed through the zero-trust gatekeeper 300 as a result of the individualized subnets 301. In this example, the individualized subnets 301 cause all traffic to traverse the gatekeeper 300 which allows the gatekeeper 300 to analyze the network traffic, which is used to determine zero-trust security recommendations and establish the zero-trust security policy.

In one or more aspects, the zero-trust gatekeeper 300 may be configured to determine one or more zero-trust policies and/or microsegments based on one or more user-defined tags, one or more automated tagging processes, and/or tag templates including pre-defined tag(s). For example, the devices 210 may be tagged based on: device information (e.g., operating system information, screen resolution information, and/or component manufacture information, such as the device serial number, manufacture date, manufacture location, etc.); software information (e.g. installed applications); operating system information; other device hardware and/or software information (e.g., processor information, memory information, storage information, network card information, installed drivers, firmware, BIOS, etc.); network information (e.g., IP address(es), one or more MAC addresses, network traffic information, such as traffic telemetry information); geolocation information of the device 210; user information (e.g., user identification information of users associated with the device); information identifying an intended use of the device (e.g., server, etc.); other identification information; or the like. The tag(s) associated with a particular device 210 may then be used to determine communication policies to be associated with the device 210 and establish the zero-trust security policy and/or determine recommendations for modifications to the policy.

The one or more zero-trust policies determined and enforced by the zero-trust gatekeeper 300 advantageously provide a zero-trust microsegmented network environment that improves the security of the network environment. The zero-trust gatekeeper 300 may utilize a zero-trust least-privilege model to determine one or more zero-trust policies that may reduce network access to only a limited set of network actions and/or paths. For example, the model may limit the network access for a respective device 210 to only what is required for the device 210 and/or user of the device 210 to perform their respective tasks. That is, the devices 210 may be logically grouped into smaller segments referred to as microsegments and the access to each of these microsegments may be closely controlled by the zero-trust gatekeeper 300 according to the defined zero-trust policies.

In one or more aspects, the zero-trust least-privilege model applies the principle of least privilege to achieve effective and robust security measures. Traditional segmentation approaches (e.g., VLANs) often fall short of providing true least-privilege security as access policies are defined between larger segments, allowing many-to-many access that is not always necessary. As described above, one or more aspects include "atomic segmentation" using networks of one (individualized subnets 301) to have visibility and control over all traffic and provide a more effective approach by creating and recommending policies at are more granular level. This ensures true least-privilege access between individual assets (e.g. devices 210) and/or small logical groups. The atomic-segmentation approach may optimize zero-trust security, including, for example, eliminating or reducing convenience-based groupings that are often used in traditional segmentation. In one or more aspects, automated tagging and templates may be used to improve standardize deployment automation and provide a streamlined solution for implementing least privilege security at scale.

The zero-trust gatekeeper 300 (as well as gatekeeper 600) may use machine learning (ML), which may include using one or more ML models or algorithms, to perform one or more functions (e.g. to identify approved connections and/or perform policy manipulation). A ML model may support, for example, a generative adversarial network, a bidirectional generative adversarial network, an adversarial autoencoder, or an equivalent thereof. Additionally, or alternatively, the ML model may be, for example, a convolutional neural network, a recurrent neural network, a recursive neural network, a long short-term memory (LSTM), a gated recurrent unit (GRU), an unsupervised pretrained network, a space invariant artificial neural network, or any equivalent thereof. The ML model may be trained based on input data and/or output data of the zero-trust gatekeeper 300 and/or data associated with one or more other components of the network. The ML model may be trained using different training techniques, such as supervised training, unsupervised training, semi-supervised training back propagation, transfer learning, stochastic gradient descent, learning rate decay, dropout, max pooling, batch normalization, and/or any equivalent deep learning technique. In one or more aspects, one or more other devices of the network may implement one or more ML models to perform their respective functions.

In one or more aspects, the zero-trust gatekeeper 300 may negate and/or reduce the need for individualized security agents to be installed on each of the devices 210, which advantageously reduces the complexity of the network and management costs. The zero-trust gatekeeper 300 has further advantages because the zero-trust gatekeeper 300 may not be impacted by regulations and/or technical constraints that may limit deployment of security agents on certain devices. Nonetheless, although aspects of the disclosure will be described using the zero-trust gatekeeper 300, one or more zero-trust security agents for the device(s) 210 may additionally, or alternatively, be used to implement one or more aspects of the disclosure.

In one or more aspects, as discussed above, a zero-trust least-privilege network security model may be used. This model may deploy a security asset, such as the zero-trust gatekeeper 300, which may be configured to observe all network traffic (e.g., communications 305) and implement one or more zero-trust policies. The zero-trust least-privilege network security model may be agentless (e.g., the device(s) 210 are not required to include a zero-trust agent) in or more aspects. The zero-trust policies may include one or more communication rules, which may be determined using logic and/or heuristics configured to detect patterns that may be suggestive of actionable enforcement principles. For example, the zero-trust gatekeeper 300, based on the observations of network traffic, may detect an open server port that is listening for communication but the port has no current, recent, and/or historical communication activities. The logic and/or heuristics employed by the zero-trust gatekeeper 300 may then suggest closing the port. Additionally, or alternatively, one or more rule templates may be used, which provide a predetermined set of communication rules for the zero-trust policies. The rule templates may be used as baseline, and may be automatedly adjusted (e.g., by the zero-trust gatekeeper 300 based on the observations of network traffic) and/or manually by the user. The adjustment of the communication rules, which may include the adjustment of rule template(s), may be based on feedback received in response to suggested action items regarding the observed network communications (e.g., based on allow/deny decisions received from the user of actions suggested by the zero-trust gatekeeper 300).

A zero-trust approach according to one or more aspects may include the zero-trust gatekeeper 300 being logically positioned as a gateway for all network communications 305 within the network by isolating networks 301 for each device 210 using subnets of size one (e.g., by assigning a /32 subnet). For example, all network communications 305 may be routed through the zero-trust gatekeeper 300, enabling observation of all internal communications 305. Internal communications 305 between internal devices 210 may be referred to as "east-west" network traffic, while network traffic 306 in and out of the LAN (e.g., traffic traversing the external firewall-gateway 203) may be referred to as "north-south" network traffic.

Zero-trust policies may be established that specify allowed communication paths and prevent unauthorized access. The zero-trust gatekeeper may 300 be configured to enforce a zero-trust least privilege policy by only allowing explicitly authorized paths and blocking all other traffic.

The zero-trust gatekeeper 300 may be configured to monitor the traffic now flowing through the zero-trust gatekeeper 300, automatically determine policies, and/or assist users determine and/or manipulate policies, to achieve a zero-trust least-privilege network security model. This zero-trust least-privilege network security model may be achieved without individual security agents being installed on the devices 210. In one or more aspects, the size and robustness of the zero-trust gatekeeper 300 may be modified (e.g., increased) to address an increase in the number of devices 210 served by the zero-trust gatekeeper 300. Additionally, or alternatively, the network may be segmented to divide traffic into multiple LANs, where each LAN is served by a respective zero-trust gatekeeper 300. In this configuration, the environment may include one or more controllers or centralized management that may be configured to interact with each of the zero-trust gatekeepers 300 to monitor and/or control the overall network operation.

In one or more aspects, the environment may include a redundant zero-trust gatekeeper 300 to improve reliability and avoid a single point of failure. In this example, the two zero-trust gatekeepers 300 may be connected to the network, and if one zero-trust gatekeeper 300 fails, the other zero-trust gatekeeper 300 may take over the load.

For zero trust implementations, a detailed understanding of an enterprise's assets, subjects, and business processes is used to enforce policies effectively. Lack of knowledge and/or incorrect information may result in inappropriate denials of legitimate requests, which may lead to business process and application failures. In one or more aspects, the implementation of the zero-trust least-privilege network security model may include a progressive, step-wise approach. A progressive zero trust approach according to one or more aspects may include breaking down the zero-trust process into smaller steps, allowing for incremental improvements in security that yield visible results in a shorter period of time. This approach differs from traditional zero-trust segmentation, which requires users to identify and define all allowable communication before the zero-trust policy can be enforced.

In one or more aspects, the progressive zero trust process includes gradually enhancing and/or refining zero trust enforcement for different access levels to the same asset (e.g., device 210). For example, the zero-trust gatekeeper 300 may be configured to increase the granularity of internet access while keeping intranet access coarse, and/or allow broader/coarser access to certain low-risk ports while making access to more sensitive ports more granular. Advantageously, the progressive zero-trust approach enhances zero trust security by prioritizing access control measures and continuously improving them over time, rather than requiring immediate, comprehensive enforcement.

For zero trust implementations, policies can be built based on observed accesses and communications, and the constructed policies are then enforced. As new accesses are required, policies may be added, and more communication paths may be opened. If the new communication paths are opened without checking if previously opened communication paths are still necessary, security exposure may result that may be exploited by attackers.

In one or more aspects, a continuous zero trust optimization process may be used. The network communications and policies (e.g., communication rules) may be continually monitored. The policies may be continually refined to optimize the communication rules set by one or more policies and the efficacy of the zero-trust model. The optimization may ensure that only authorized and necessary communication is permitted. In one or more aspects, the optimization process reviews previously allowed communication rules, identifying and removing those that are no longer necessary, and refining communication rules in line with zero trust security principles. In one or more aspects, the zero-trust gatekeeper 300 may be configured to perform a continuous zero trust optimization process to adaptively adjust and improve the policies and communication rules included therein.

Advantageously, by employing continuous zero trust optimization, enterprises can enhance their security posture and ensure that their zero trust security measures remain effective and up to date, even as newer versions of applications may result in changes in network usage. This ongoing process of optimization enhances security by closing unnecessary holes and prioritizing access control measures. The result is a more robust and effective security approach that continually looks to refine the security polices (e.g. close open paths and allowing only what is essential for applications to function). This ongoing refinement of communication rules advantageously reduces the attack surface (e.g., the amount of potential vulnerabilities that may be exploited) and blast radius (e.g., if exploited, the severity and spread of such exploit), thereby improving the overall security posture while maintaining the least privilege access control principle.

Figure 4:
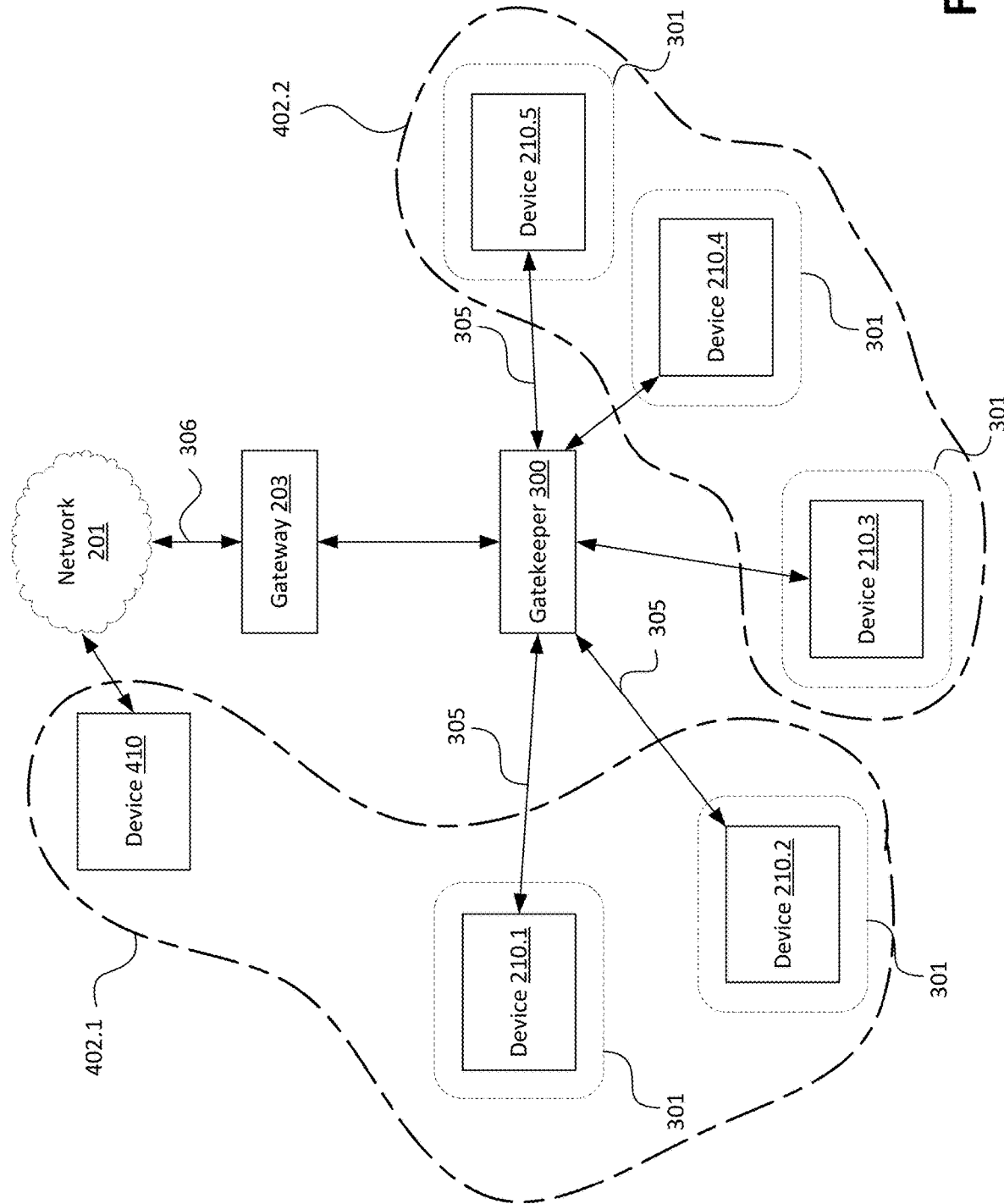
FIG. 4 illustrates an example network environment including a gatekeeper and microsegments according to one or more aspects of the disclosure.
Figure 5:
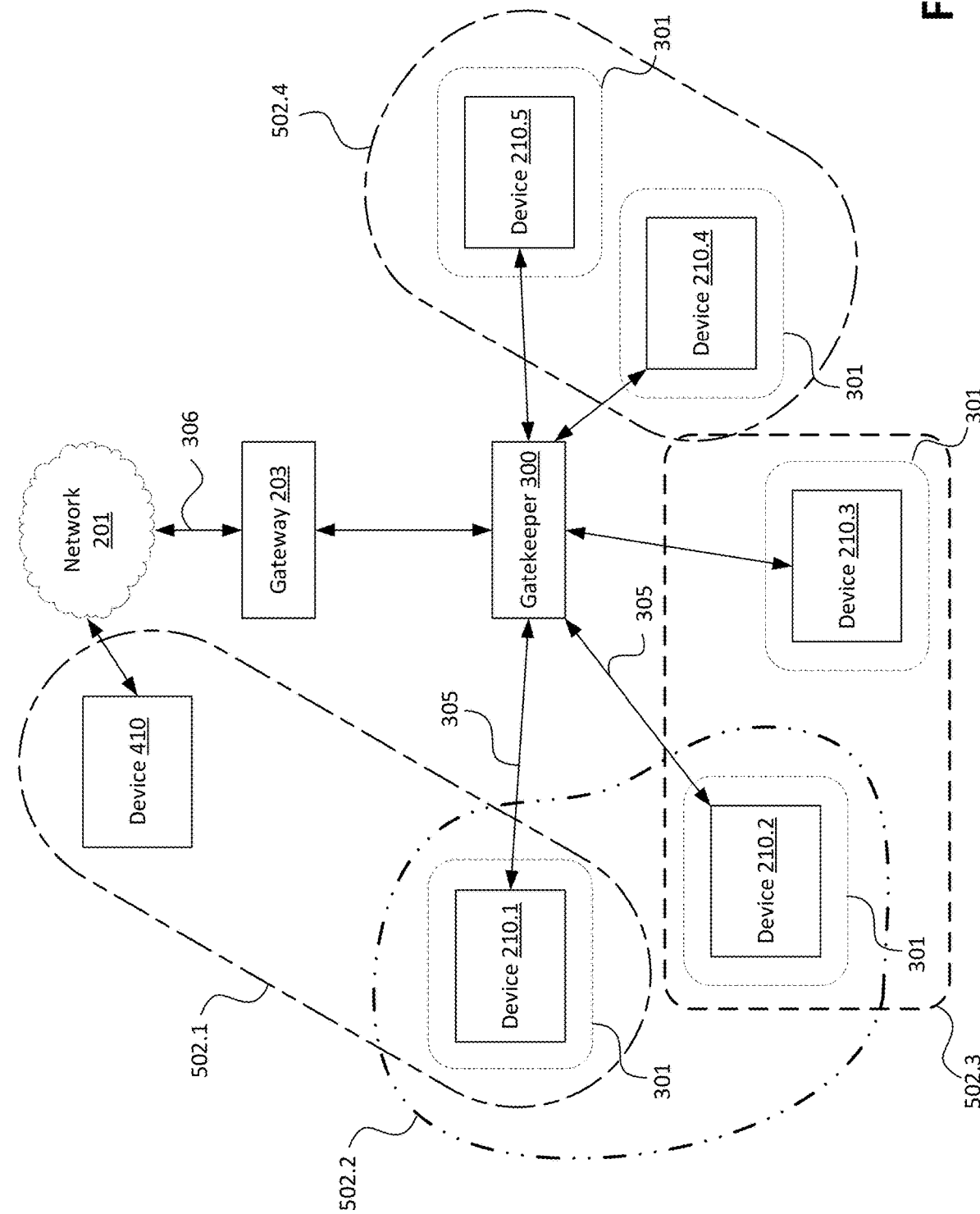
FIG. 5 illustrates an example network environment including a gatekeeper and microsegments according to one or more aspects of the disclosure.

FIGS. 4 and 5 illustrate example microsegments 402, 502 within the network environment according to one or more aspects of the disclosure. The number of devices within a microsegment 402, 502 is not limited to the illustrated examples and other configurations are possible. The zero-trust gatekeeper 300 may establish one or more microsegments 402, 502, which may include one or more devices 210. In one or more aspects, devices within a microsegment 402, 502 may be supported by different networks, including different LANs, VLANs, and/or WANs. For example, microsegment 402.1 may include device 210.1 and 210.2 connected via an intranet, as well as an external device 410 that is connected via the Internet. Similarly, microsegment 502.1 includes device 210.1 and external device 410. In another example, microsegment 402.2 includes devices 210.3, 210.4, and 210.5. In other words, microsegments are independent of underlying networking.

In one or more aspects, the devices 210, 410 within a particular microsegment 402, 502 are governed by the same zero-trust policy. For example, with reference to FIG. 4, if device 210.1 is restricted from accessing device 210.5, devices 210.2 and 410 are also restricted from such access unless devices 210.2 and 410 are members of an additional microsegment 402 that may allow for a particular communication. As illustrated in FIG. 5, devices 210, 410 may be members of more than one microsegments 502. For example, devices 210.1 and device 410 are members of microsegment 502.1, while device 210.1 is also a member of microsegment 502.2 along with device 210.2. In this configuration, device 210.1 is governed by two zero-trust policies—a first policy shared with device 410, and a second policy shared with device 210.2. The various policies for the microsegments 502 may collectively form the overall zero-trust least-privilege policy for the network. In the illustrated example in FIG. 5, devices 210.2 and 210.3 are members of microsegment 502.3 and devices 210.4 and 210.5 are members of microsegment 502.4. In aspects where the microsegment 402, 502 includes only a single device 210, the microsegment 402, 502 corresponds to the respective individualized subnet 301 associated with the particular device 210. In one or more aspects, the microsegments 402, 502 may be adaptively added, deleted, and/or adjusted based on the addition, deletion, and/or adjustment of one or more zero-trust policies.

FIG. 6 illustrates a gatekeeper 600 according to one or more aspects of the disclosure. The gatekeeper 300 may be implemented by gatekeeper 600 in one or more aspects.

The gatekeeper 600 may include a processor 611 configured to control the overall operation of the gatekeeper 600. Gatekeeper 600 may further include RAM 613, ROM 615, network interface 617, input/output interfaces 619 (e.g., keyboard, mouse, display, printer, etc.), and memory 621. I/O 619 may include a variety of interface units and drives for reading, writing, displaying, and/or printing data or files.

Memory 621 may further store operating system software 623 for controlling overall operation of the gatekeeper 600, and control logic 625 for instructing the gatekeeper 600 to perform aspects described herein. In one or more aspects, the control logic 625 may include one or more firewall applications and/or firewall logic, configured to perform one or more firewall functions as described herein. The control logic 625 may also be referred to herein as the gatekeeper software 625. Functionality of the gatekeeper software may refer to operations or decisions made automatically based on rules coded into the control logic, made manually by a user providing input into the system, and/or a combination of automatic processing based on user input (e.g., queries, data updates, etc.).

In one or more aspects, the memory 621 may additionally include ZT policy logic 627 for creating one or more policies, adjusting one or more policies, updating one or more policies, and/or removing one or more policies, tagging logic 629 for tagging devices or assets in communication with the gatekeeper 600, microsegment logic 631 for creating one or more microsegments, adjusting one or more microsegments, updating one or more microsegments, and/or removing one or more microsegments, and/or template logic 633 for creating one or more templates, adjusting one or more templates, updating one or more templates, and/or removing one or more templates. In one or more aspects, the ZT policy logic 627 determines and/or adjusts one or more communication rules to define the one or more polices. The ZT policy logic 627 may determine and/or adjust the rule(s) using logic and/or heuristics. In one or more aspects, the ZT policy logic 627 may use artificial intelligence (AI), such as machine learning (ML), configured and/or trained to determine and/or adjust one or more communication rules. In this example, the ZT policy logic 627 may include the ML model 635 and/or otherwise cooperate with the ML model 635 to perform the functions of the ZT policy logic 627.

The memory 621 may also include ML model 635 for performing one or more functions of the gatekeeper 600 using ML (e.g., determining and/or adjusting one or more zero-trust policies), and/or other application software 637 providing secondary, support, and/or other functionality which may or may not be used in conjunction with other aspects described herein. The ZT policy logic 627, tagging logic 629, microsegment logic 631, and/or template logic 633 may store data, including one or more ZT policies, tags, microsegments, and templates, respectively.

In one or more aspects, the functionality of gatekeeper 600 may be spread across multiple data processing devices to, for example, distribute processing load across multiple computers, and/or to segregate transactions based on geographic location, user access level, quality of service (QoS), etc. In one or more aspects, the ZT policy logic 627, tagging logic 629, microsegment logic 631, template logic 633, ML model 635, and/or other application(s) 637 may alternatively be implemented in one or more external network devices (e.g., in one or more cloud servers). In this example, the gatekeeper 600 may be externally controlled based on information received by the external network device(s) (e.g., the externally located components 627-637 may inform the control logic 625 to enforce the required zero-trust polices). In one or more aspects, the ZT policy logic 627, tagging logic 629, microsegment logic 631, template logic 633, ML model 635, and/or other application(s) 637 may be implemented within the gatekeeper 600 and one or more external network devices, and be configured to cooperatively perform their respective functions in distributed configurations. In one or more aspects, the control logic 625 may be alternatively or additionally comprised within one or more external network devices.

Memory 621 may also store data (e.g., ZT policies, templates, tags, etc.) used in performance of one or more aspects described herein, including a first storage (S1) 639 and a second storage (S2) 641. The first storage 639 and/or the second storage 641 may be a database in one or more aspects. In one or more aspects, the first storage 639 may include the second storage 641 (e.g., as a separate table, report, etc.). That is, the information can be stored in a single storage, or separated into different logical, virtual, or physical storages, depending on system design. Those of skill in the art will appreciate that the functionality of gatekeeper 600 as described herein may be spread across multiple data processing devices, for example, to distribute processing load across multiple computers, to segregate transactions based on geographic location, user access level, quality of service (QoS), etc.

Figure 10:
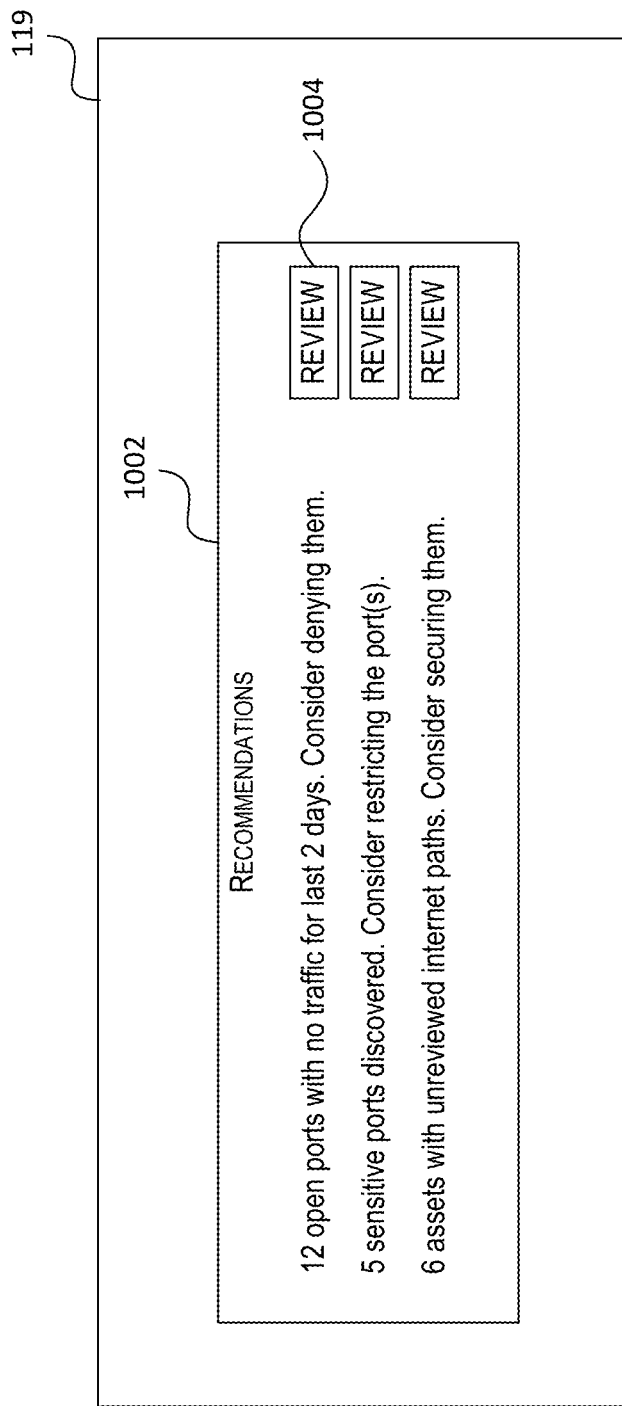
FIG. 10 illustrates an example graphical user interface illustrating a zero-trust network security application according to one or more aspects of the disclosure.
Figure 11:
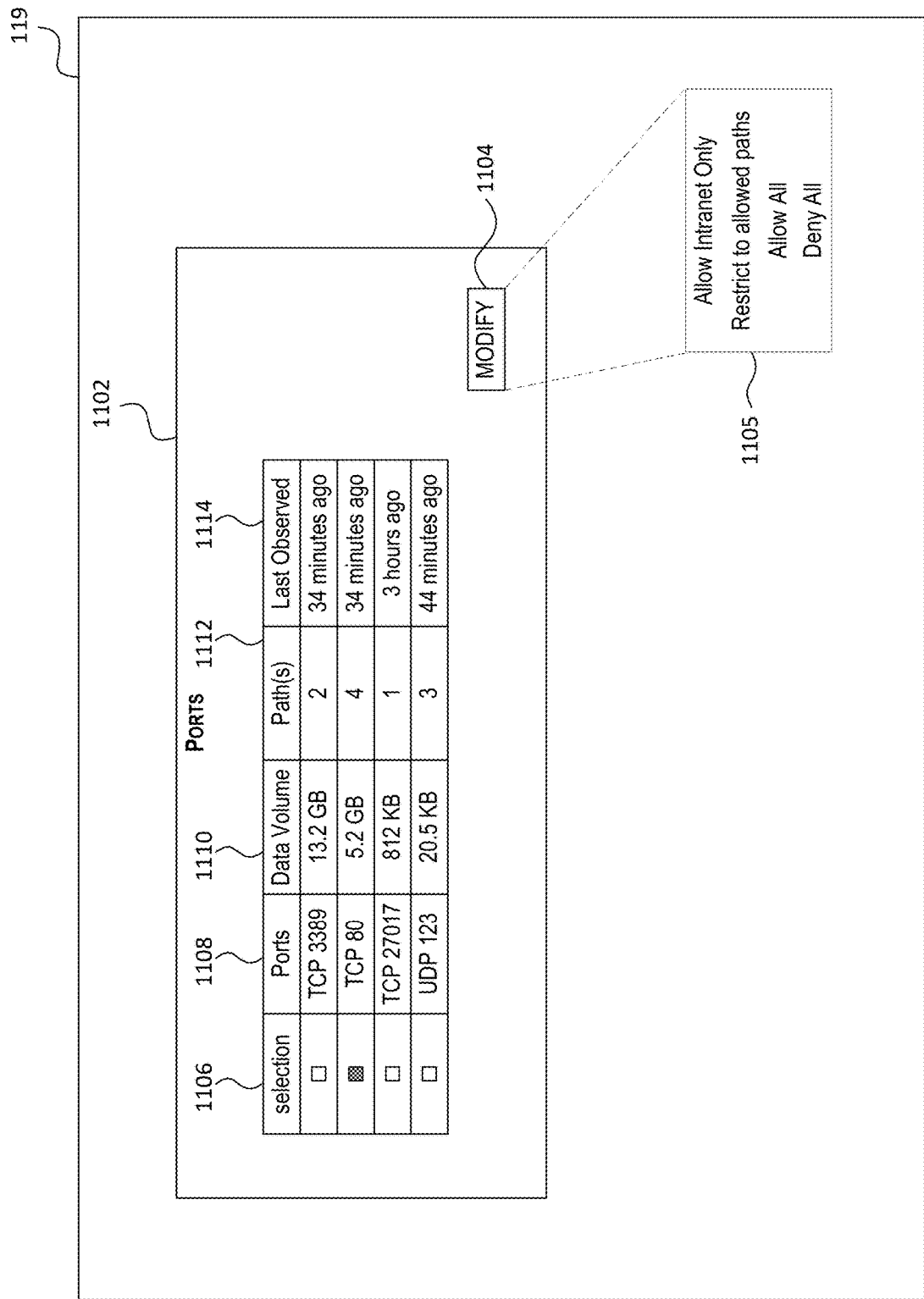
FIG. 11 illustrates an example graphical user interface illustrating a zero-trust network security application according to one or more aspects of the disclosure.

The network traffic may be monitored (e.g., by one or more users, such as network administrators, with access to the zero-trust gatekeeper 300, 600) to identify approved connections and create and/or refine policies that only allow the approved connections to be used, which advantageously increases network security and protection against security threats. The monitoring may include collecting source addresses, destination addresses, port numbers, and/or other information of network communications to determine network patterns for devices, users, applications, and/or other network information and/or components. With reference to FIGS. 10 and 11, based on the network patterns, one or more recommendations or suggestions 1002 may be determined, which may be provided (e.g., displayed) to the network administrator or other user. In one or more aspects, the analysis of the network traffic may include analyzing one or more logs, such as firewall logs. The analysis of the logs may identify blocked traffic that the system and/or user may want to allow, and/or allowed traffic that the system and/or user may want to deny. In one or more aspects, the gatekeeper 300, 600 may be configured to generate one or more notifications to notify the user of denied and/or allowed traffic.

Figure 12:
FIGS. 12-91 illustrate additional examples of a graphical user interface illustrating a zero-trust network security application according to one or more aspects of the disclosure.
Figure 13:
Figure 14:
Figure 15:
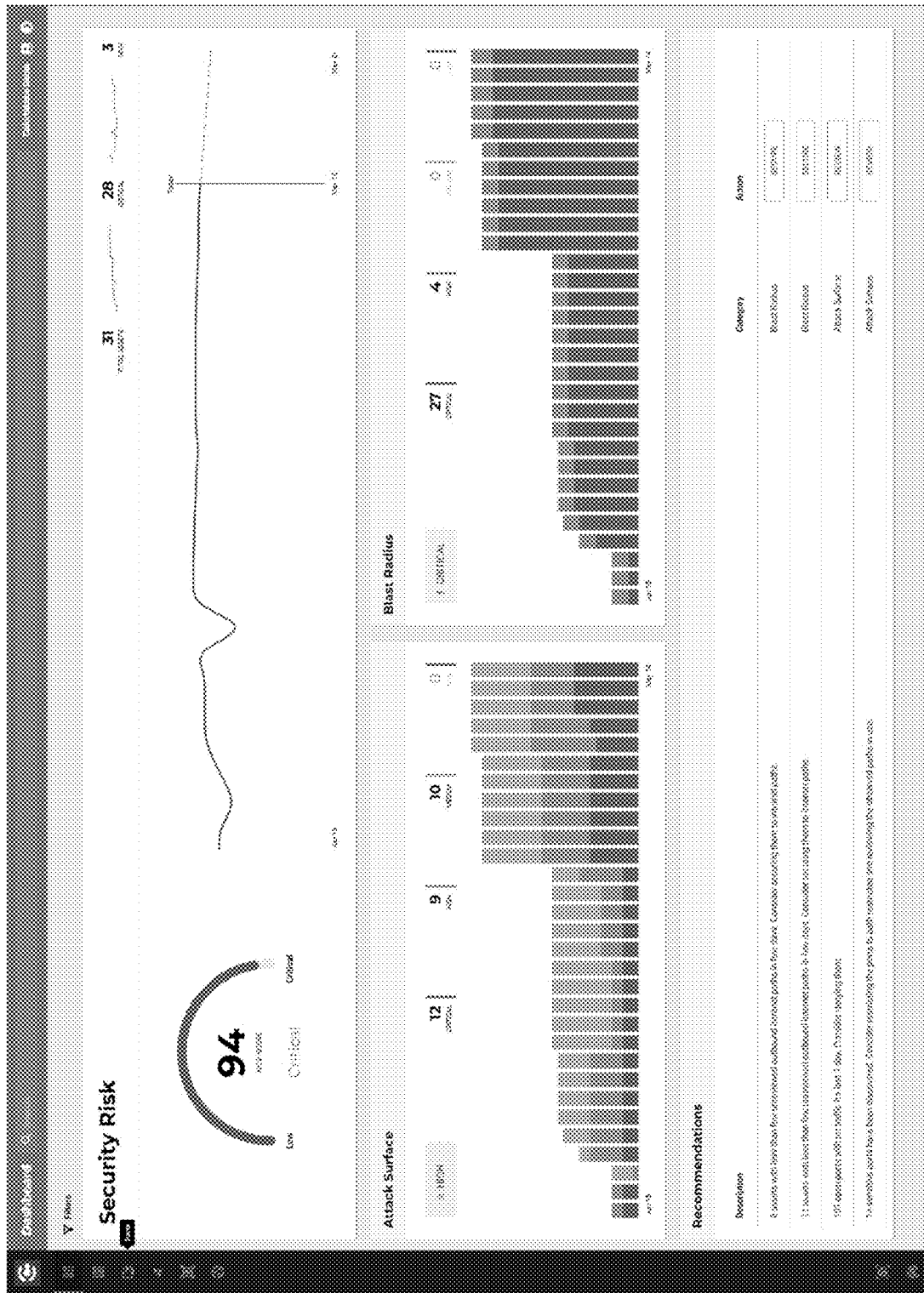
Figure 16:
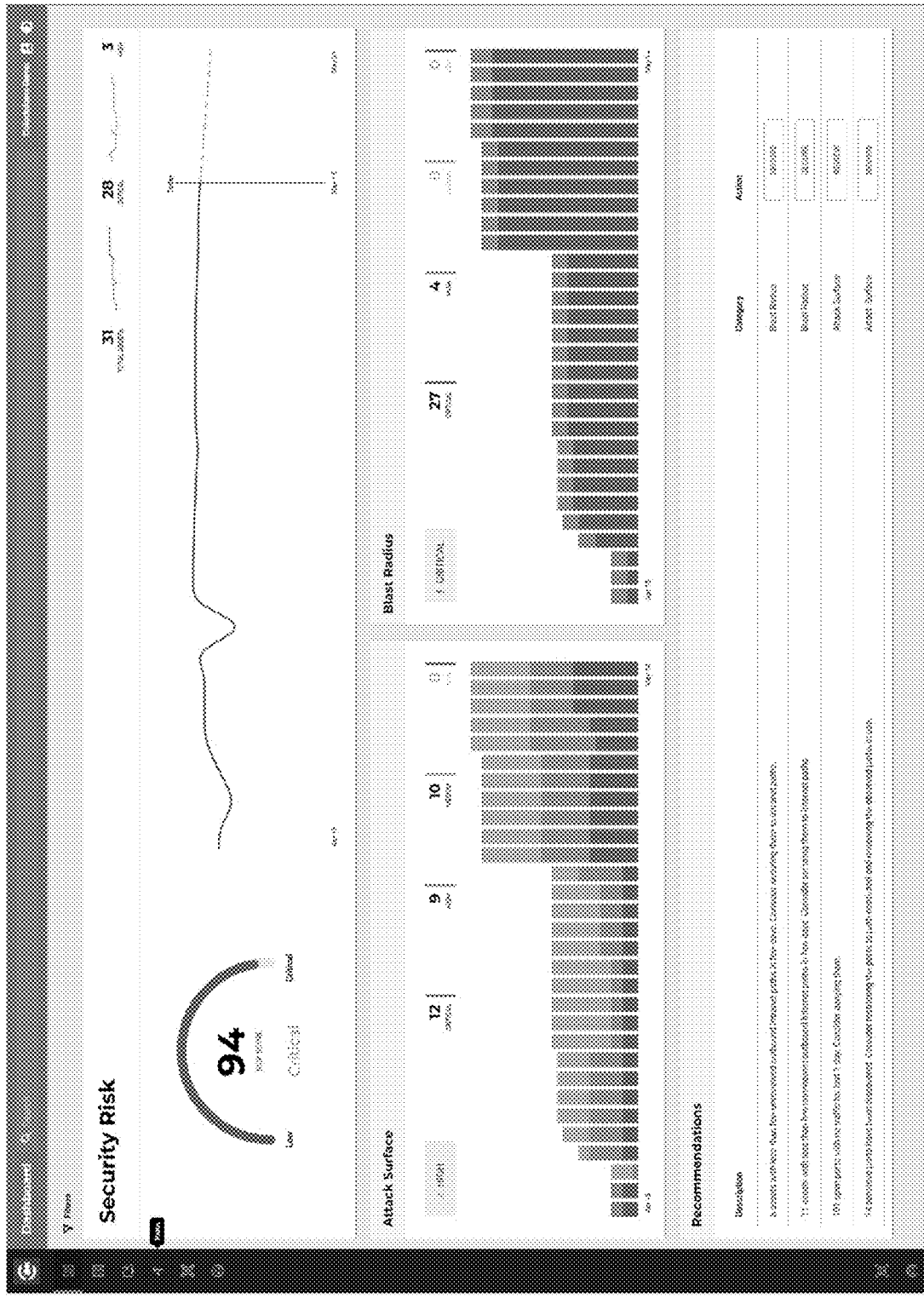
Figure 17:
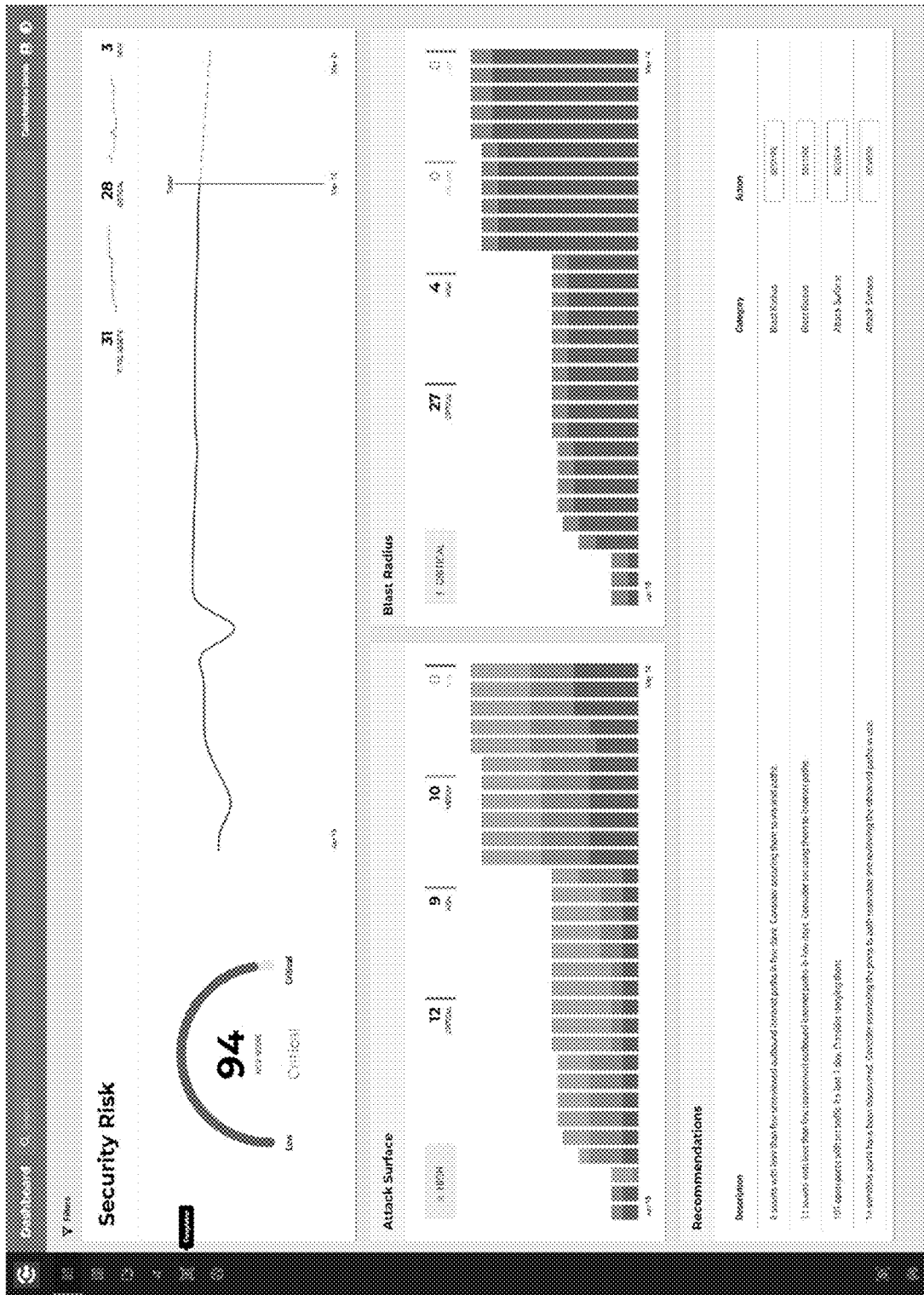
Figure 18:
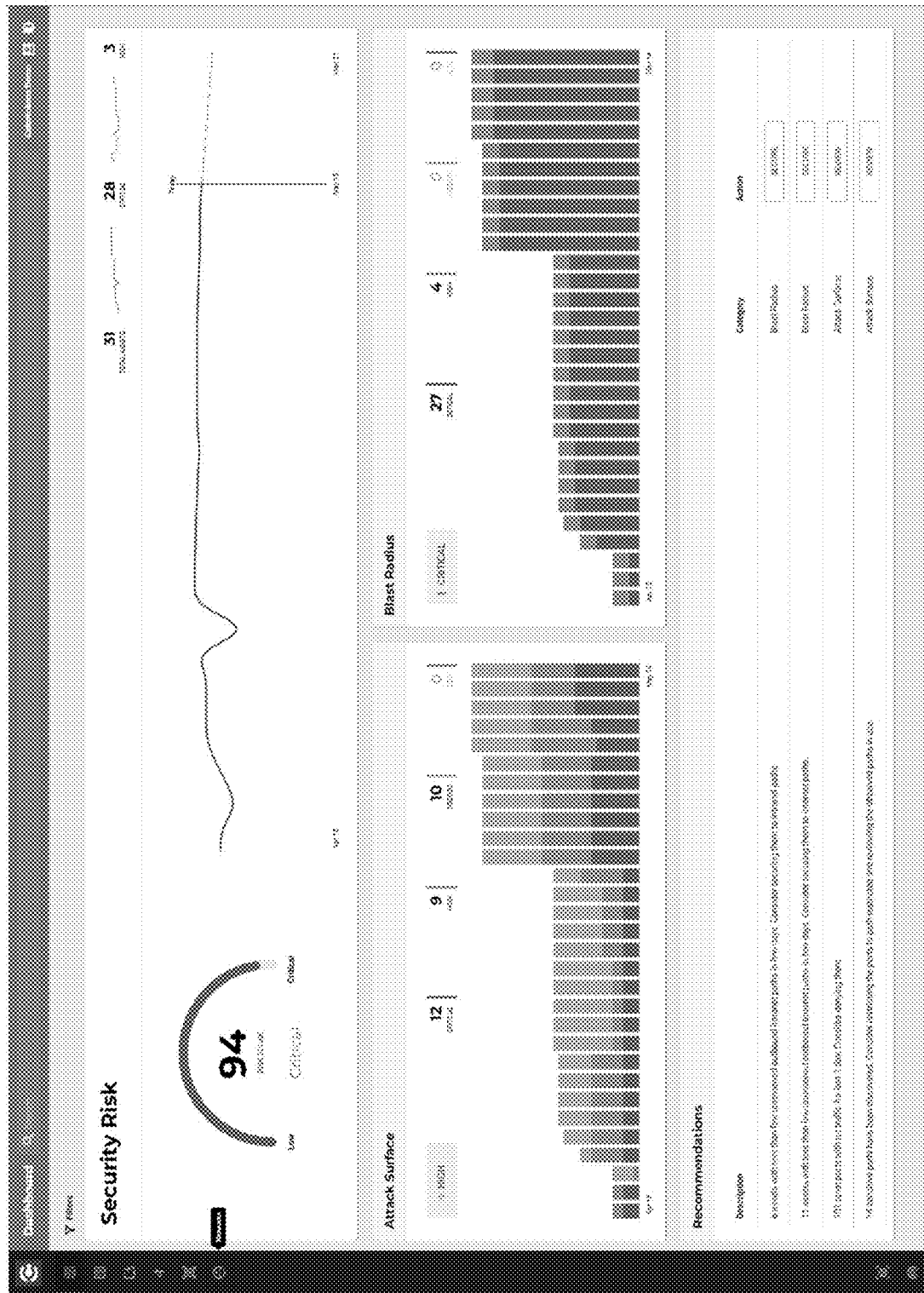
Figure 19:
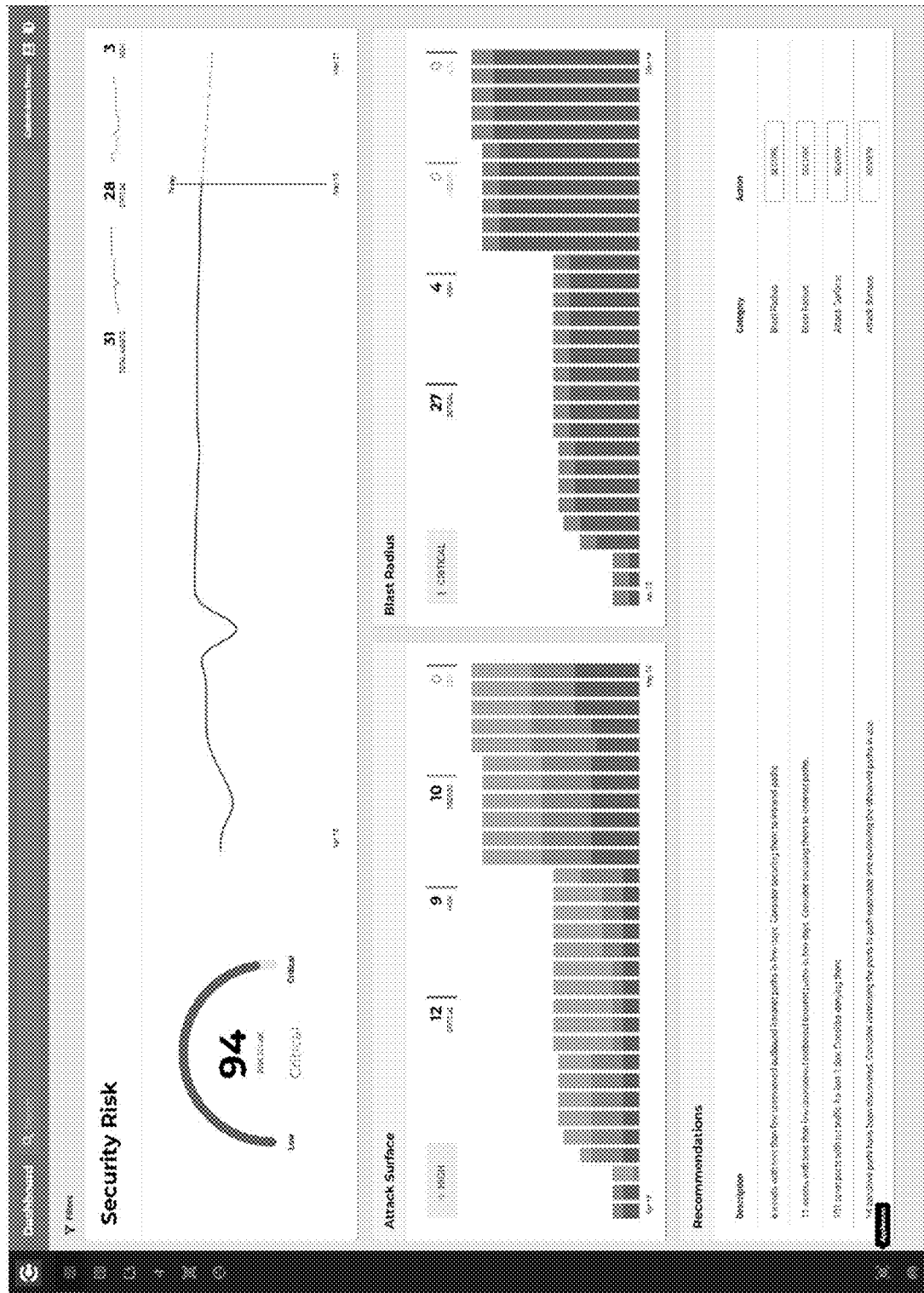
Figure 20:
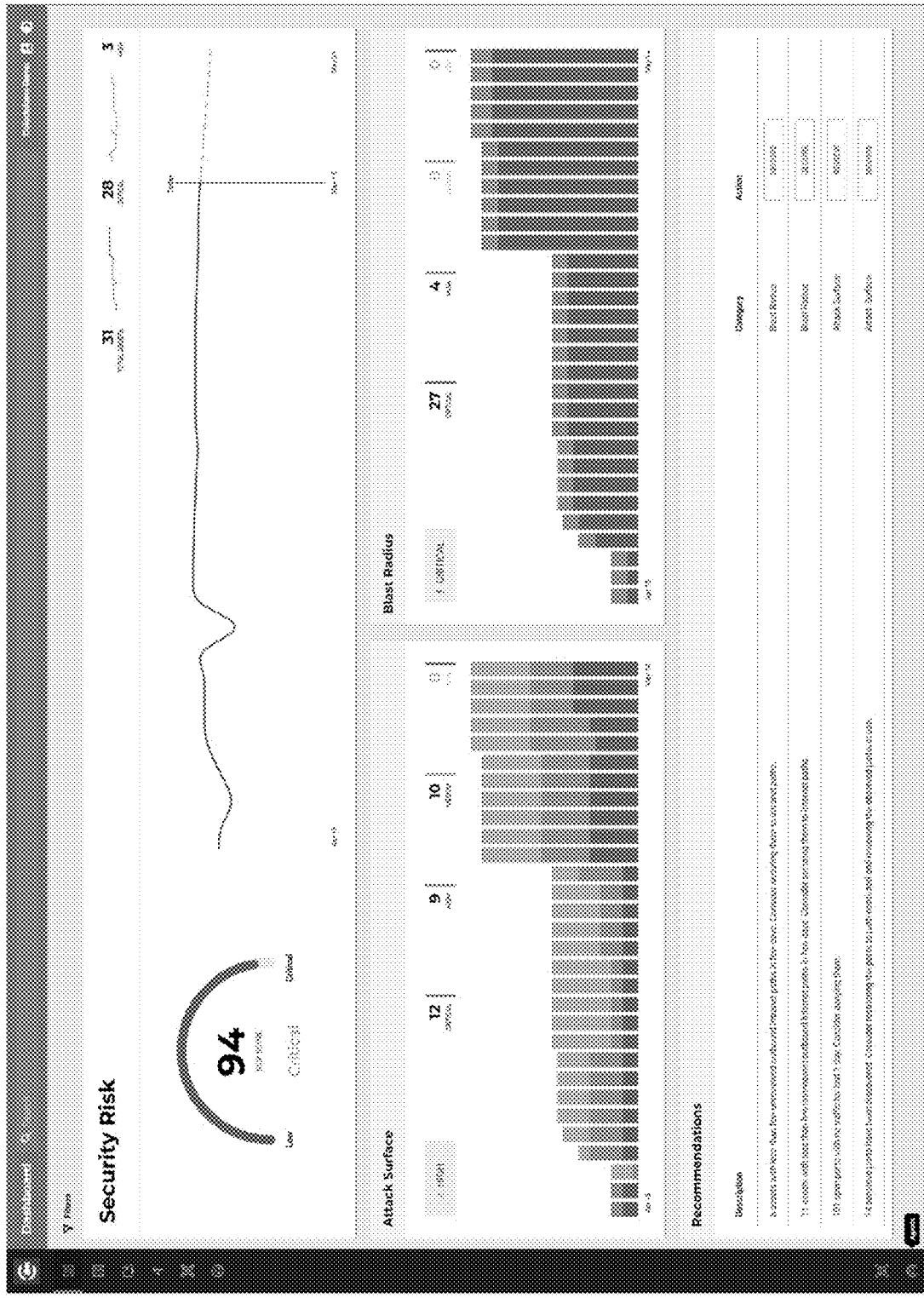
Figure 21:
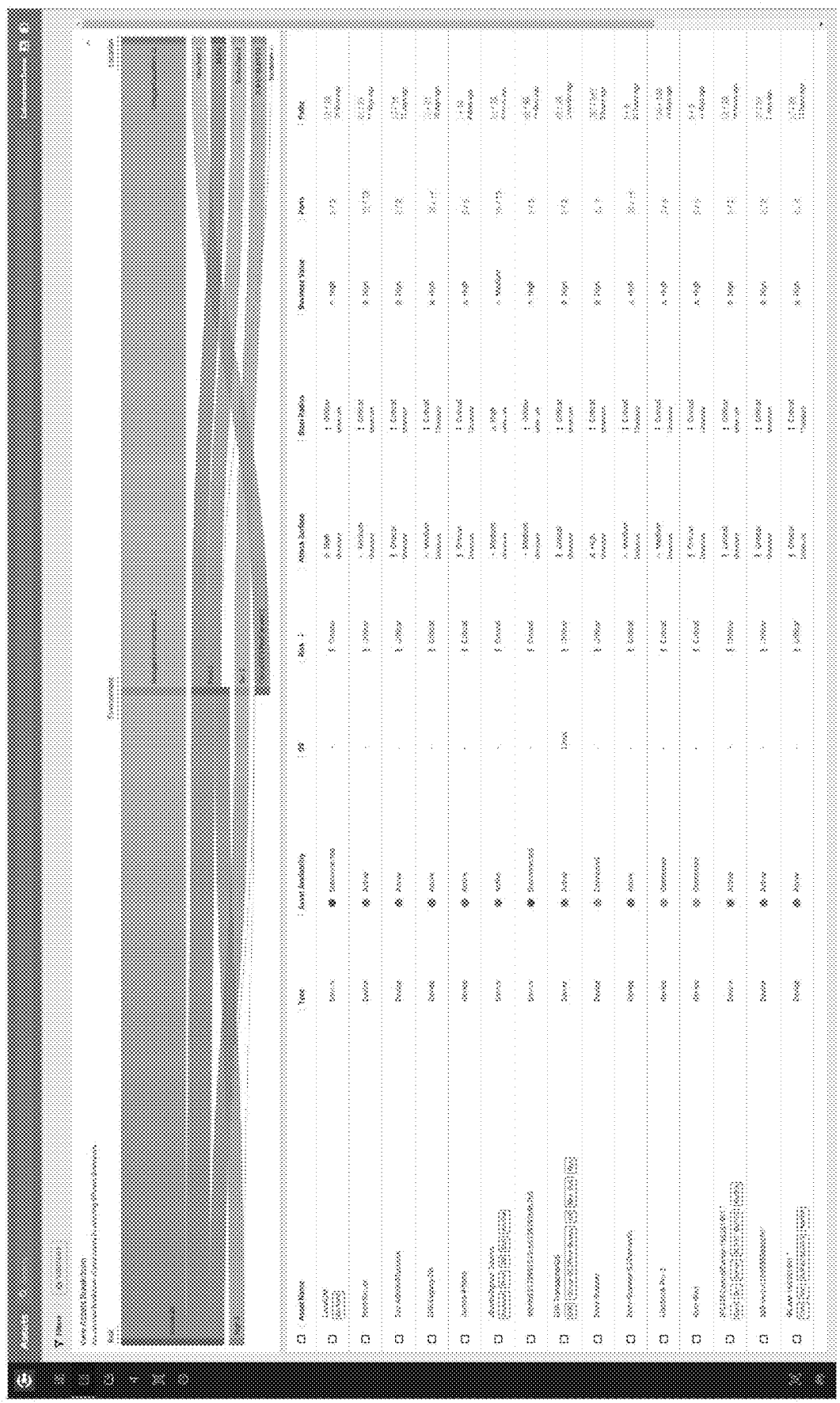
Figure 22:
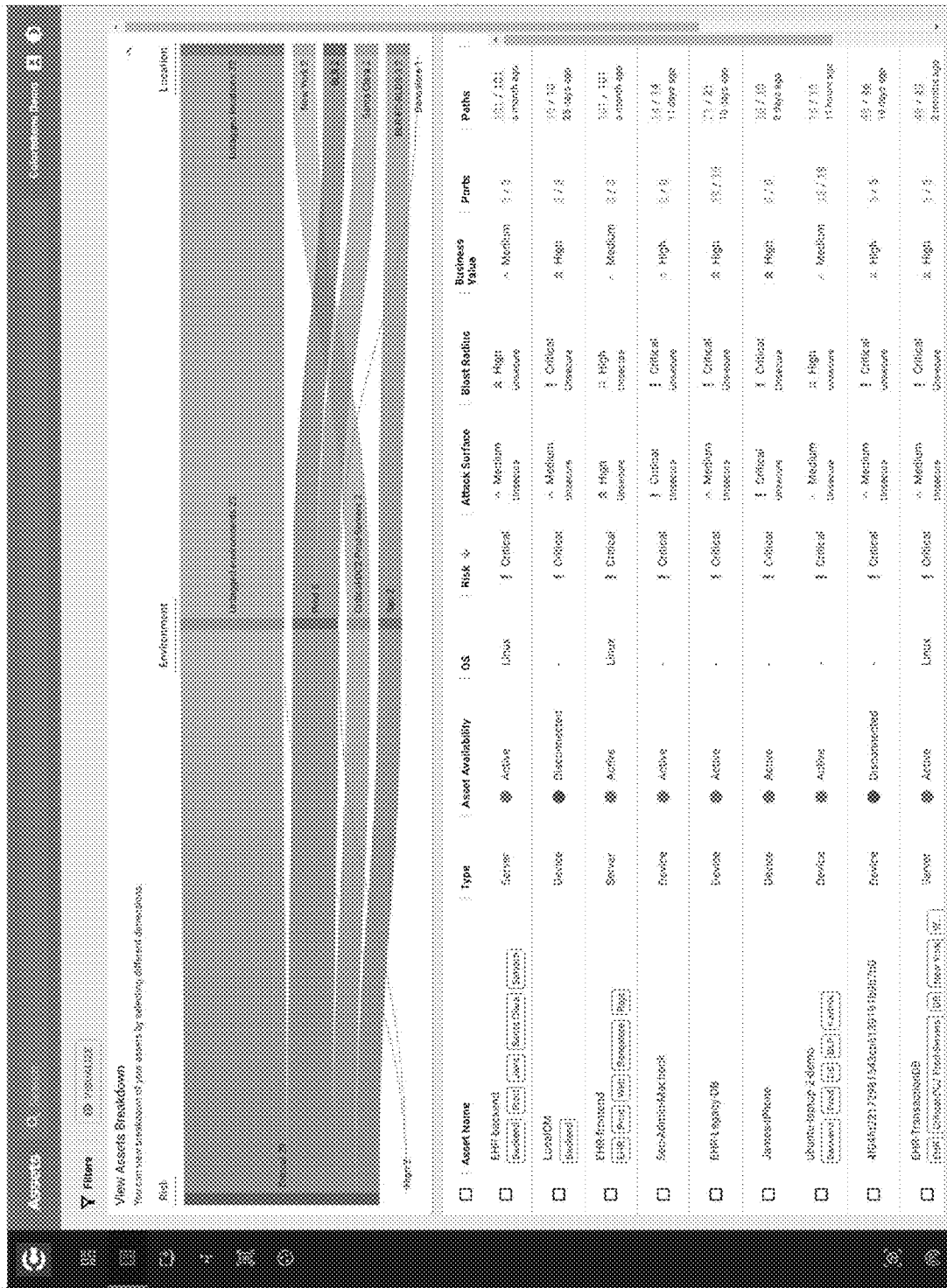
Figure 24:
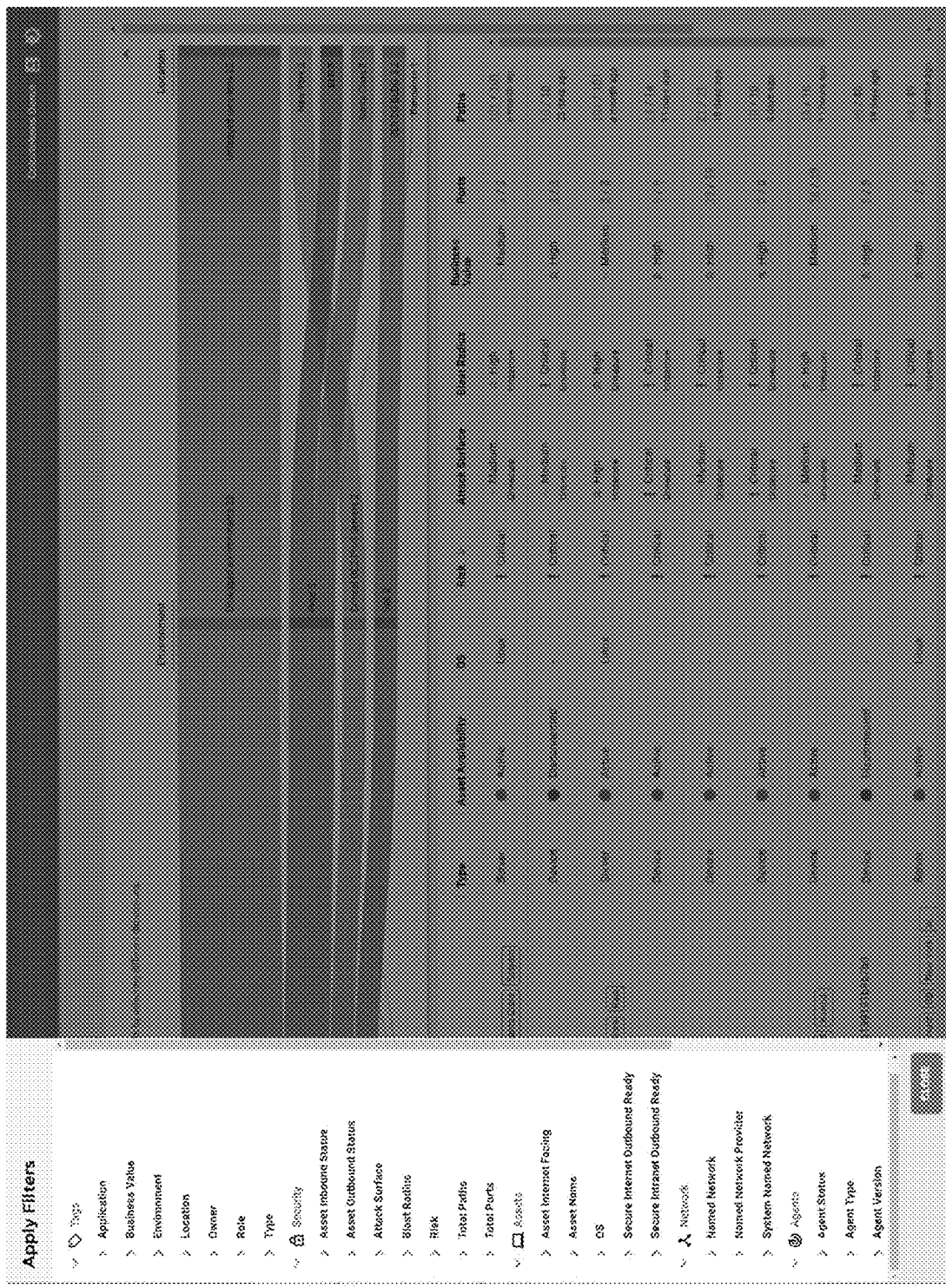
Figure 25:
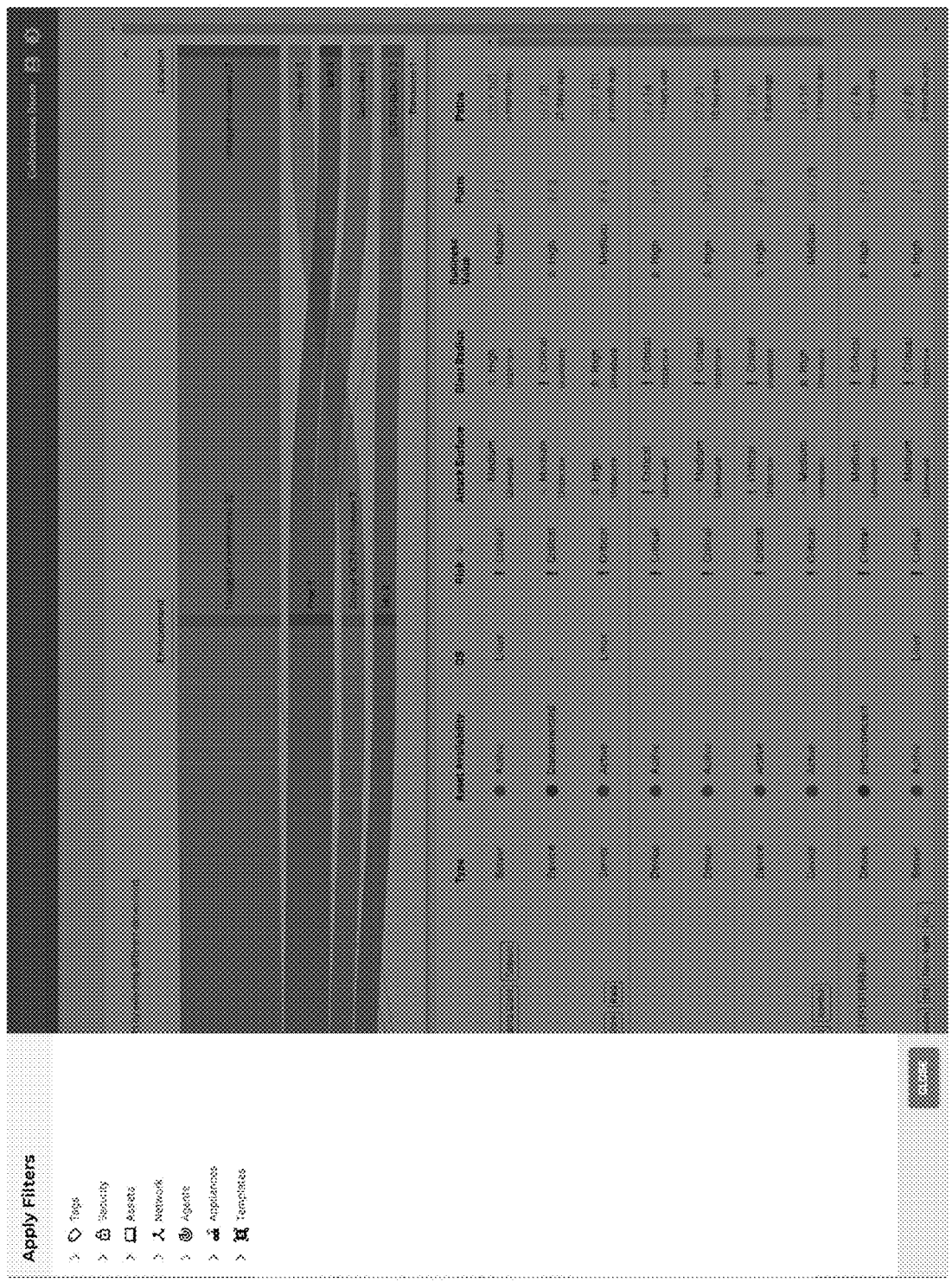
Figure 26:
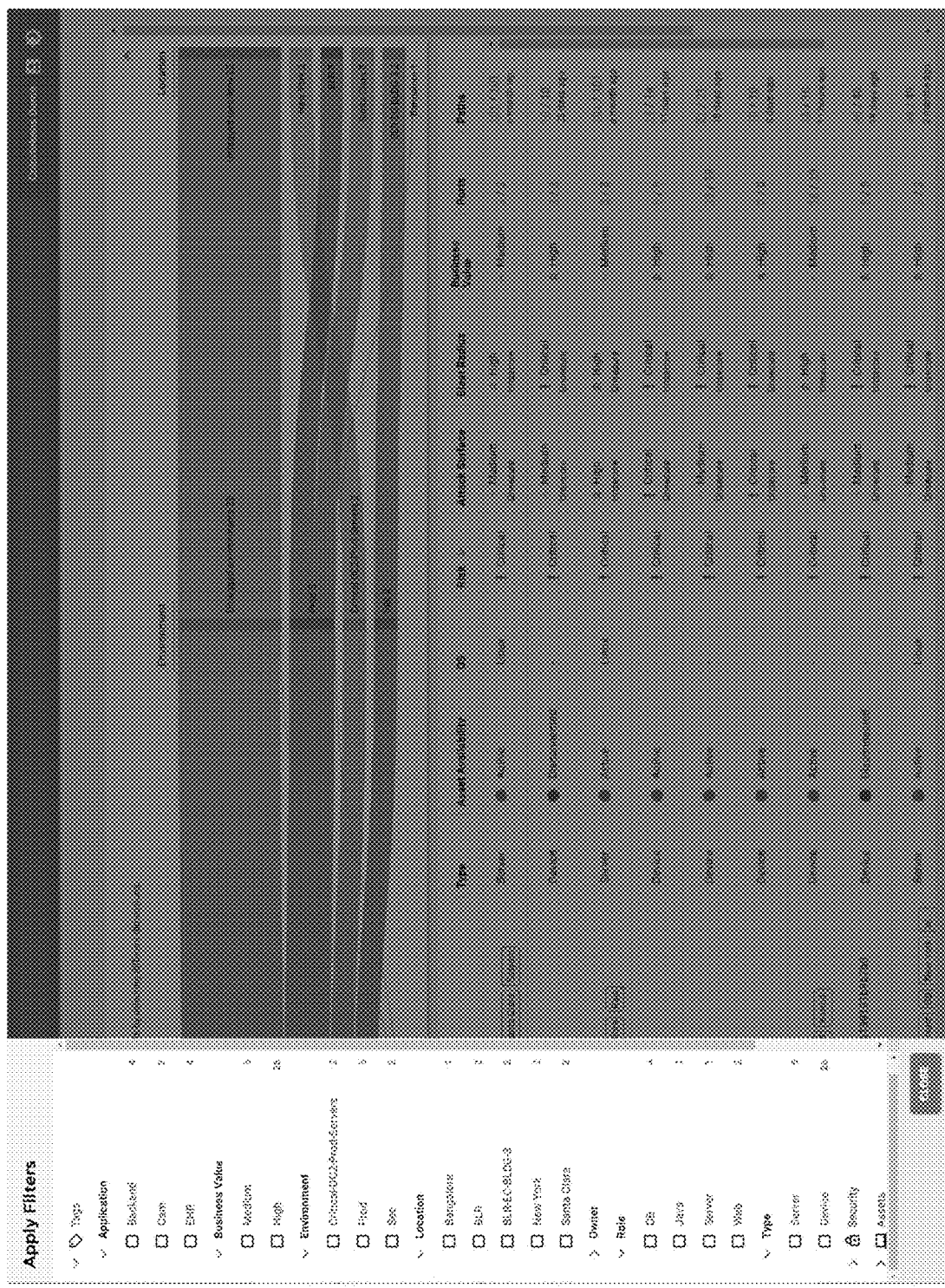
Figure 27:
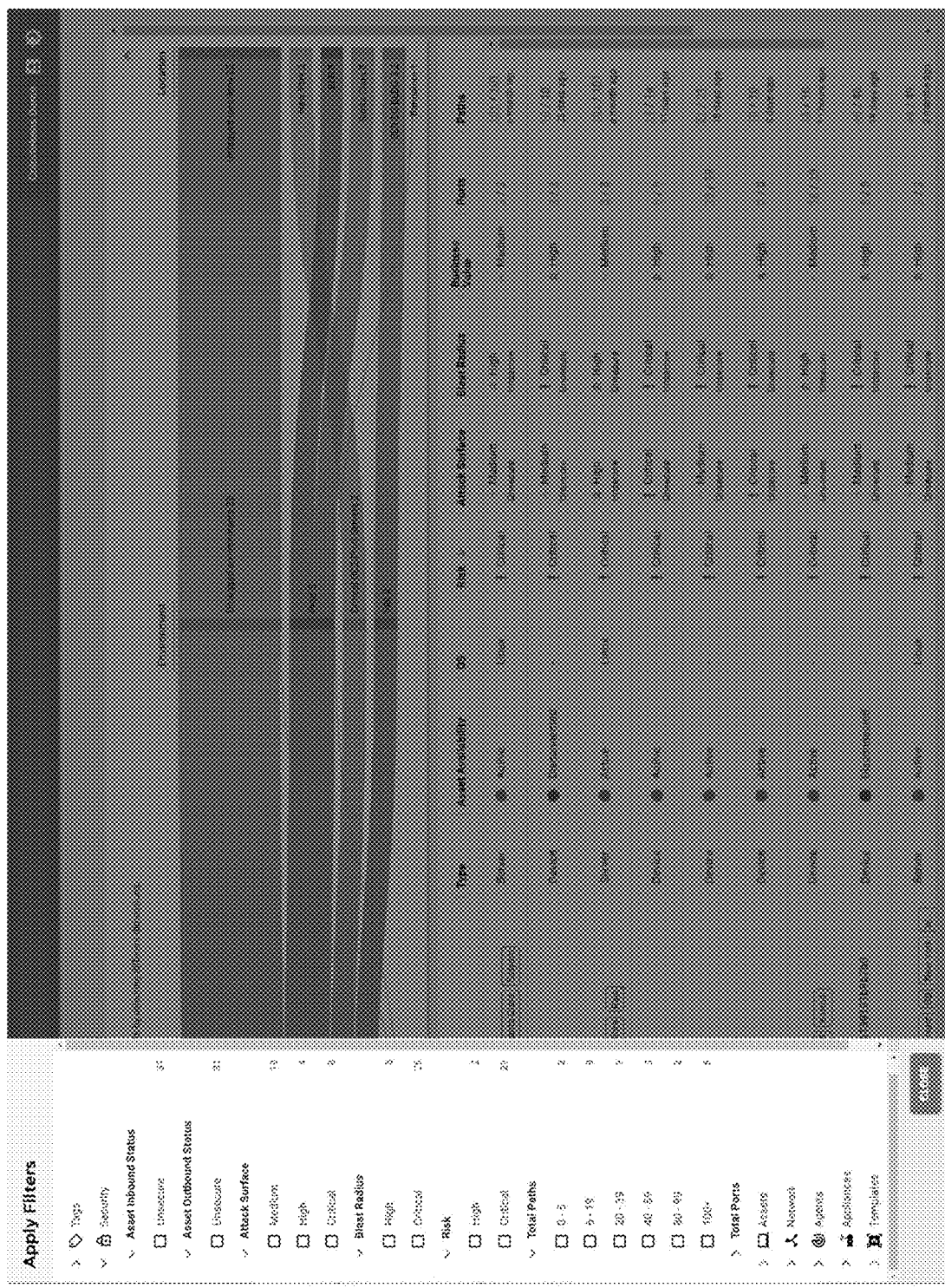
Figure 28:
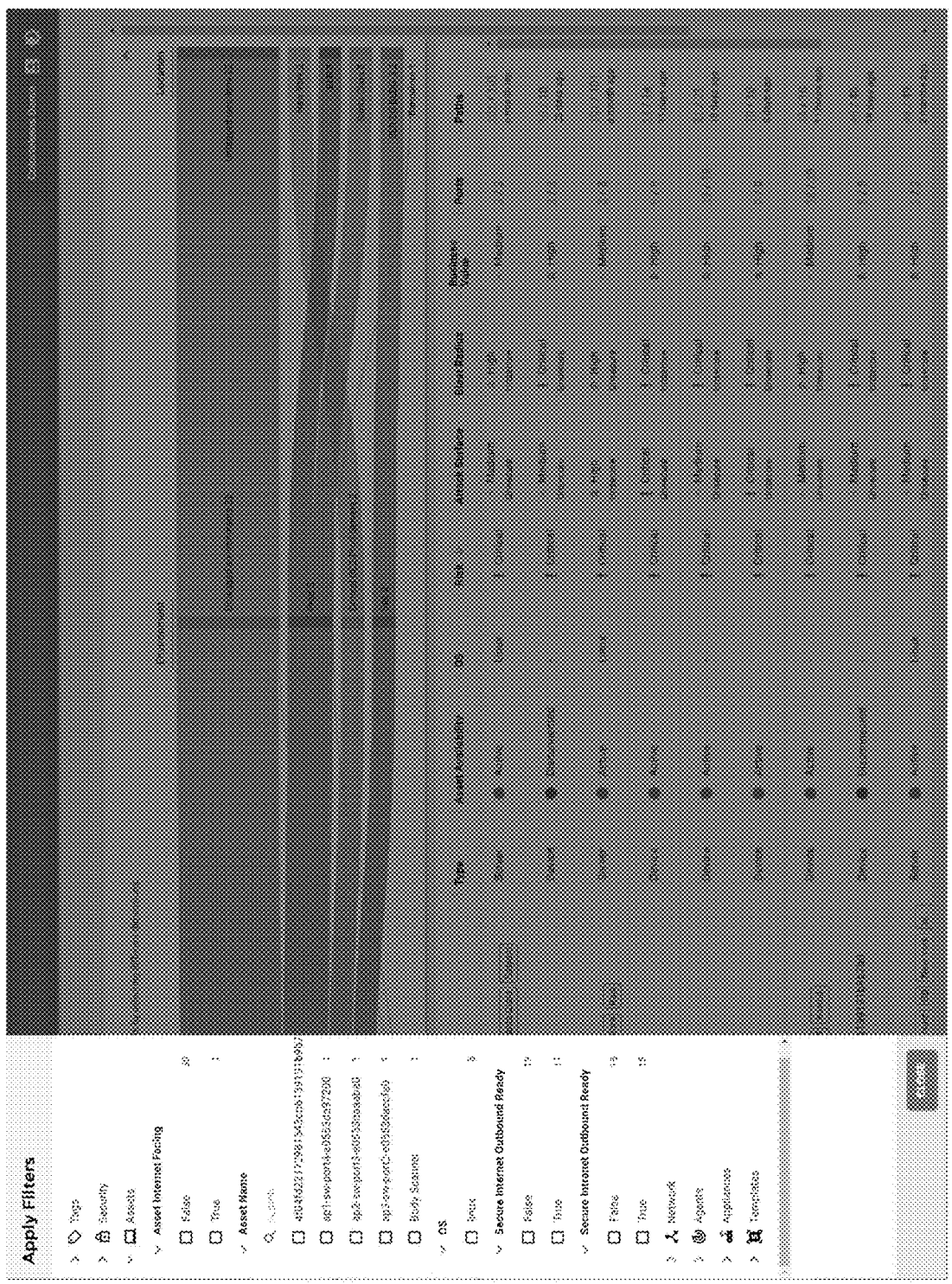
Figure 29:
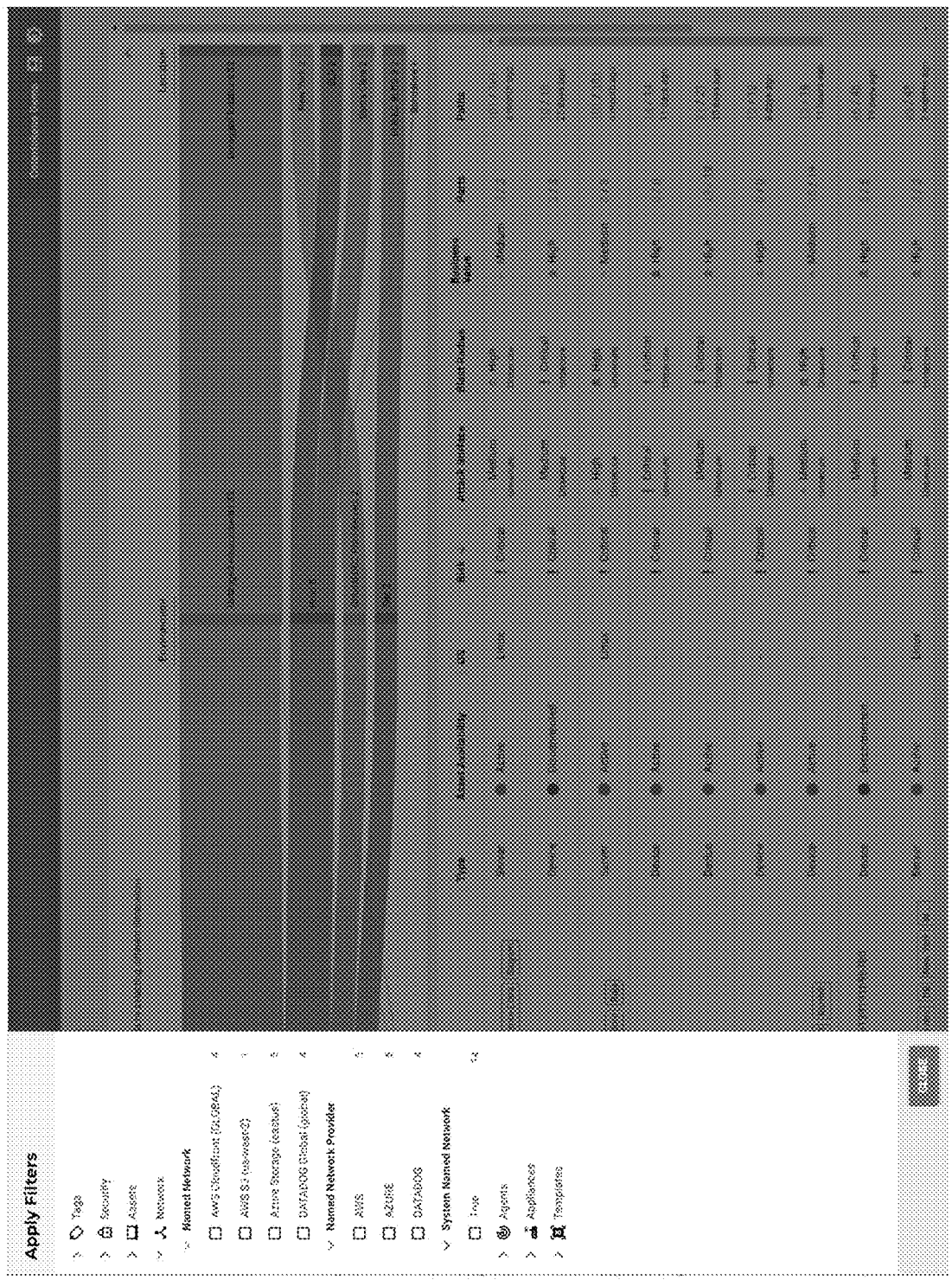
Figure 30:
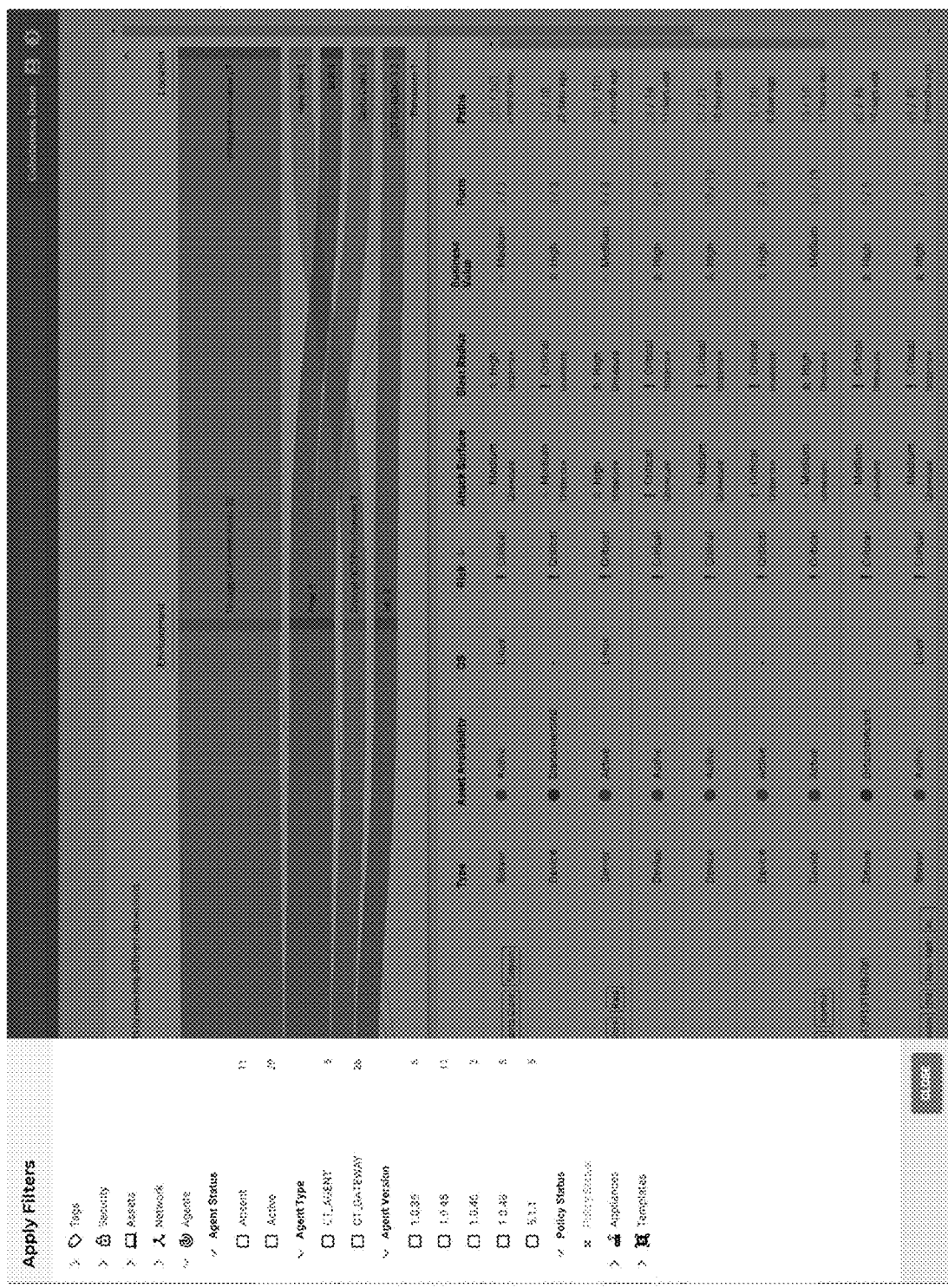
Figure 31:
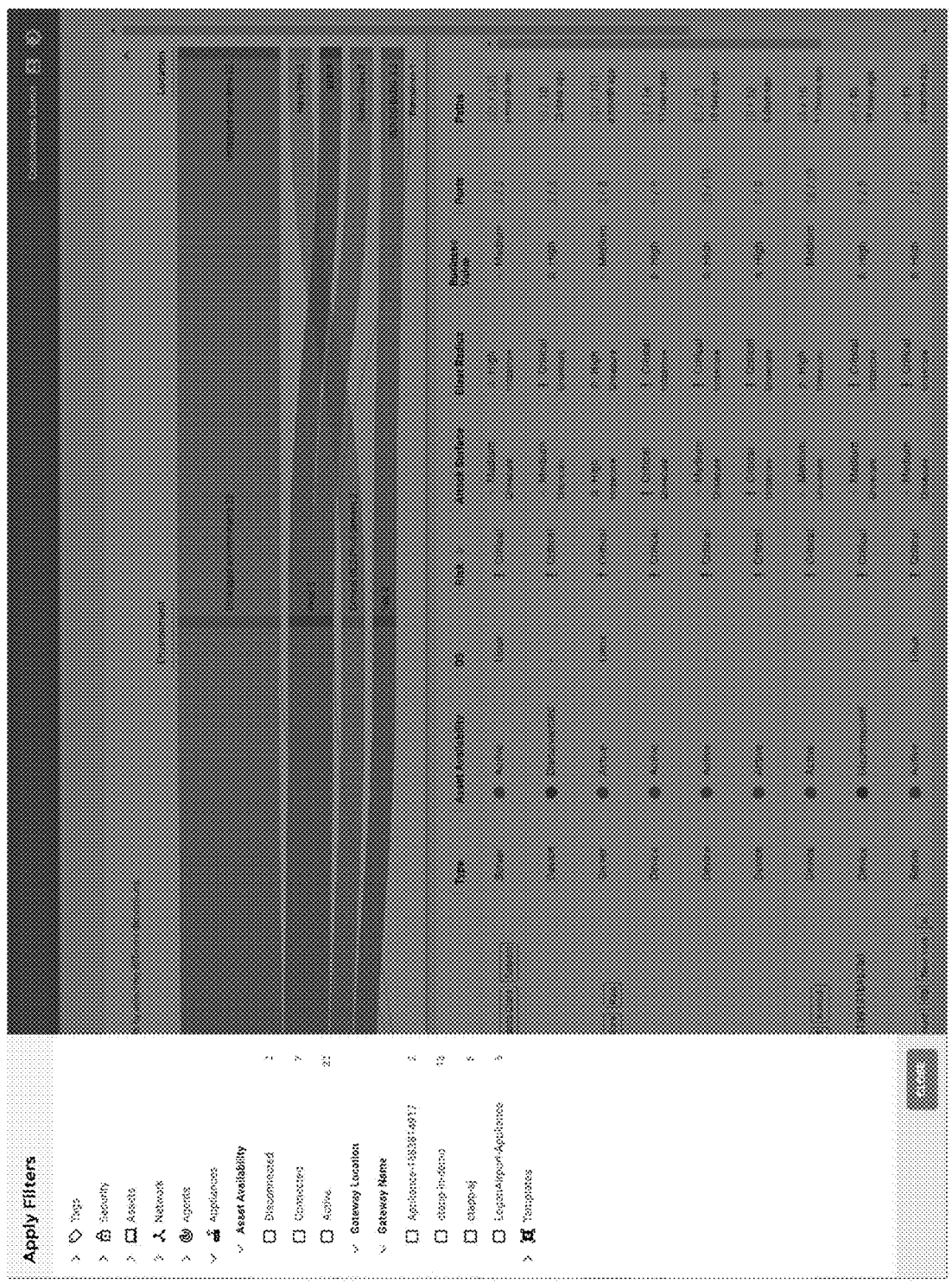
Figure 32:
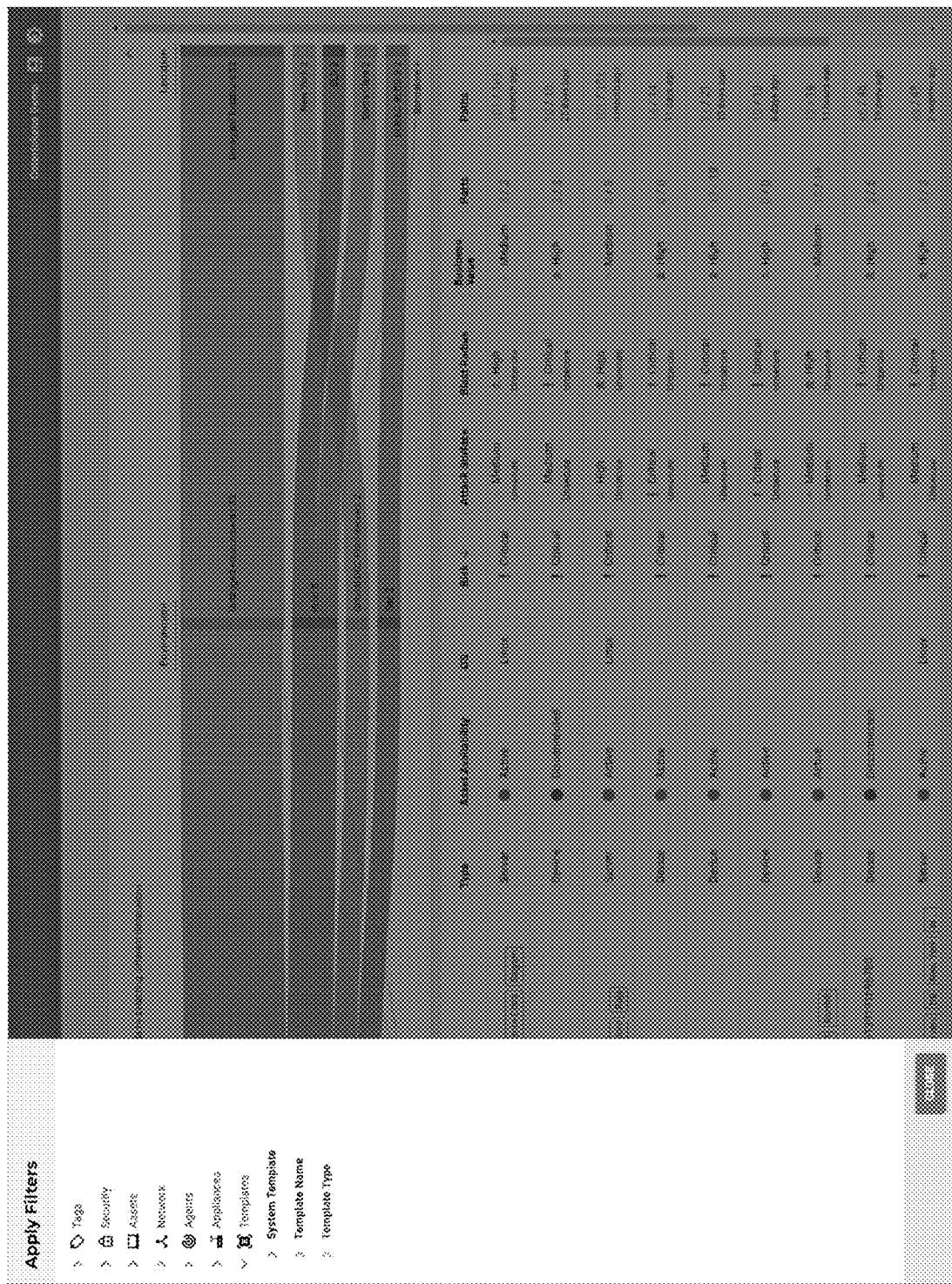
Figure 33:
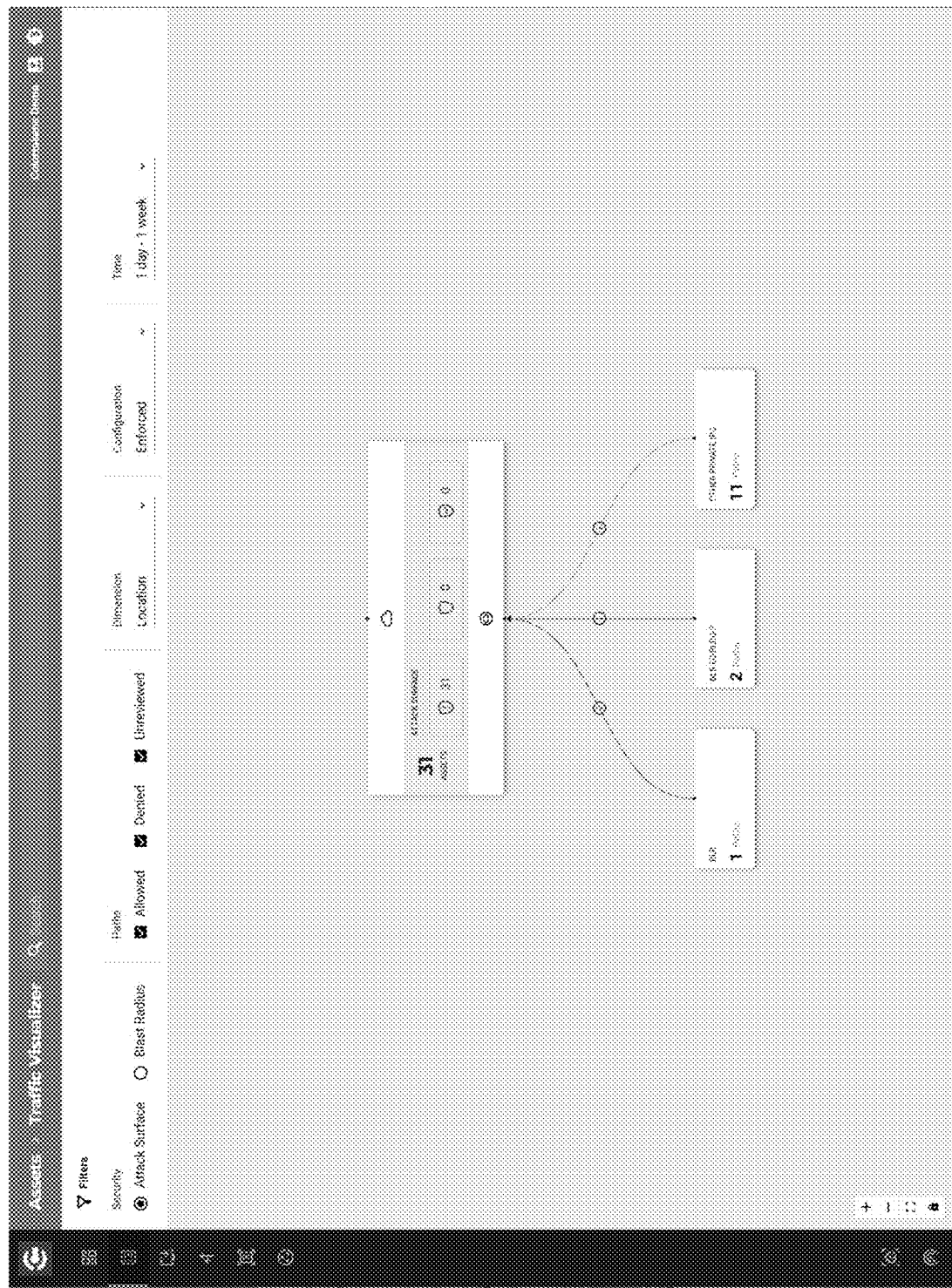
Figure 34:
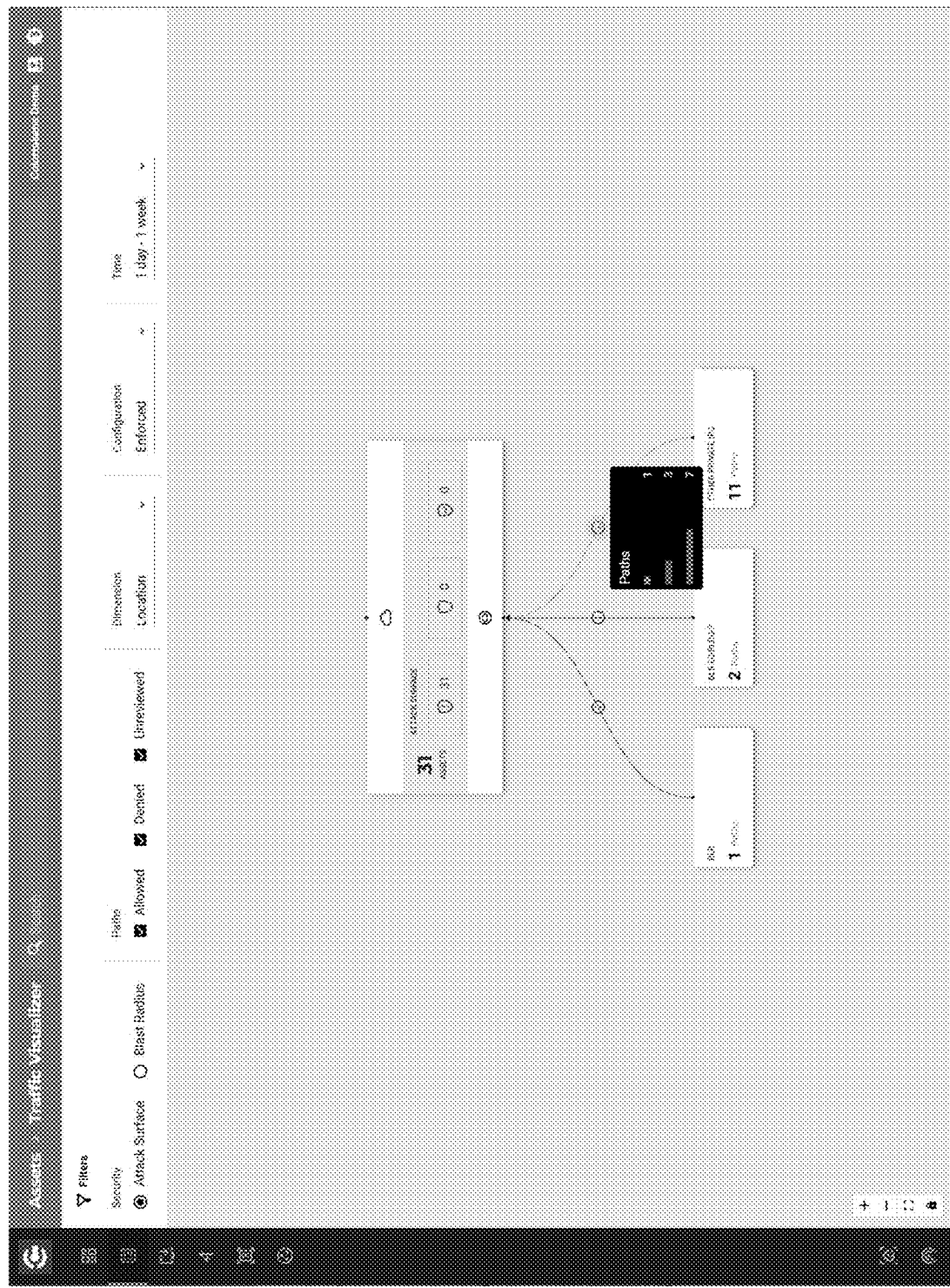
Figure 35:
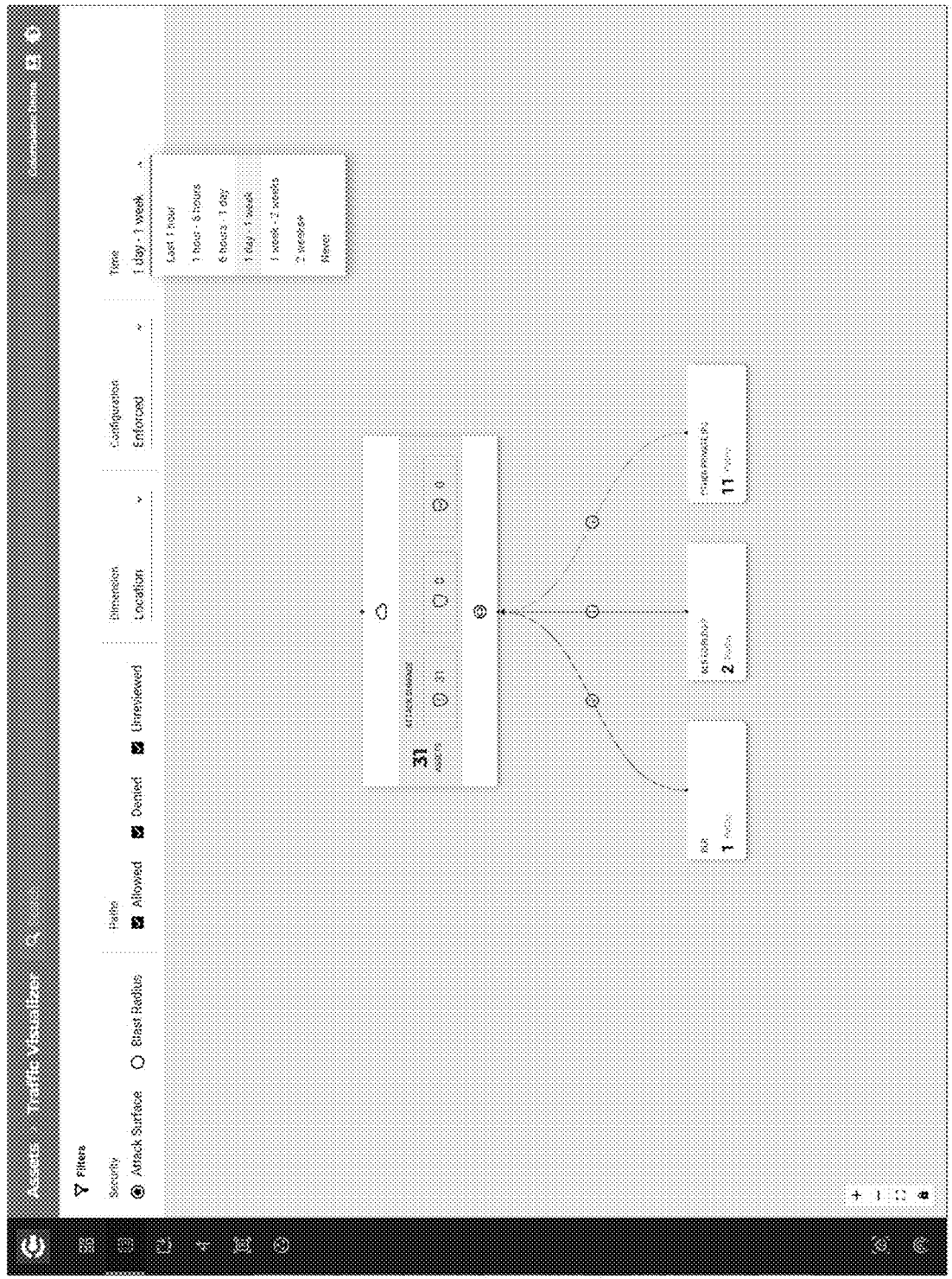
Figure 36:
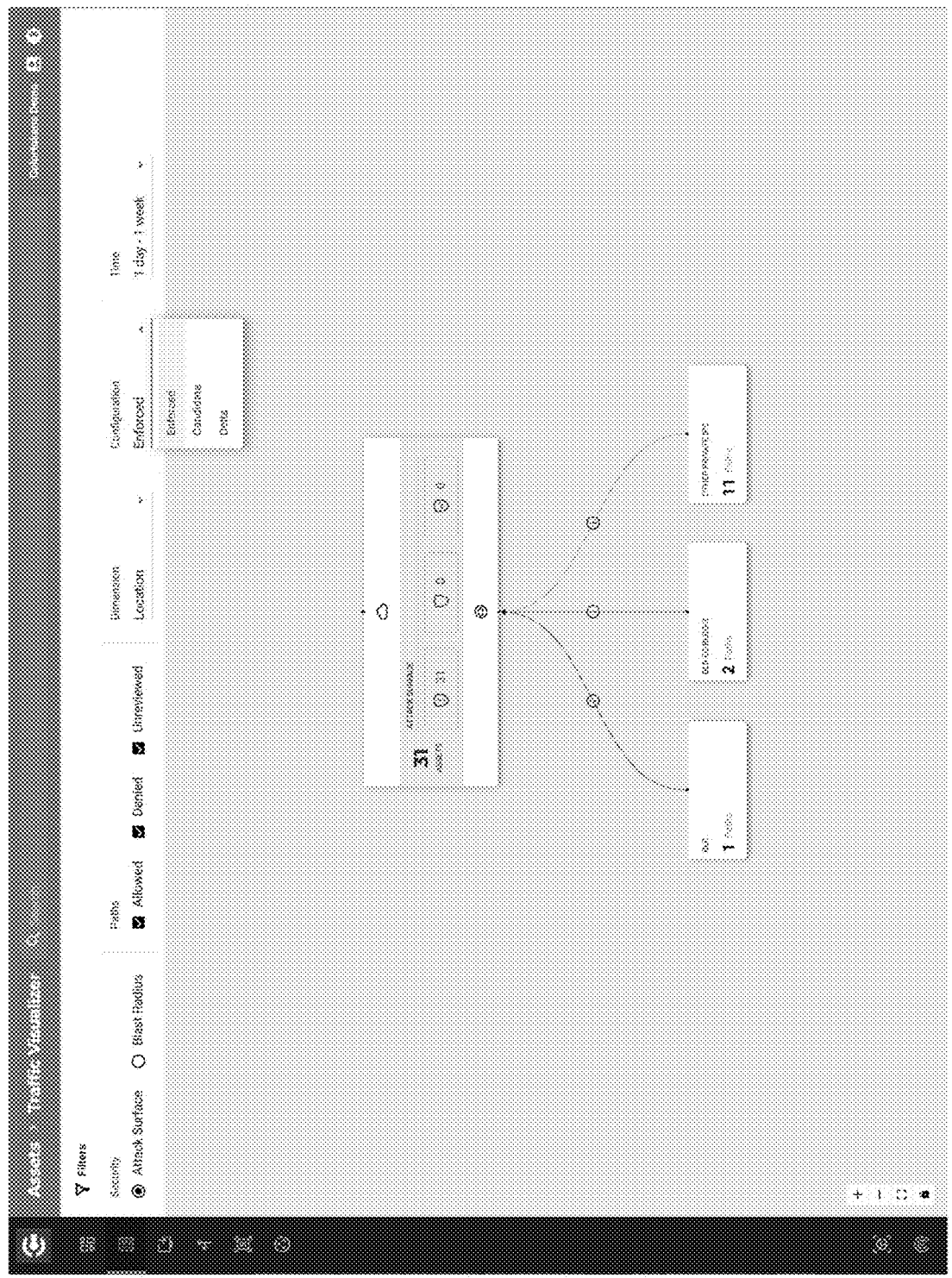
Figure 37:
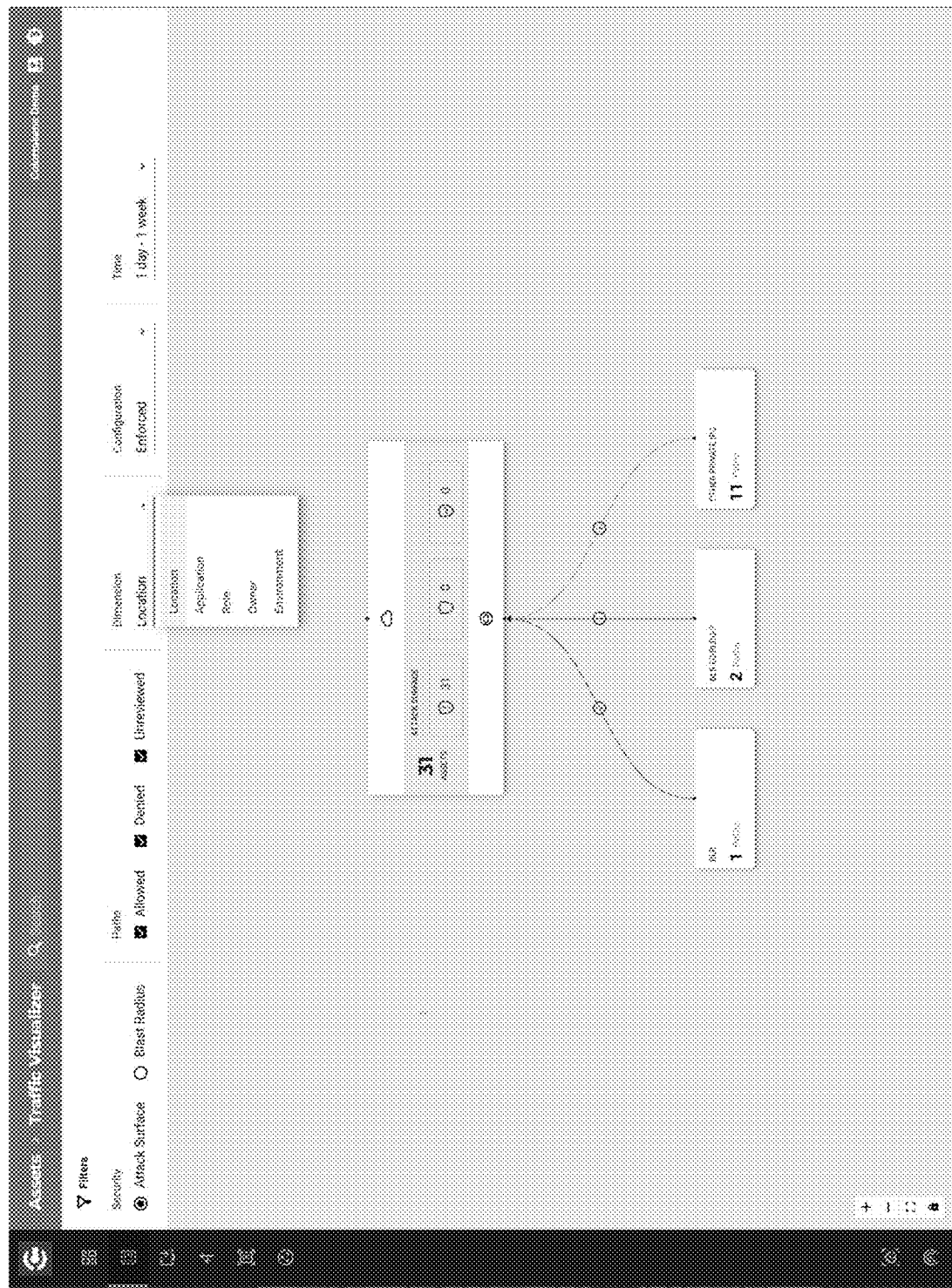
Figure 38:
Figure 39:
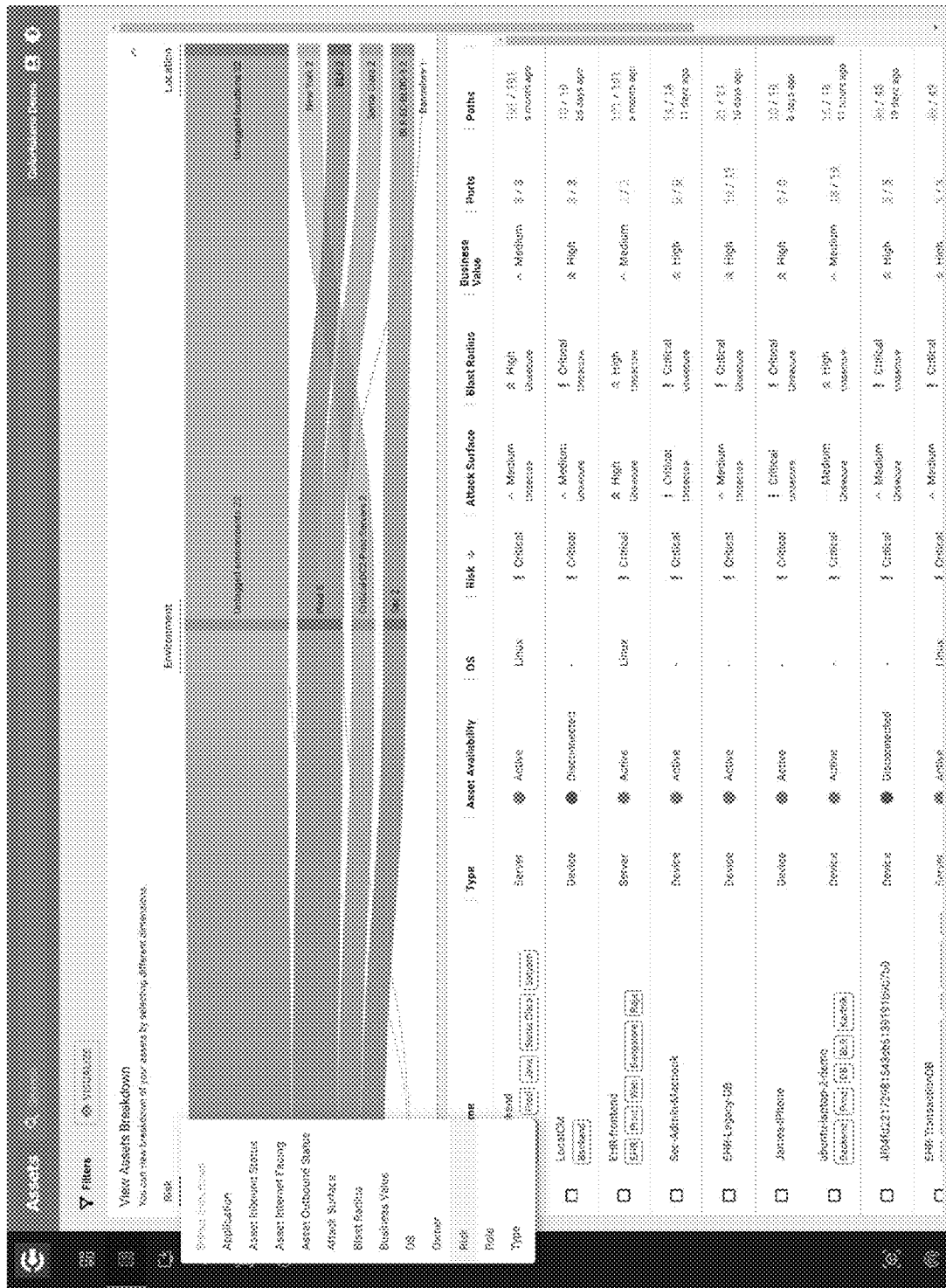
Figure 44:
Figure 45:
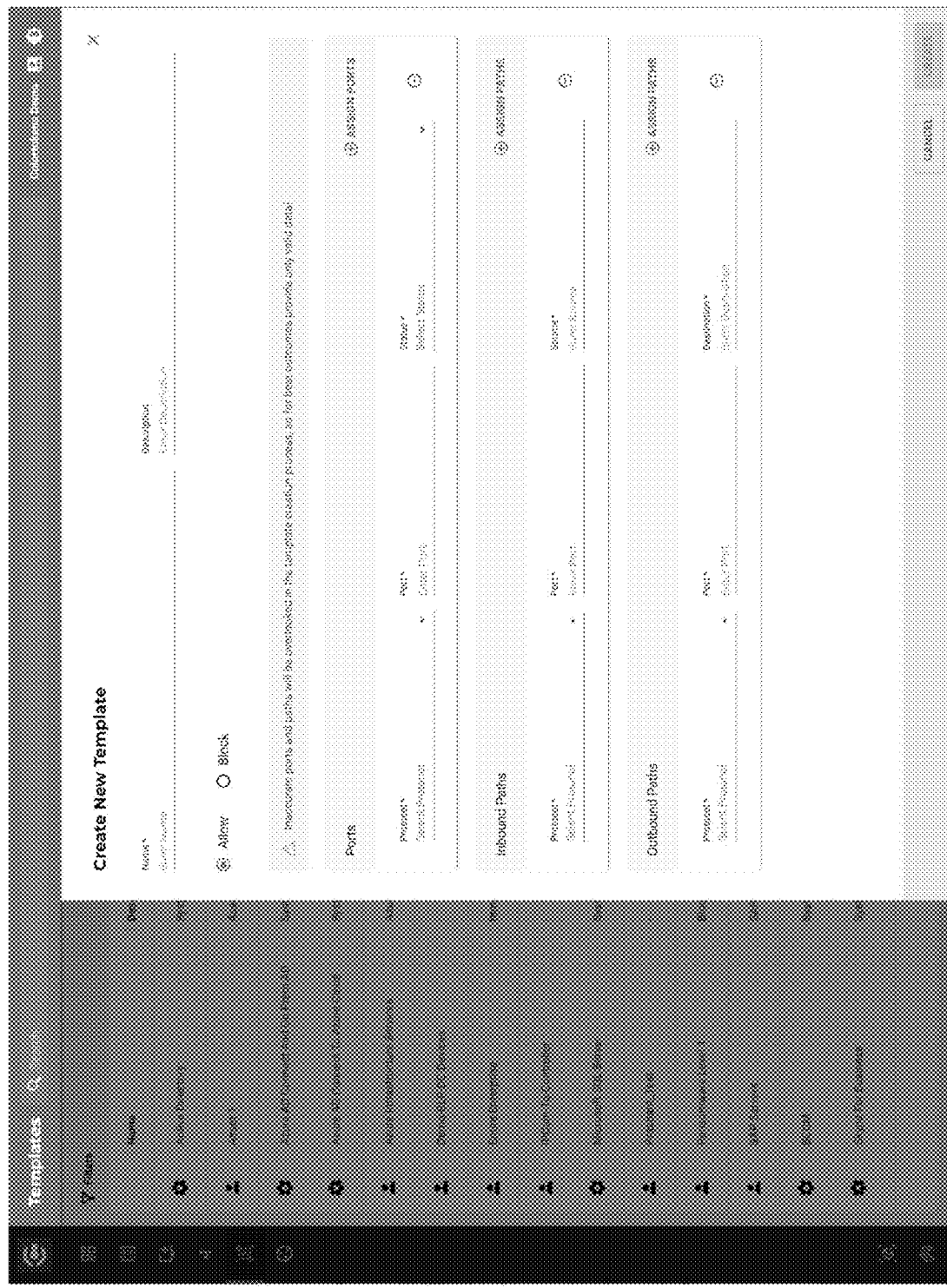
Figure 46:
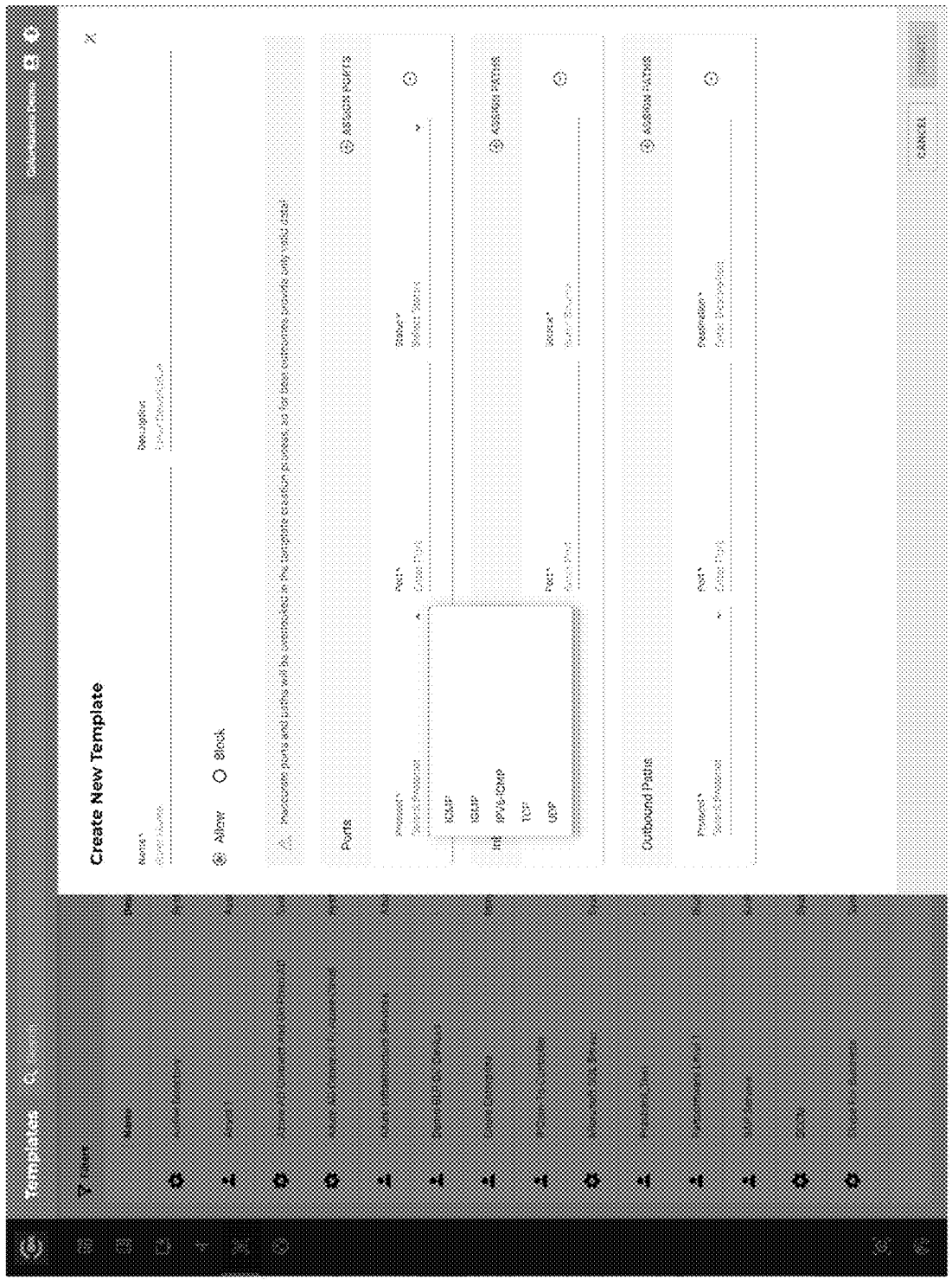
Figure 47:
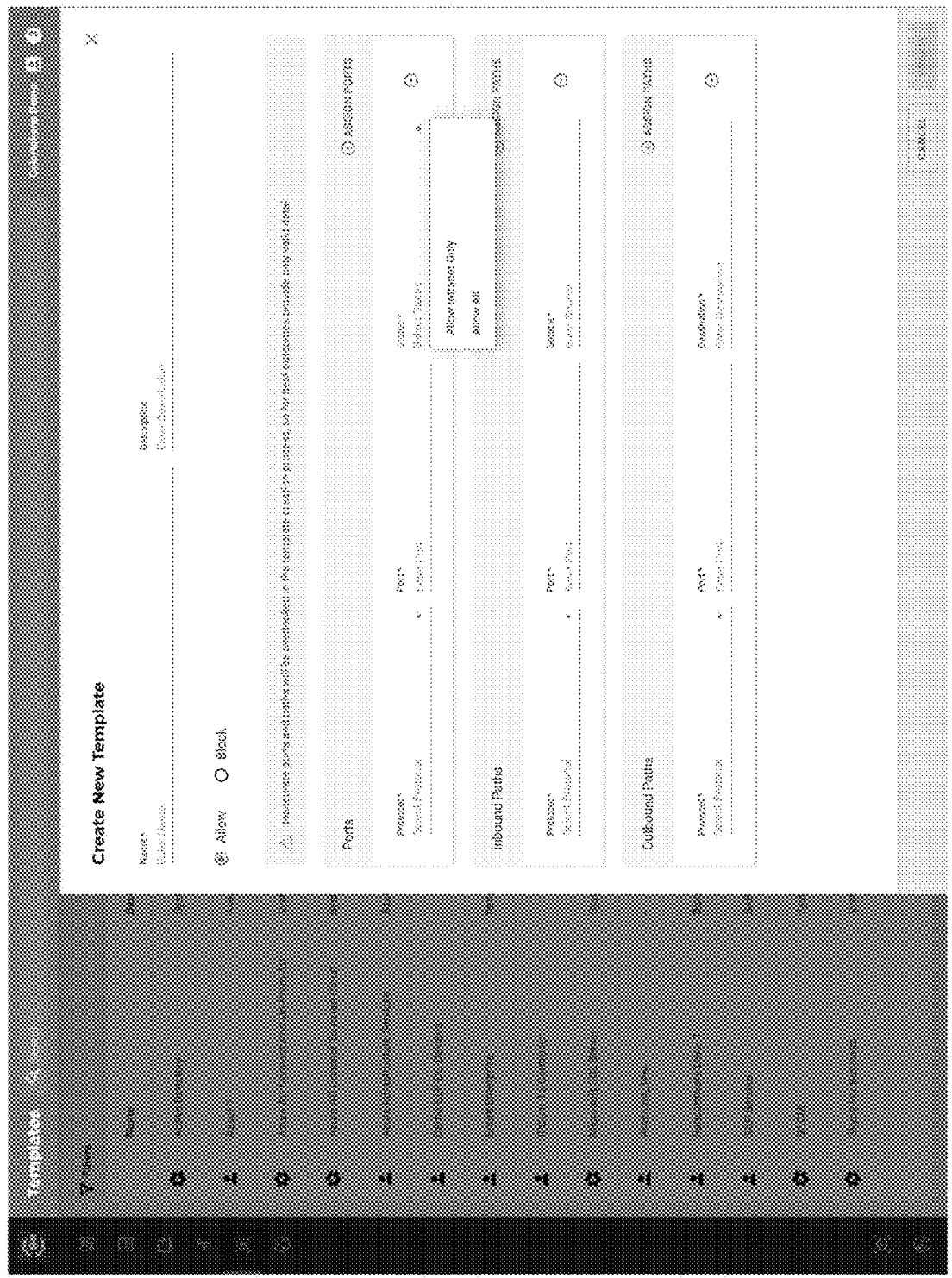
Figure 48:
Figure 49:
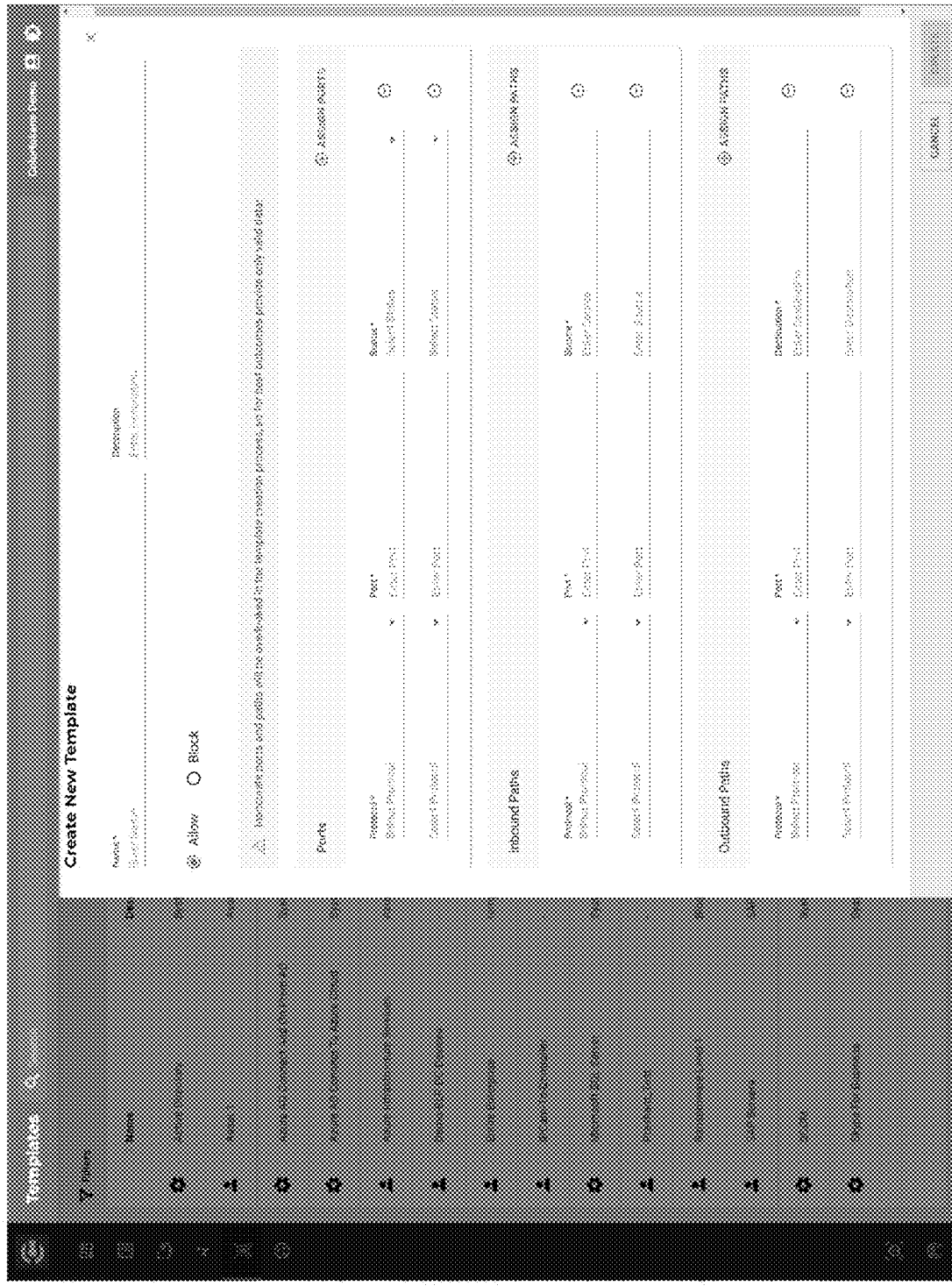
Figure 50:
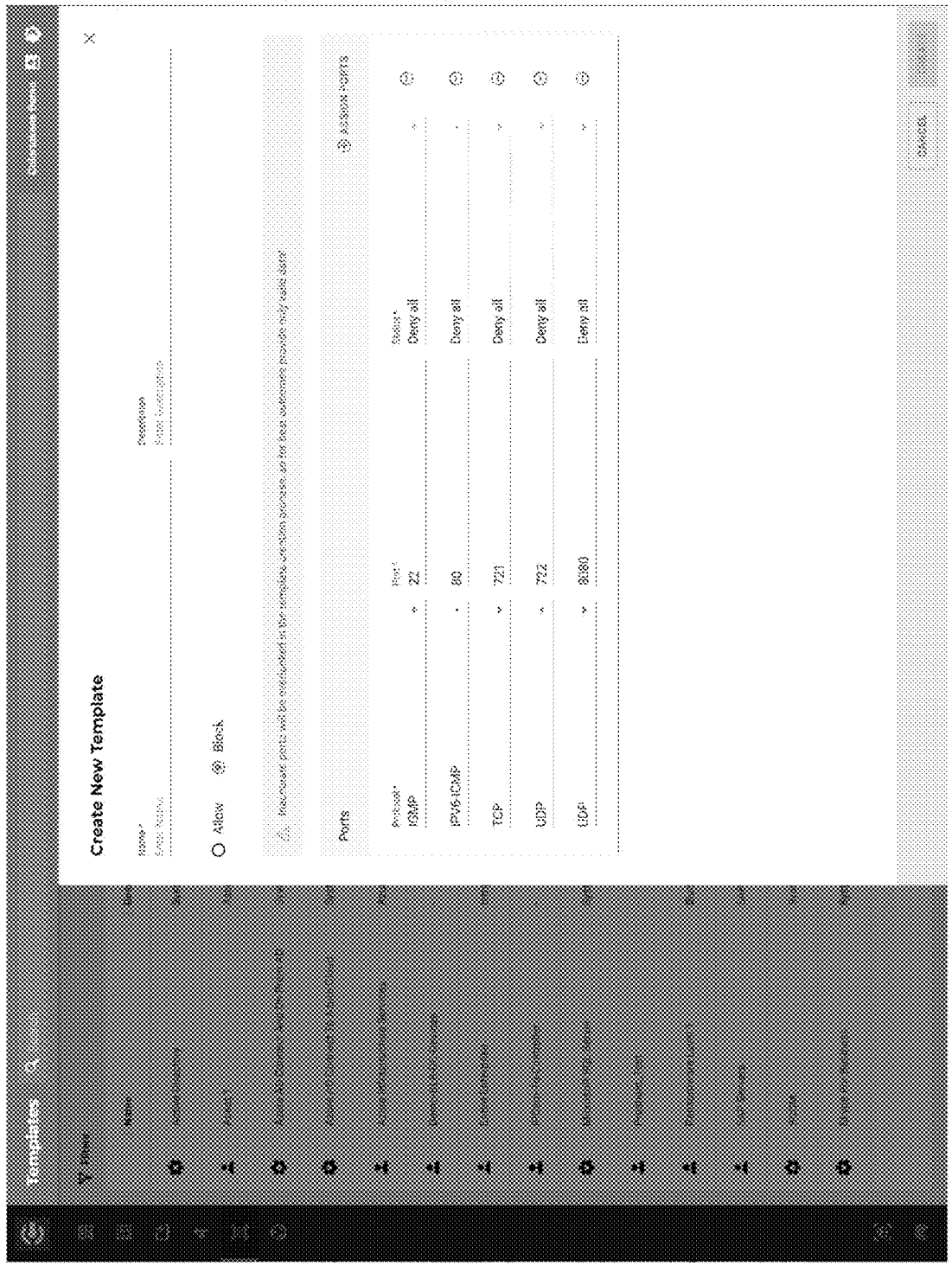
Figure 51:
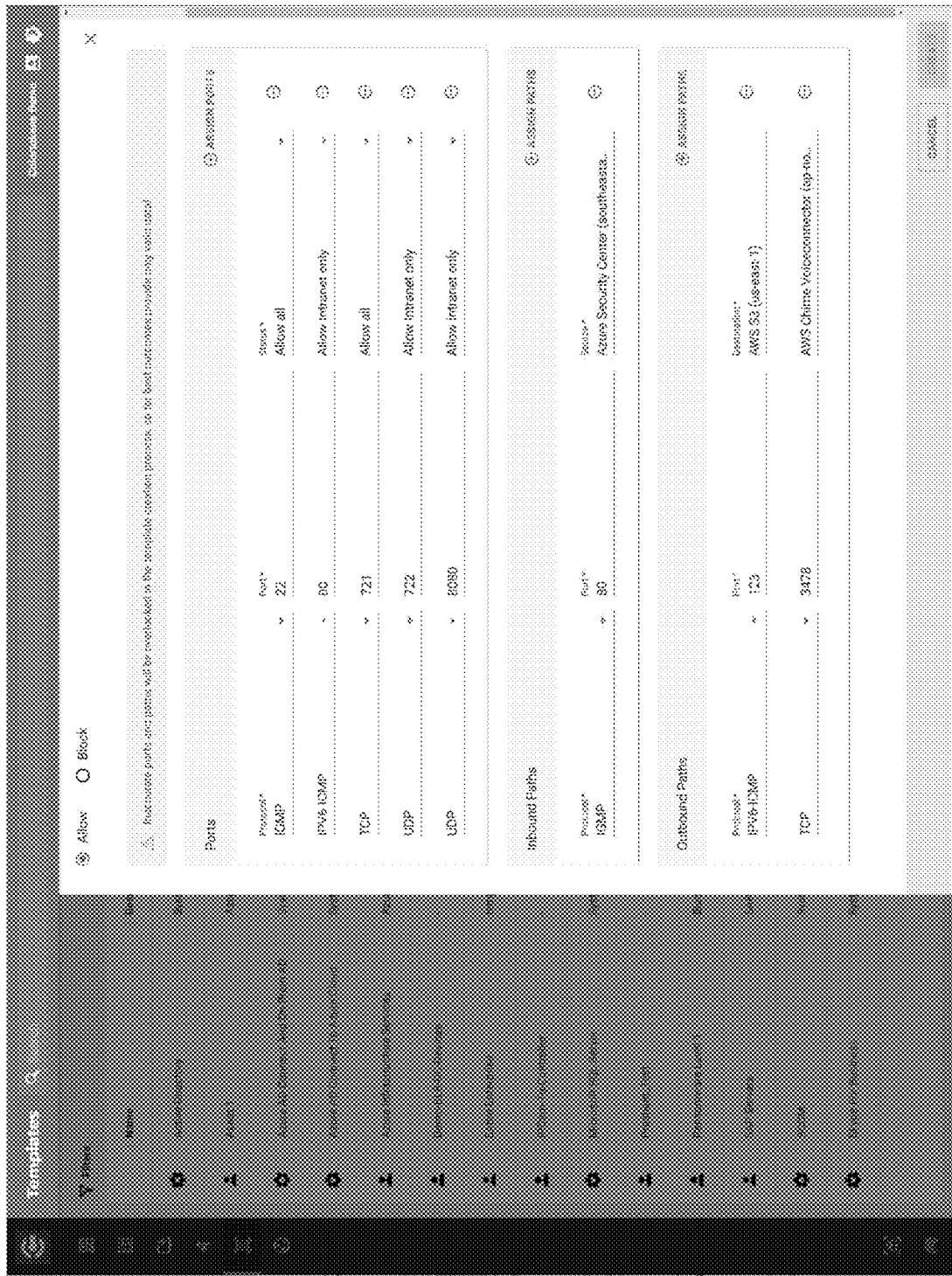
Figure 52:
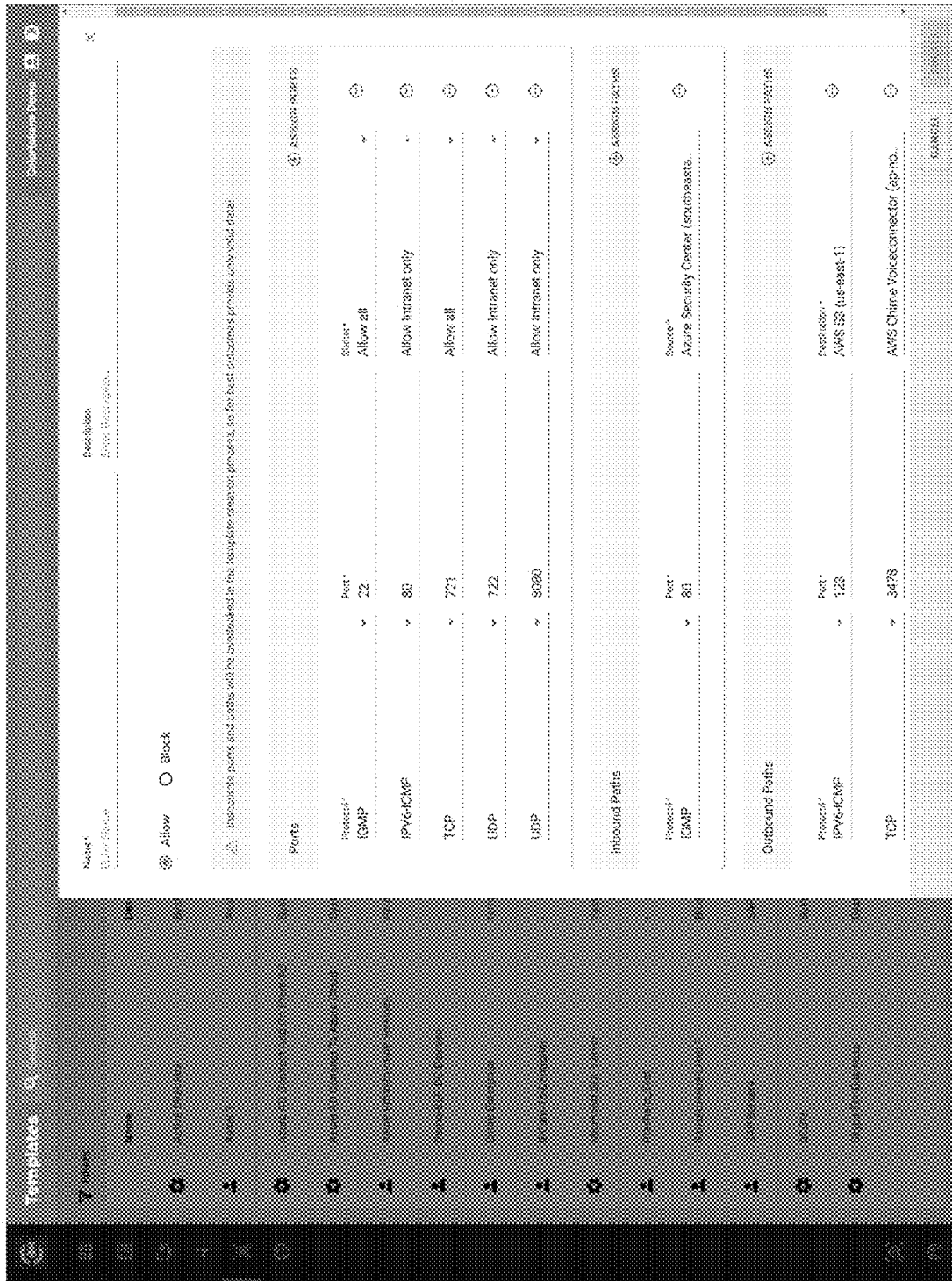
Figure 55:
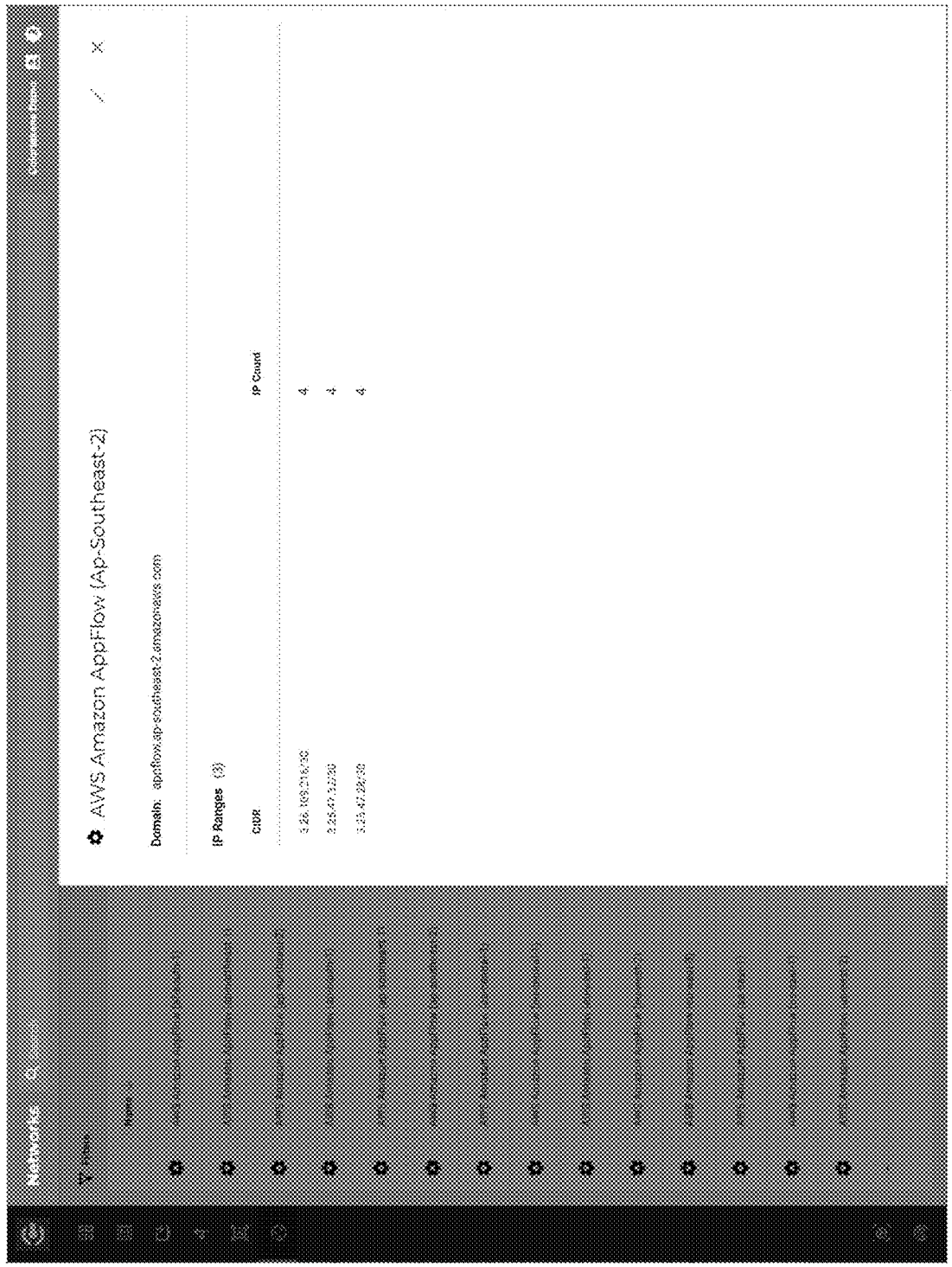
Figure 56:
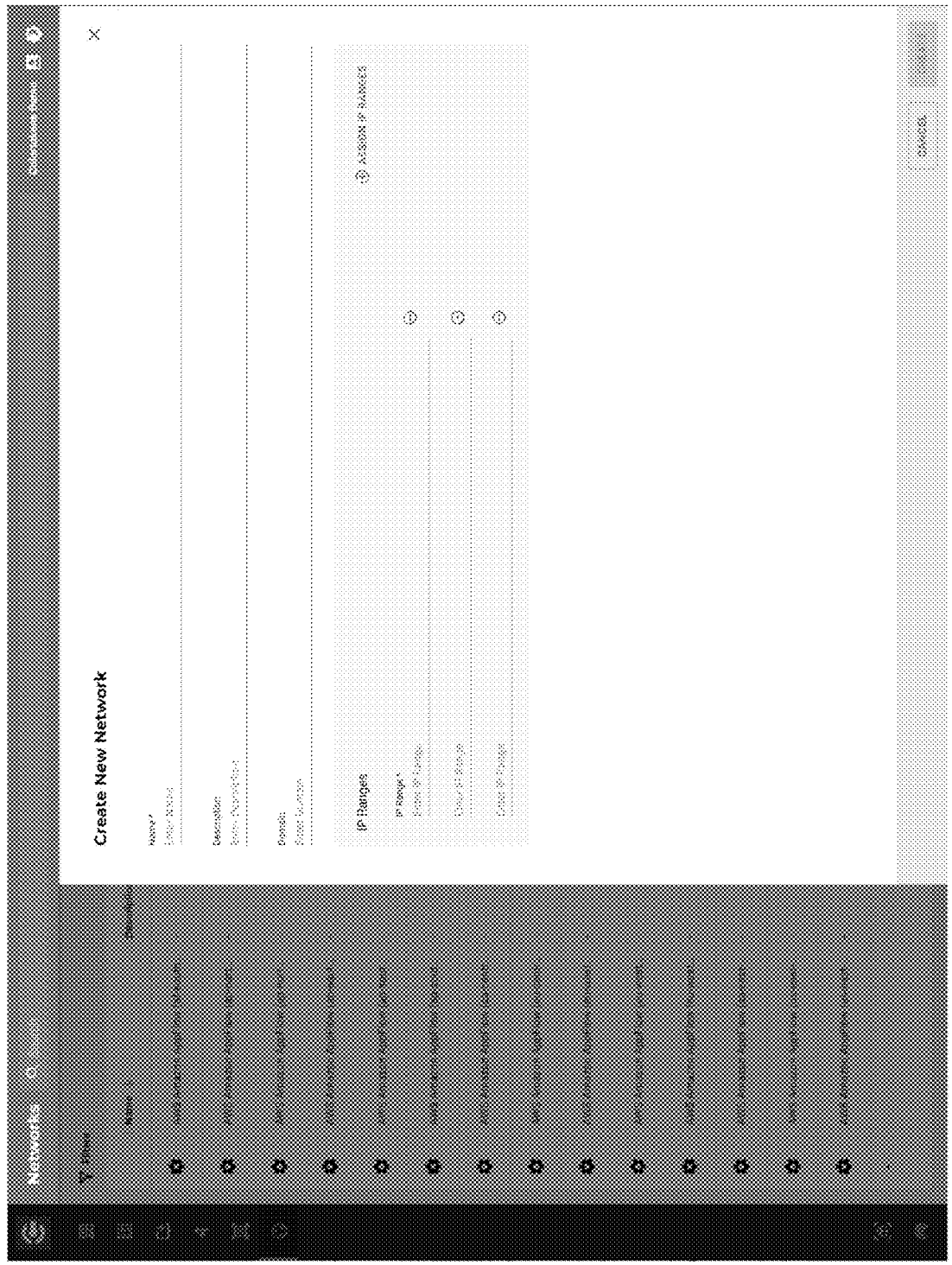
Figure 57:
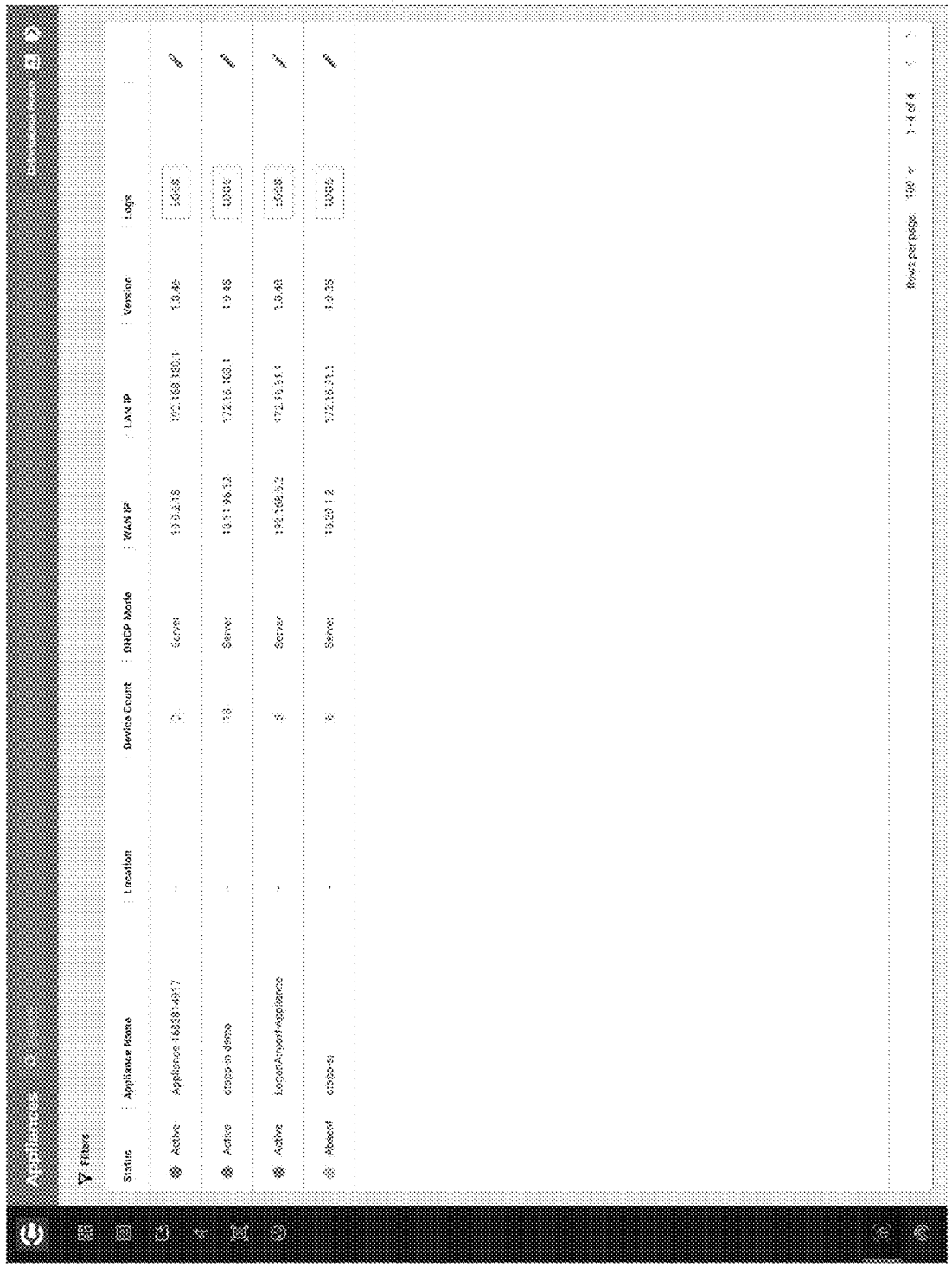
Figure 58:
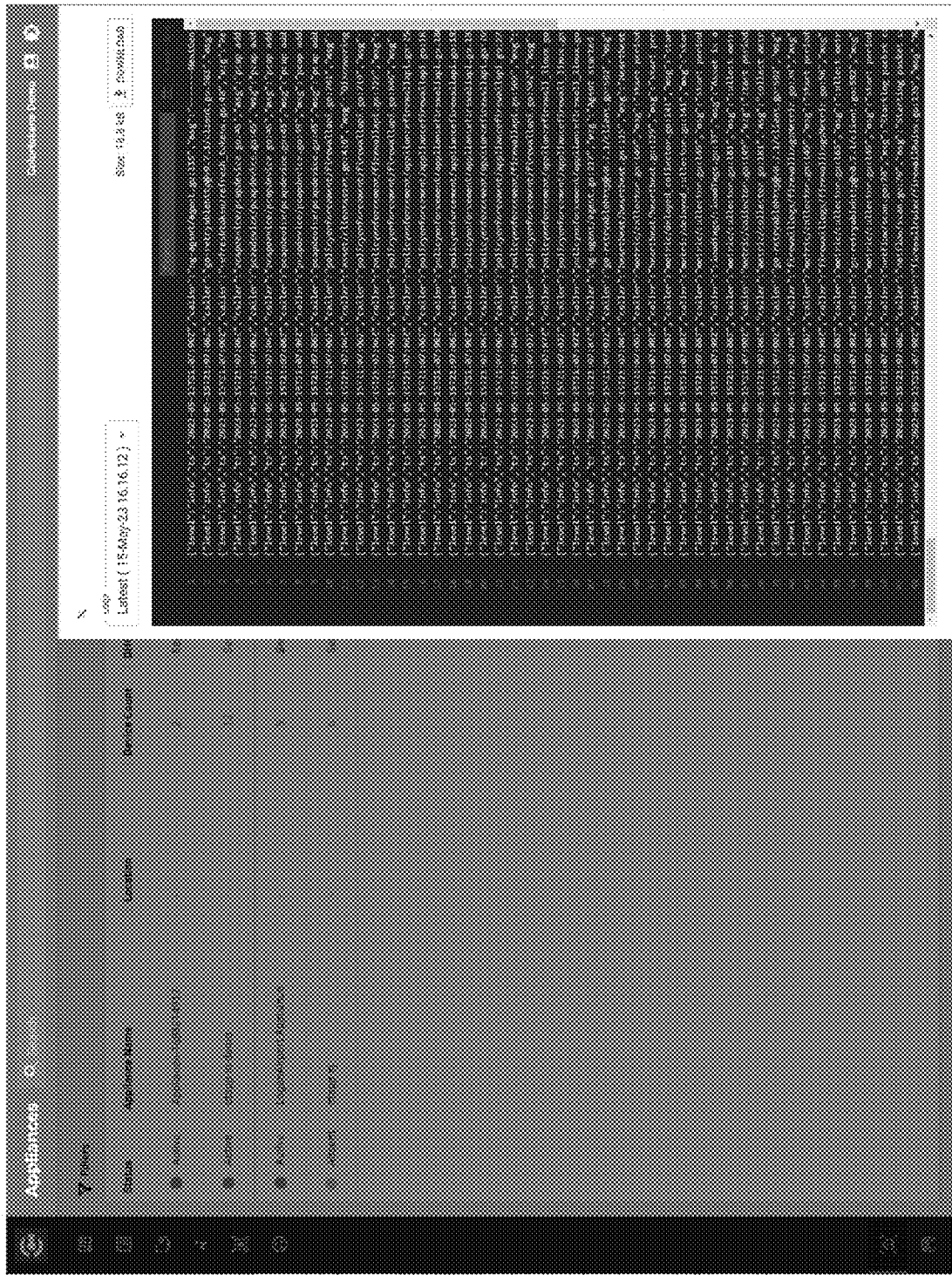
Figure 60:
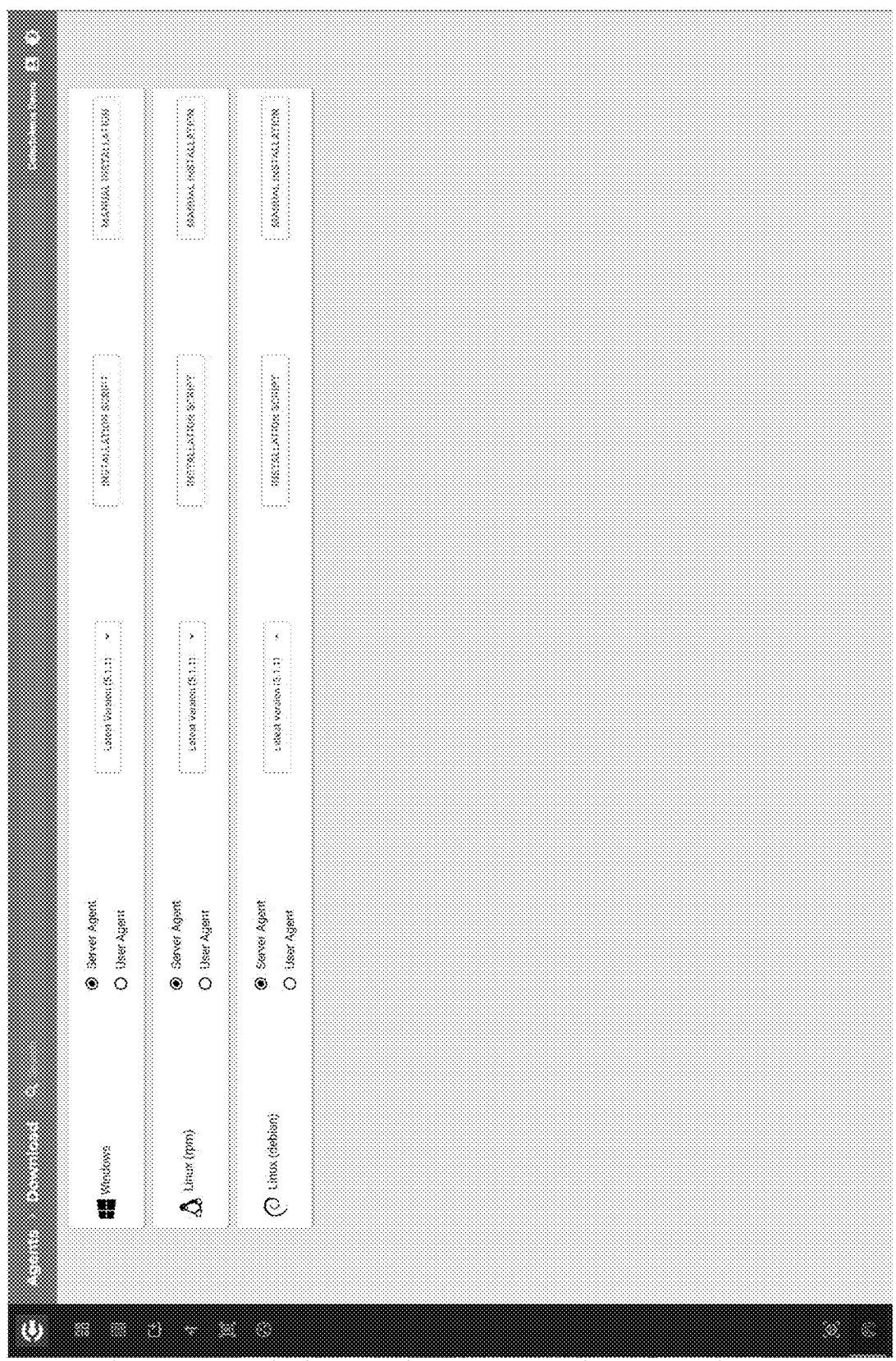
Figure 61:
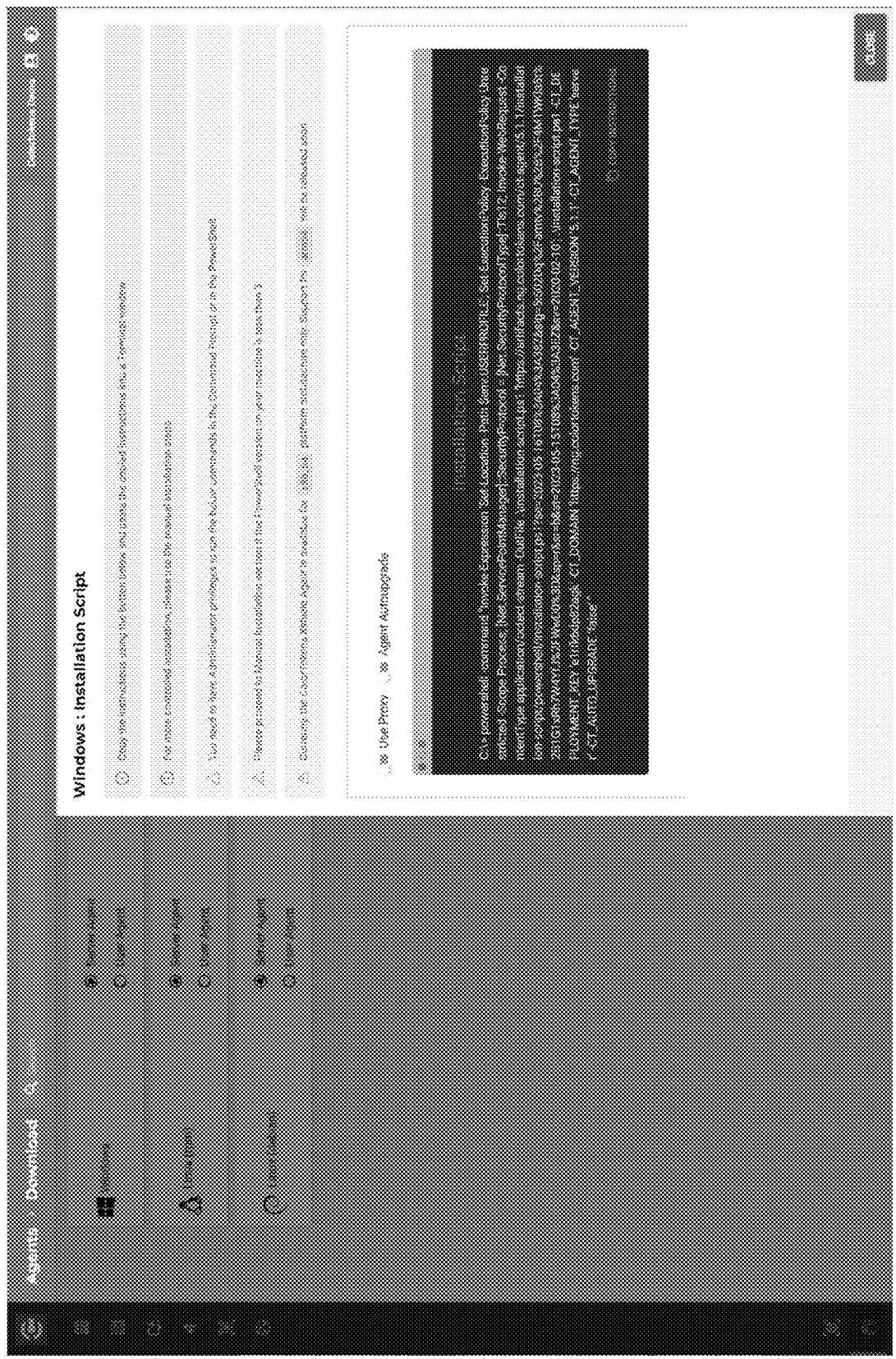
Figure 62:
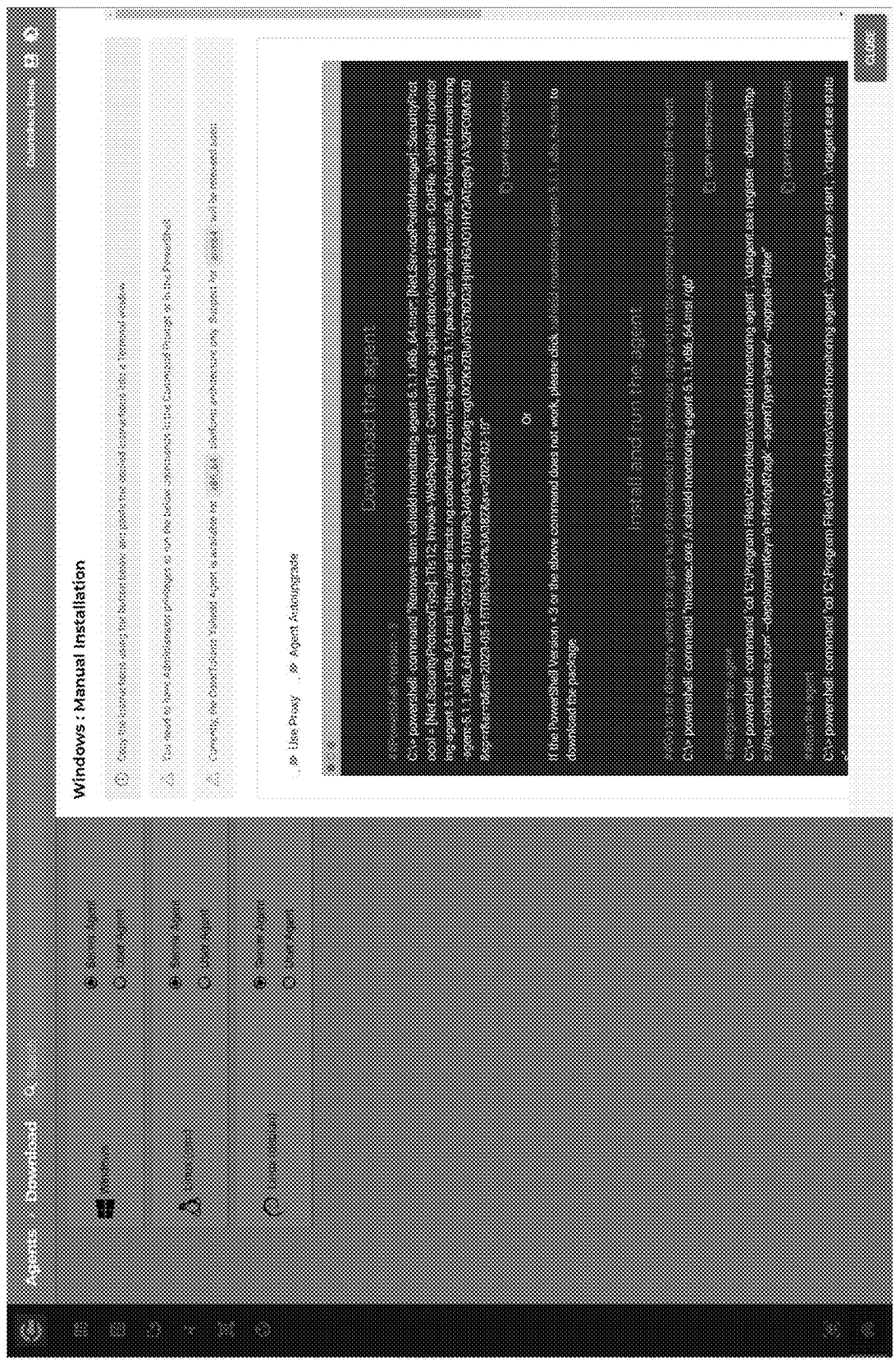
Figure 63:
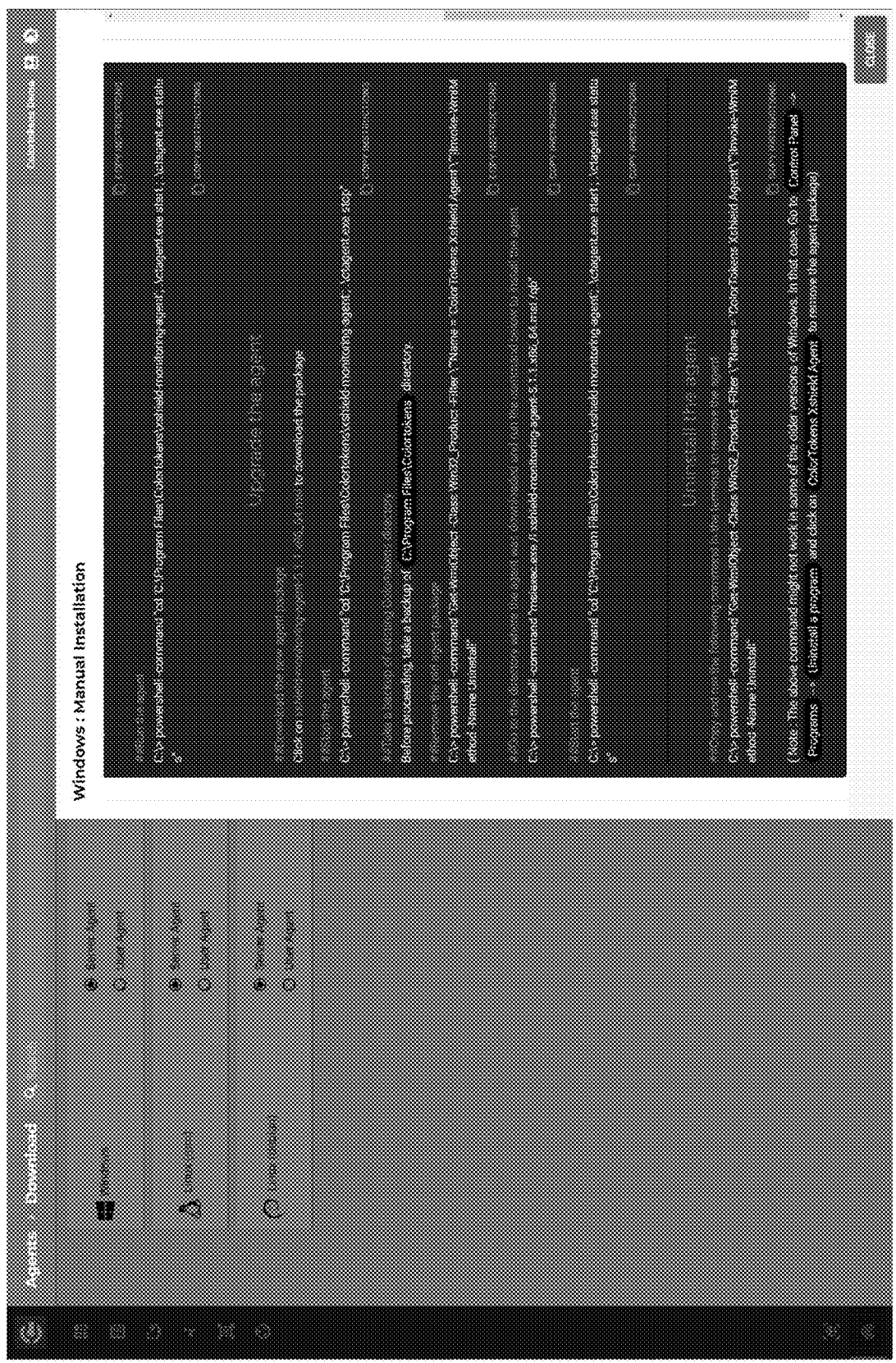
Figure 64:
Figure 65:
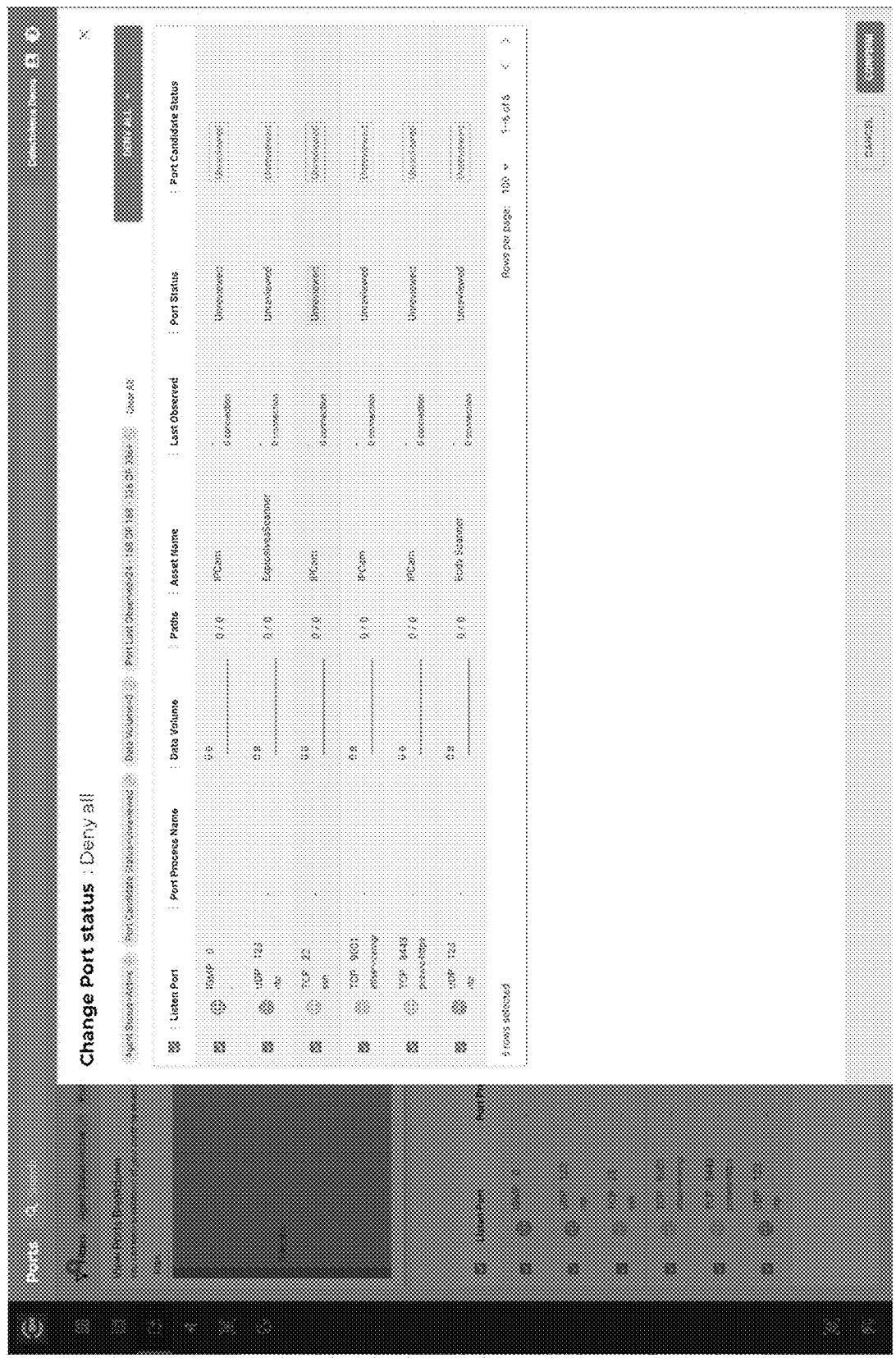
Figure 66:
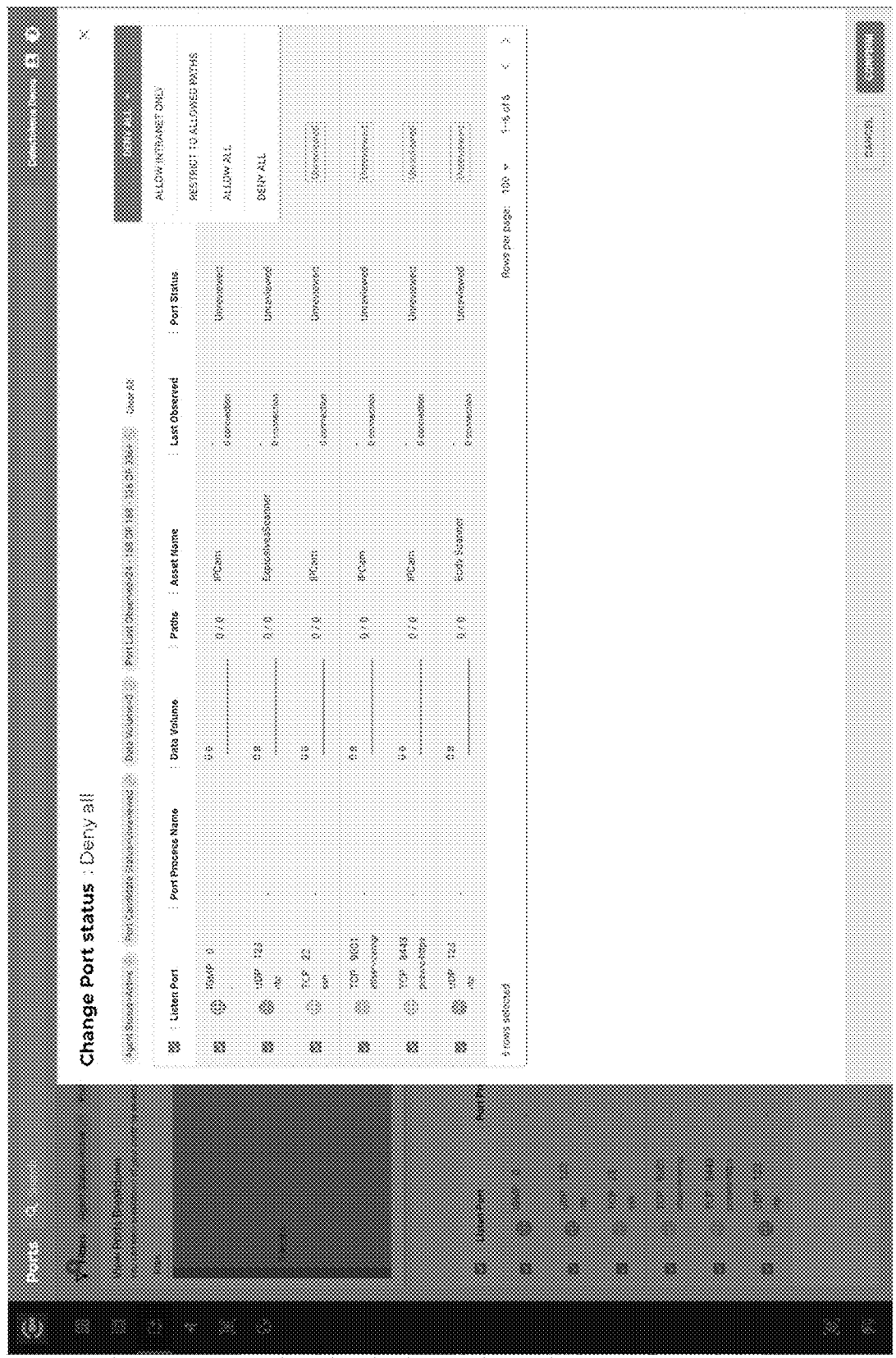
Figure 67:
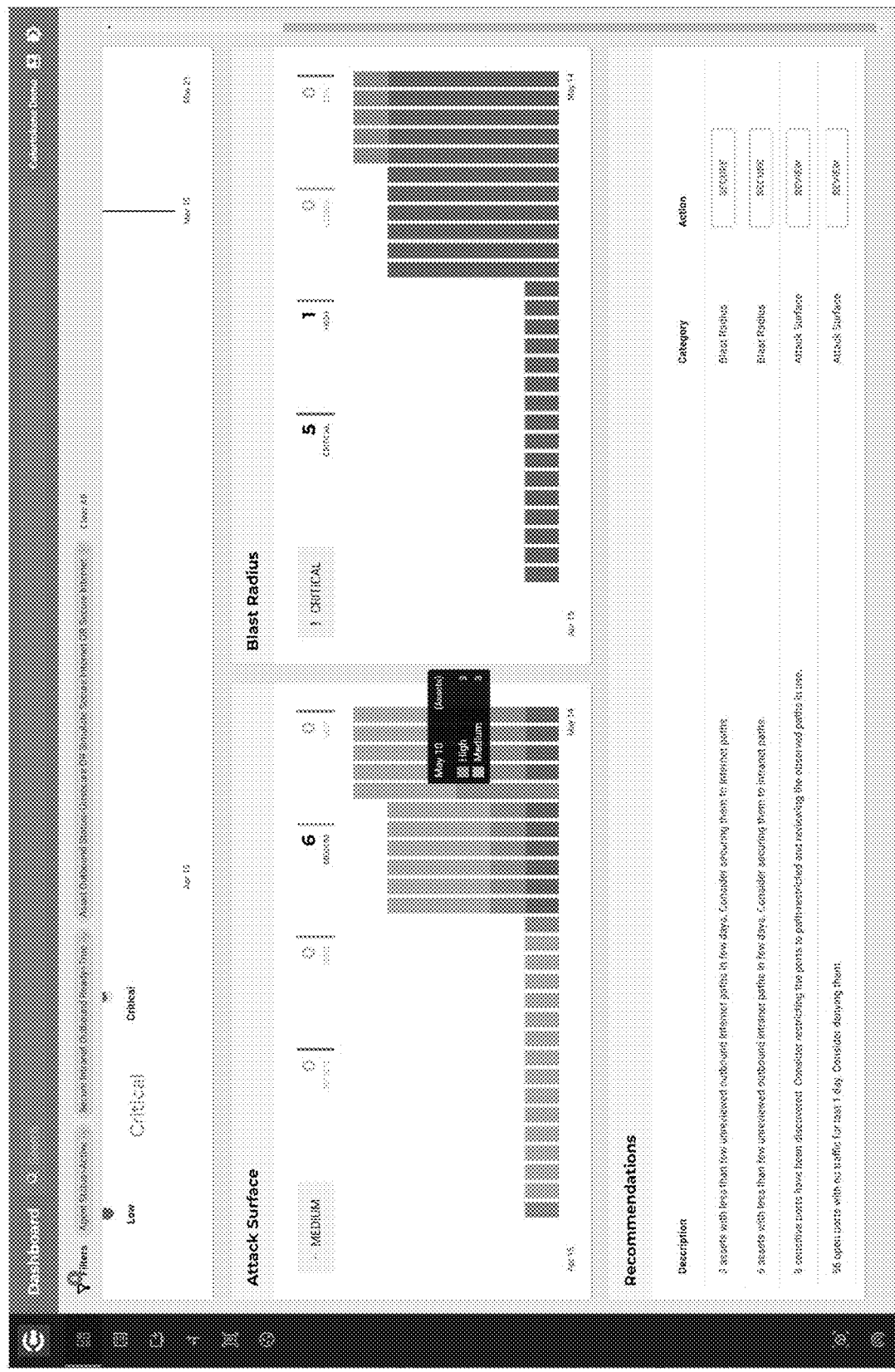
Figure 68:
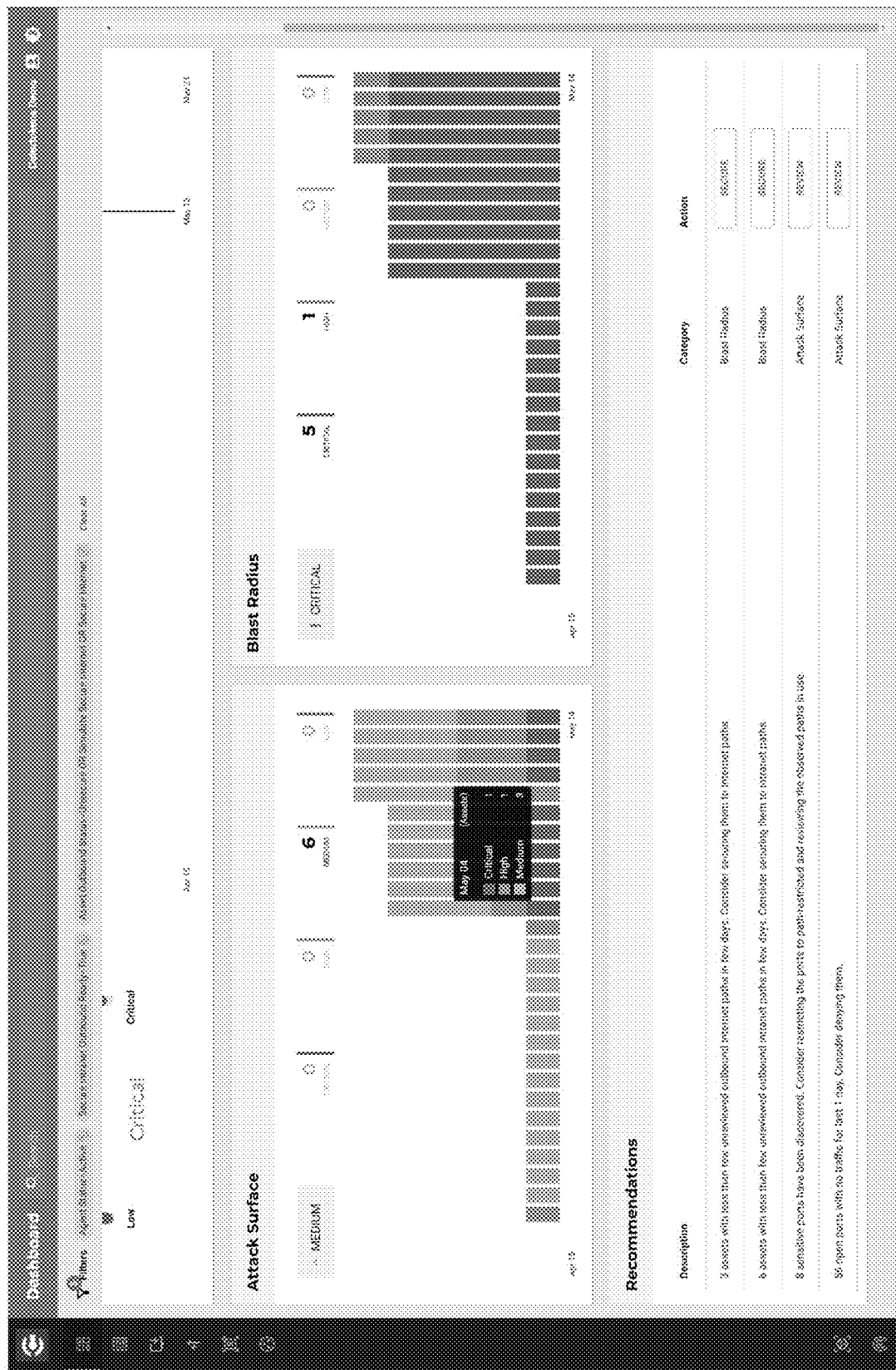
Figure 69:
Figure 72:
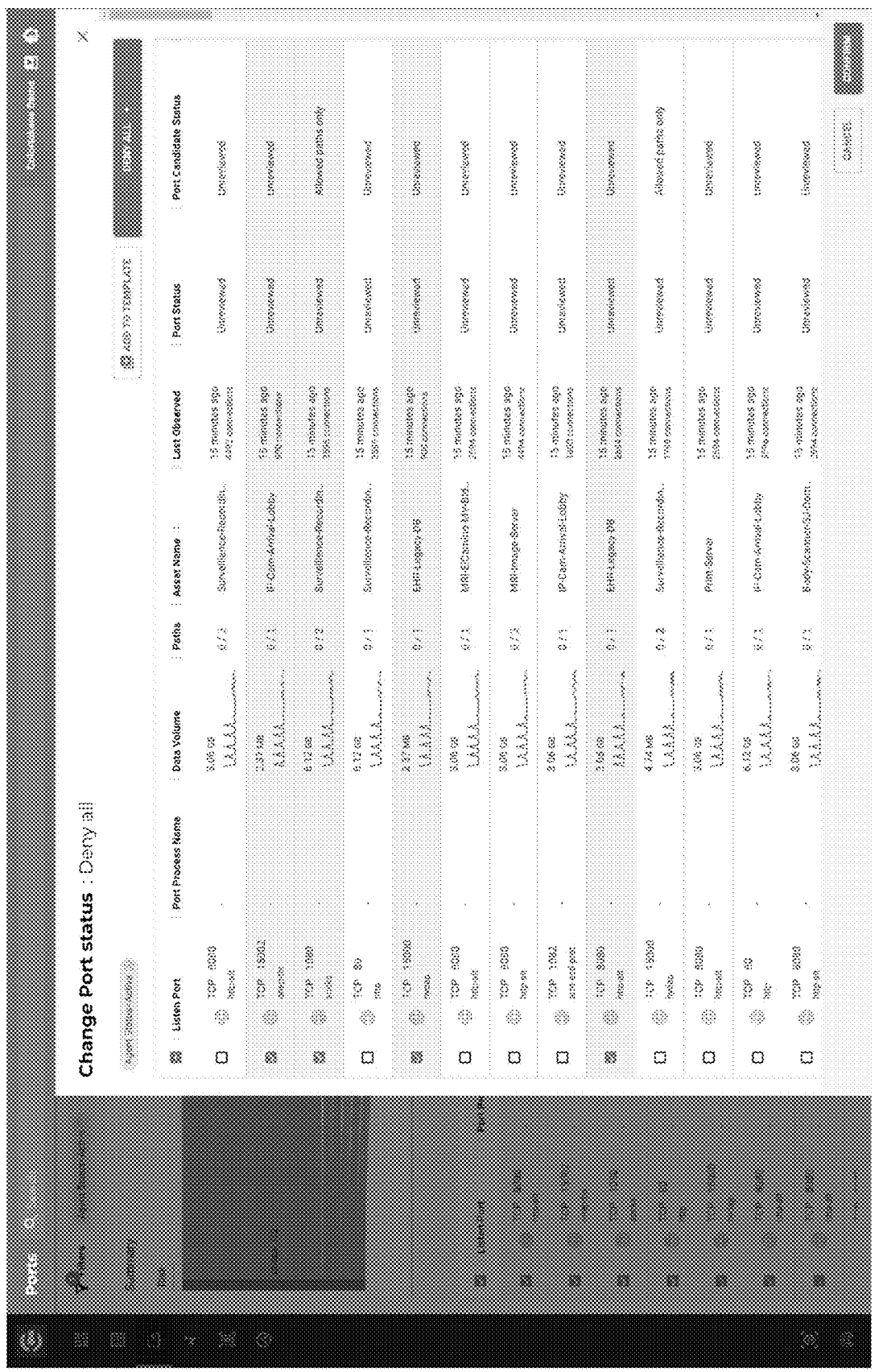
Figure 73:
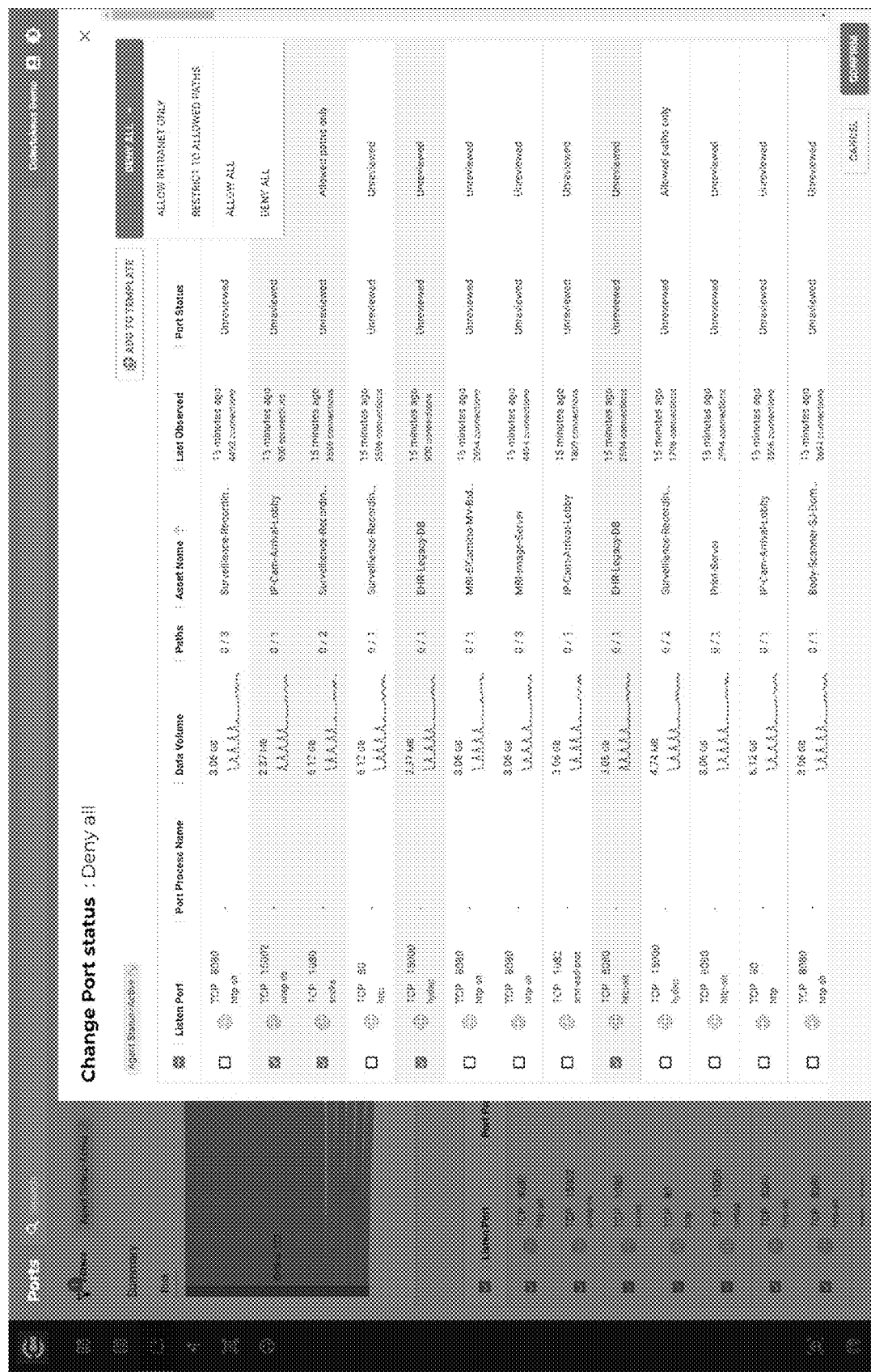
Figure 75:
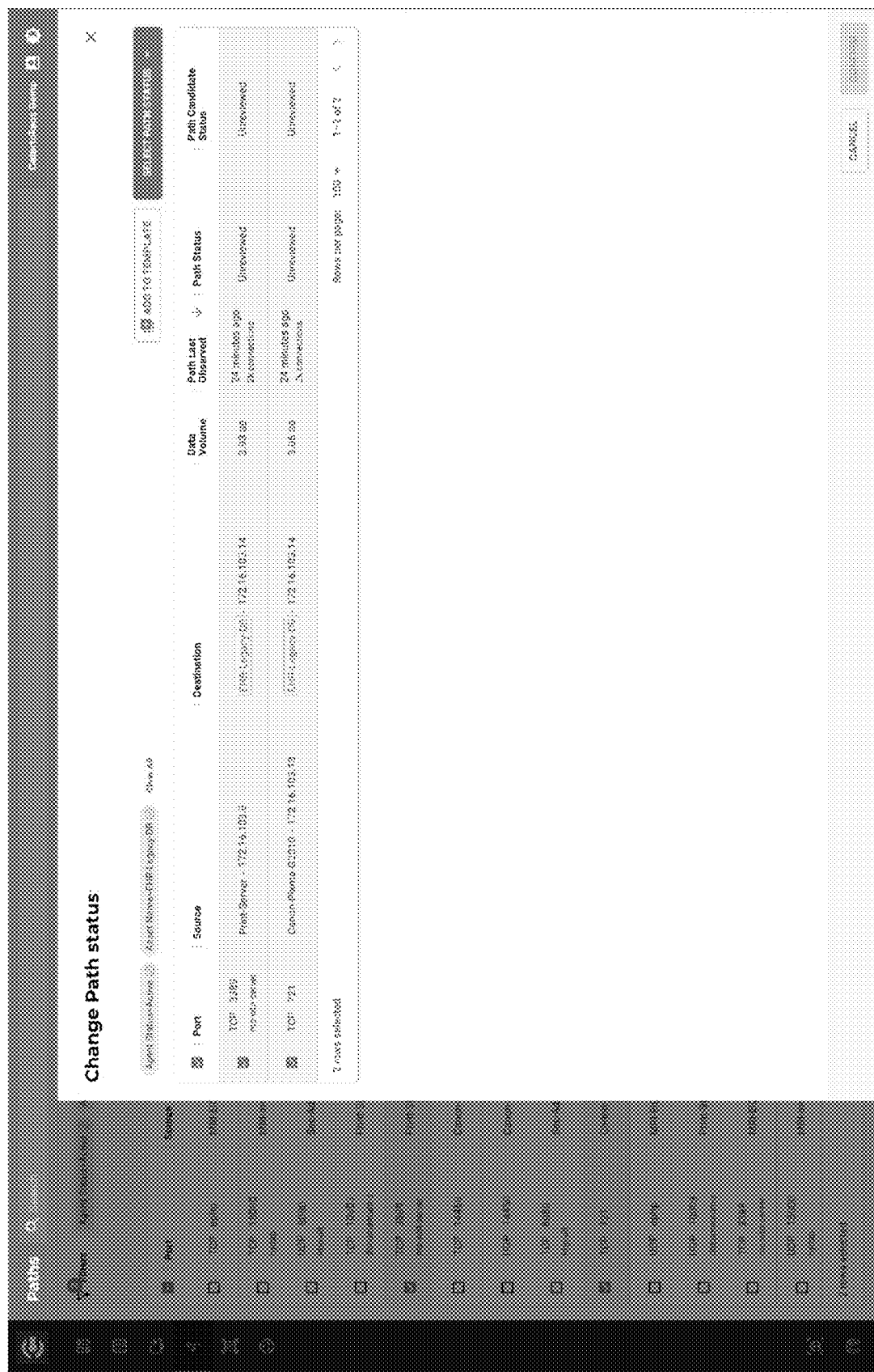
Figure 76:
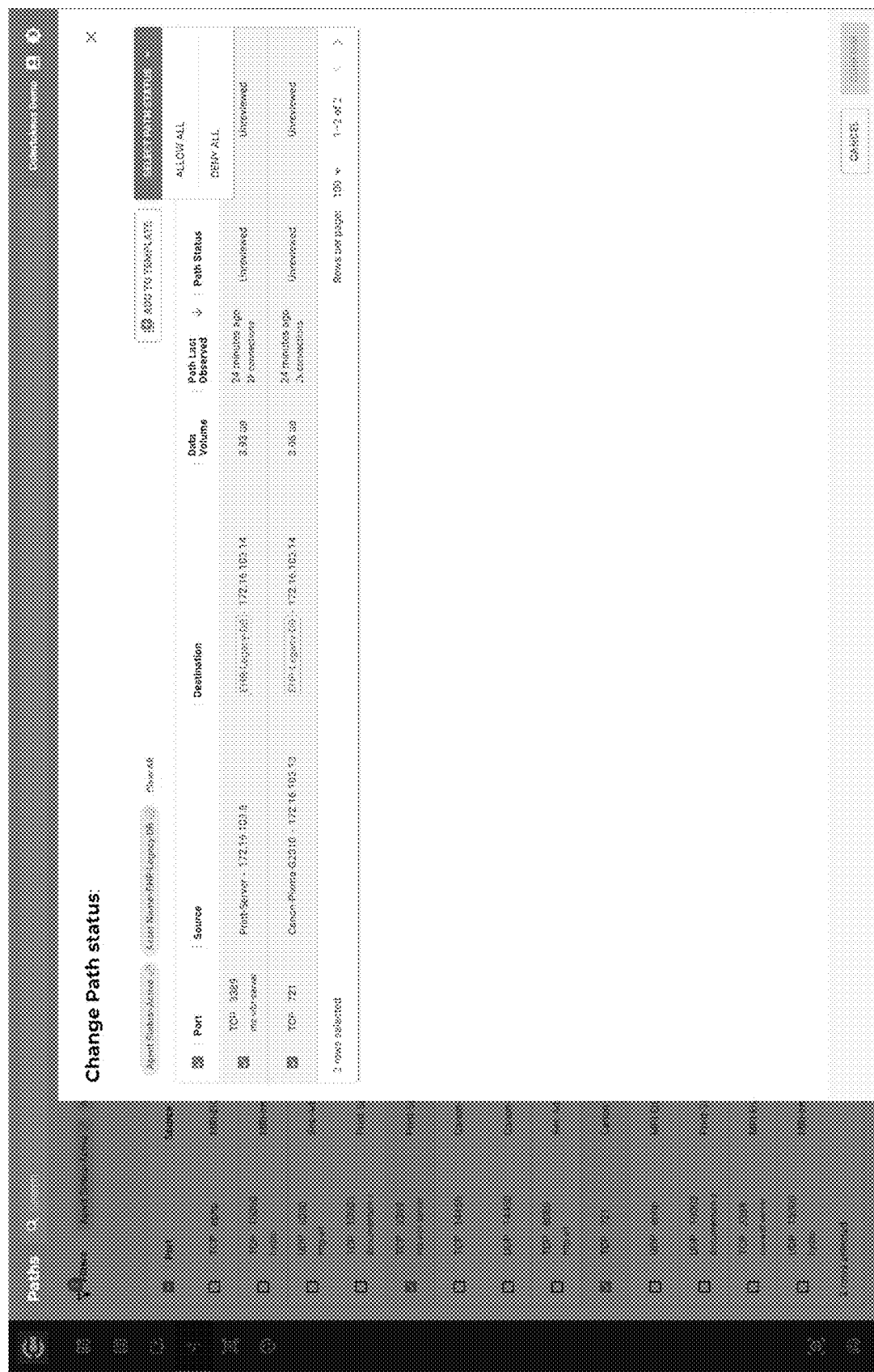
Figure 77:
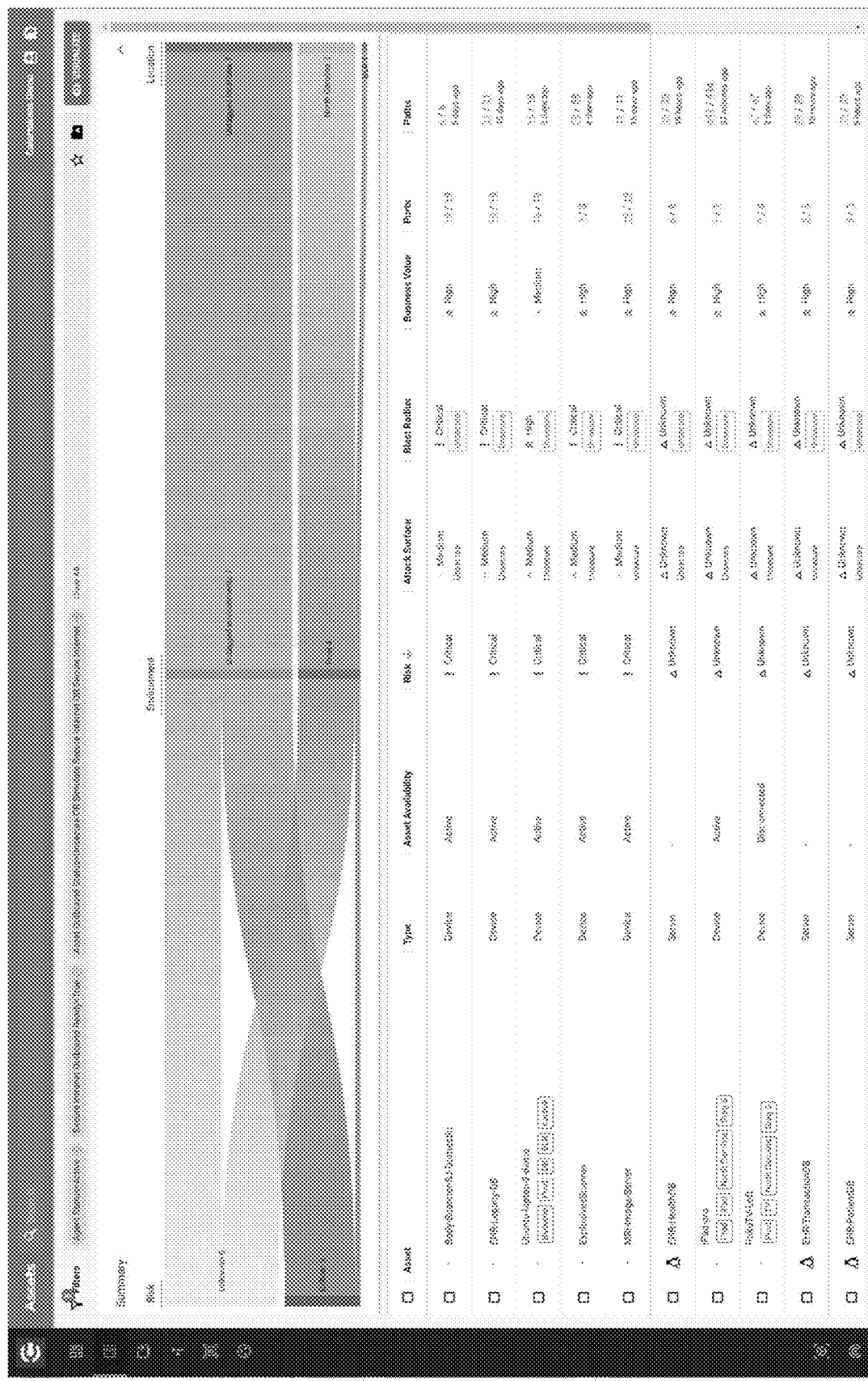
Figure 78:
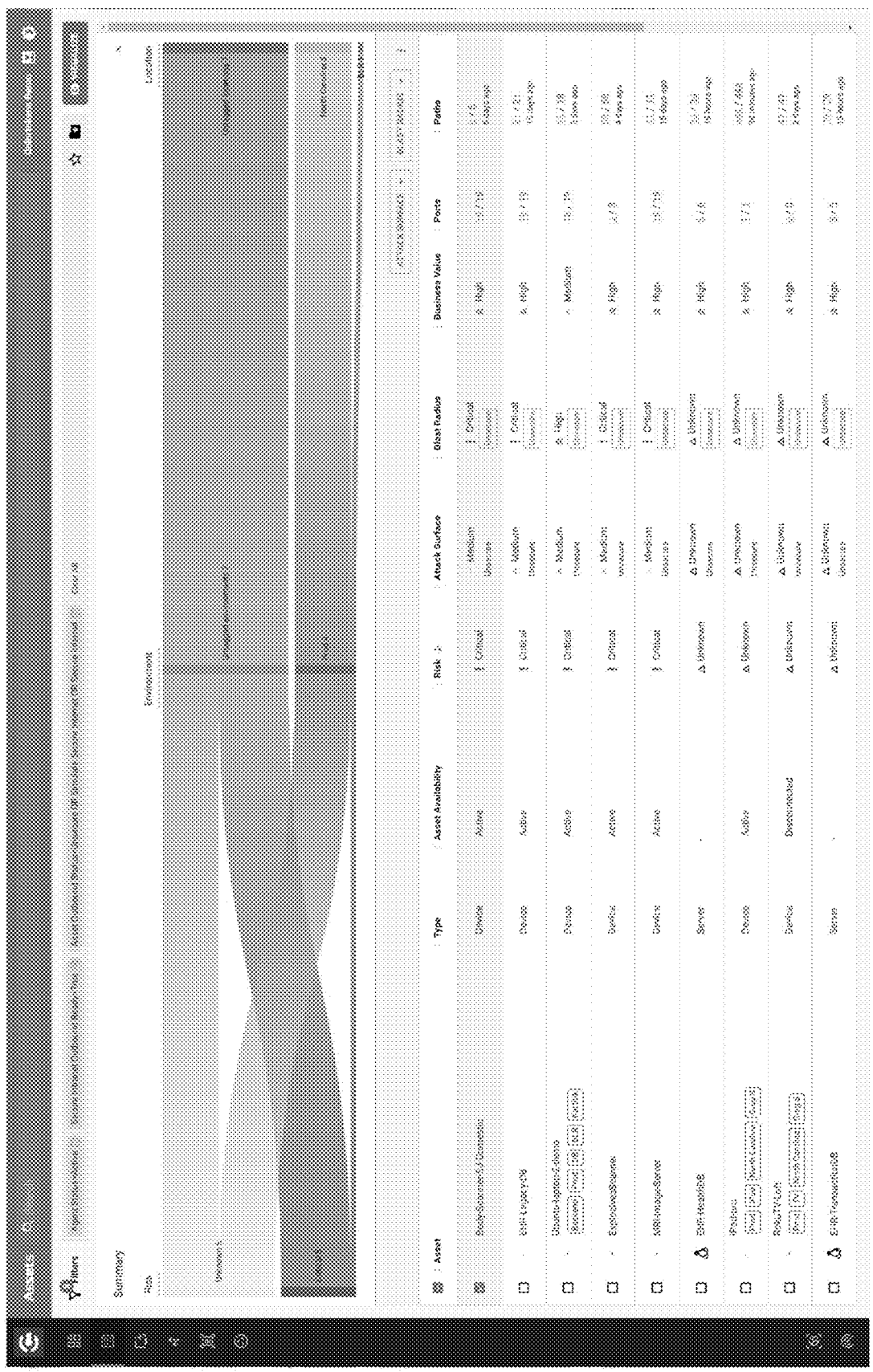
Figure 79:
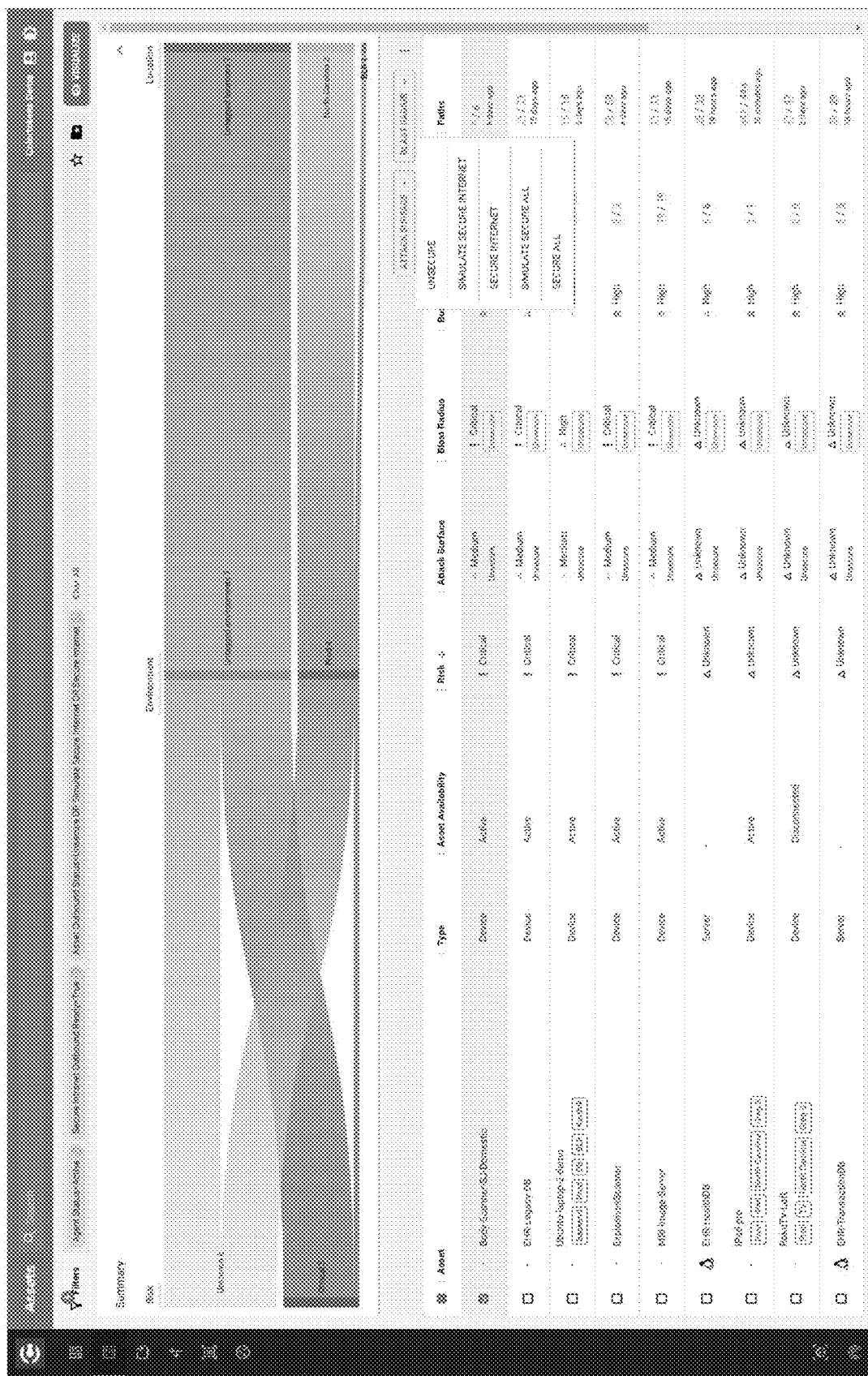
Figure 80:
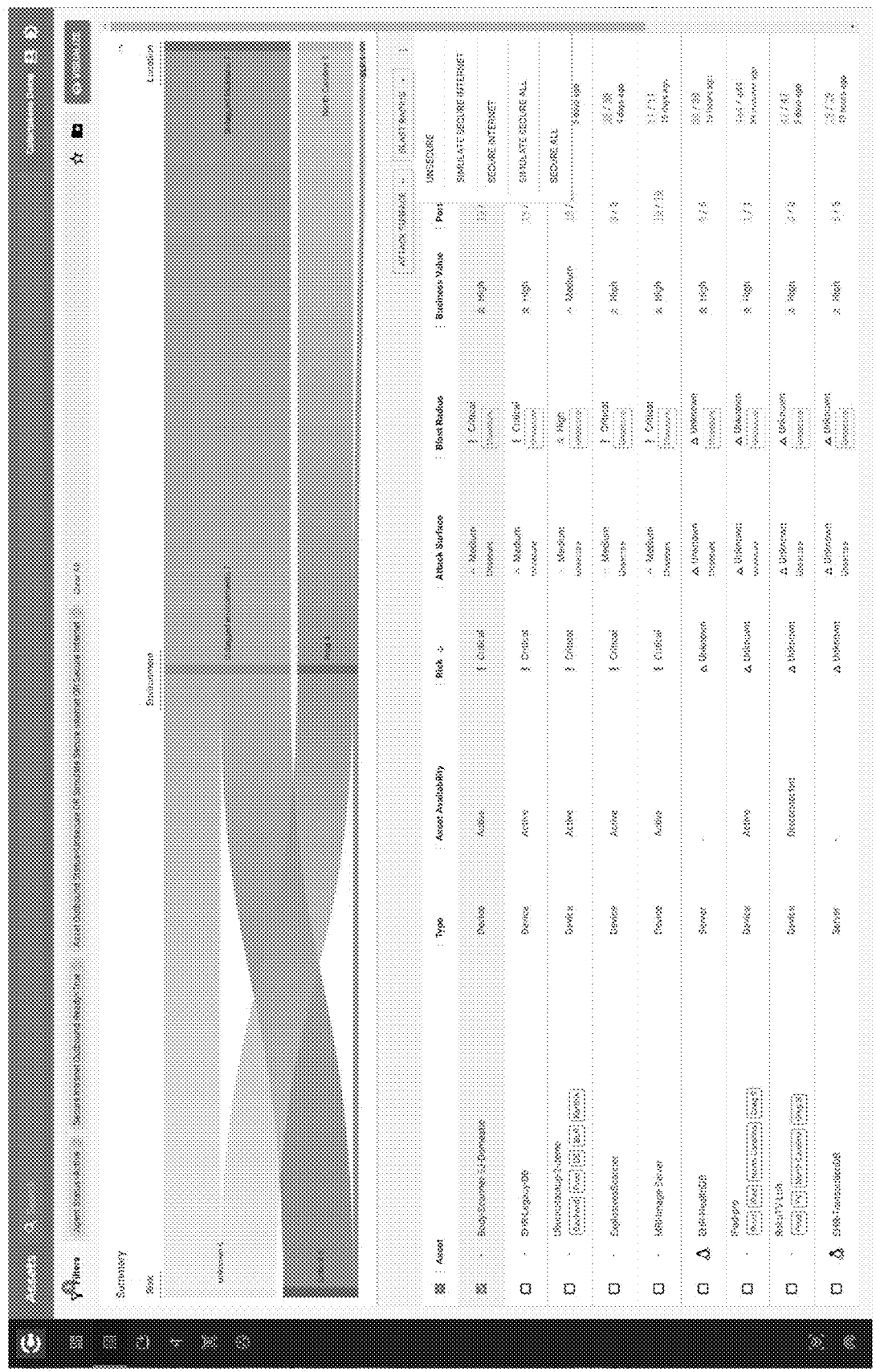
Figure 81:
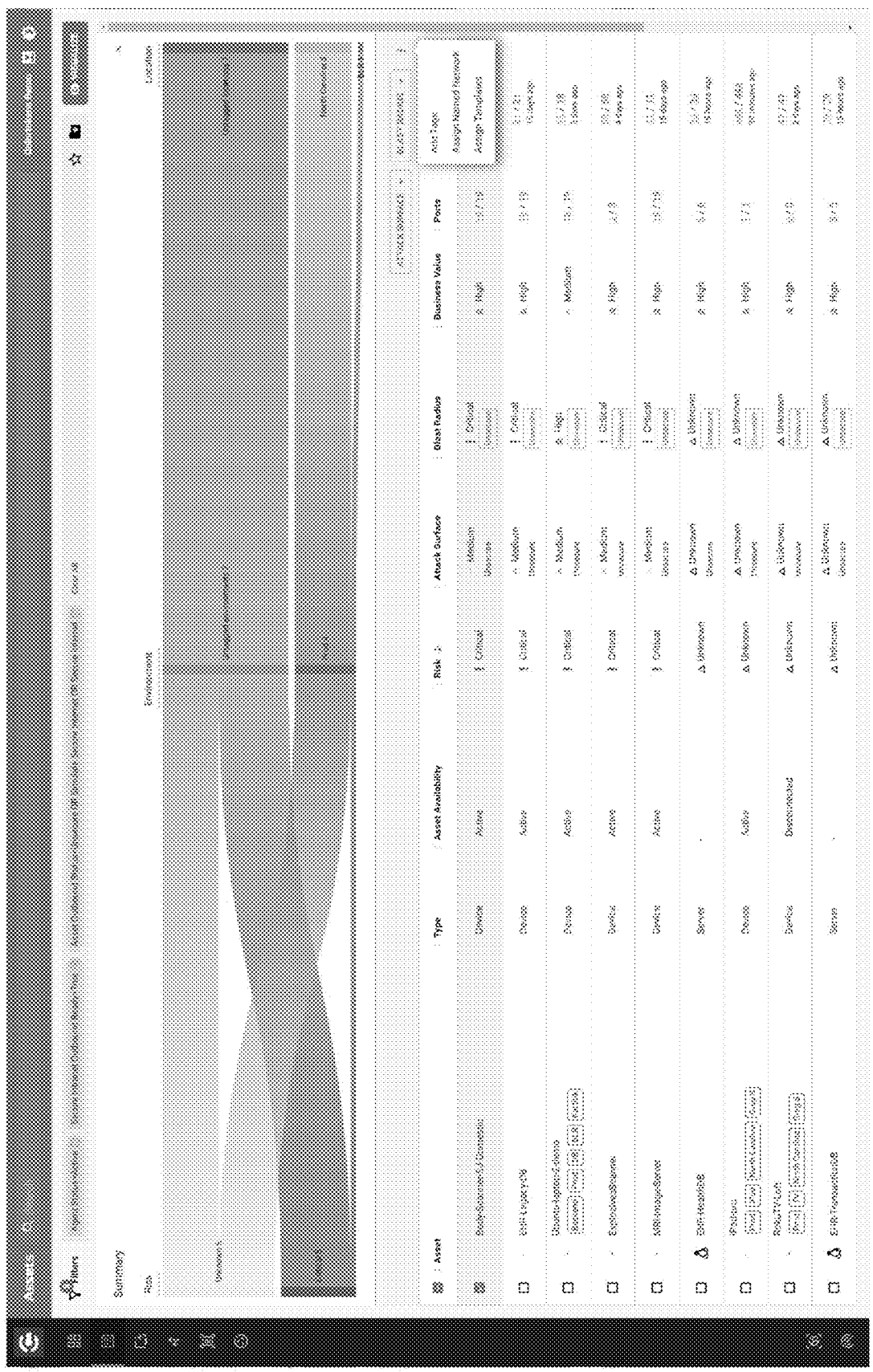
Figure 82:
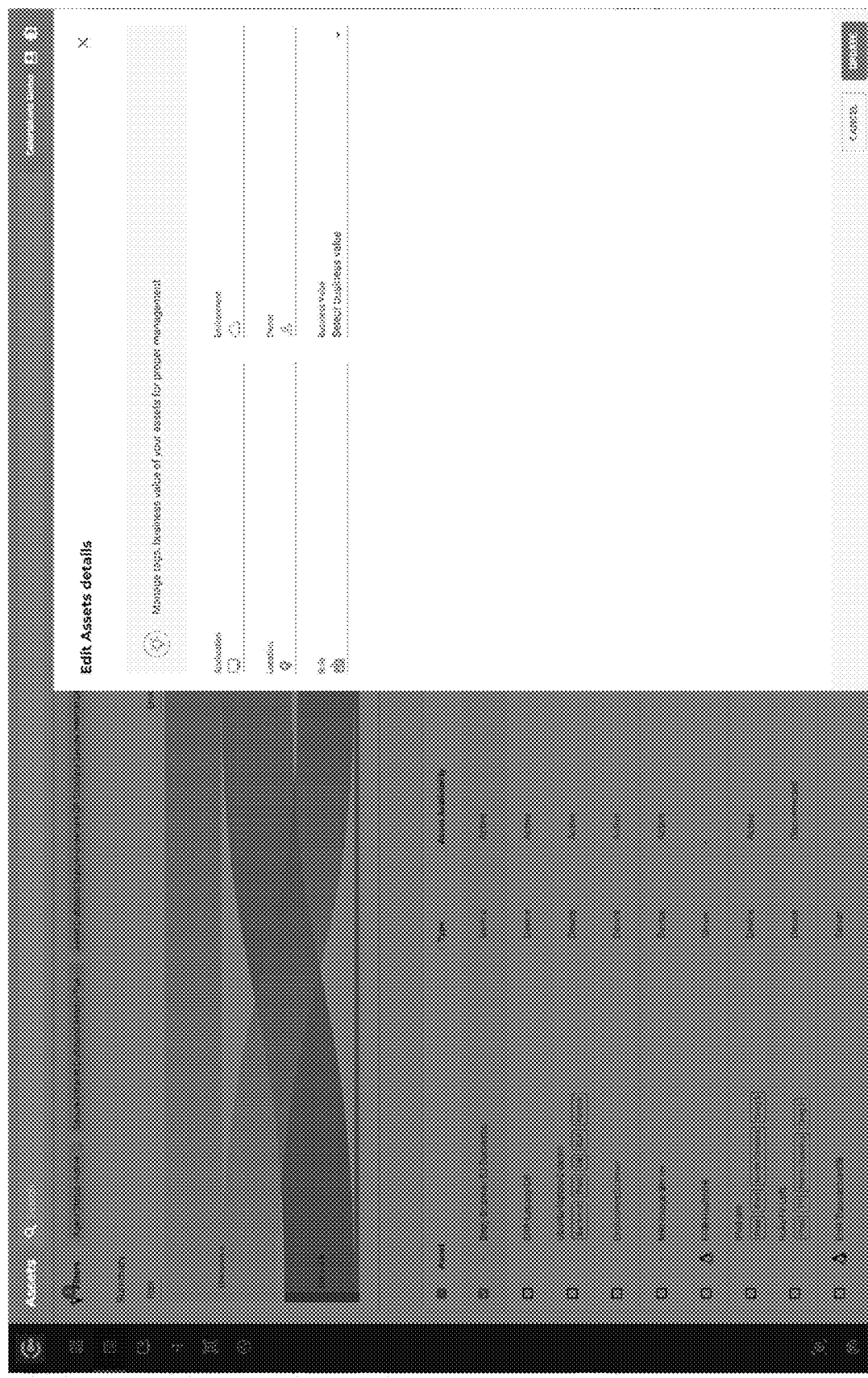
Figure 83:
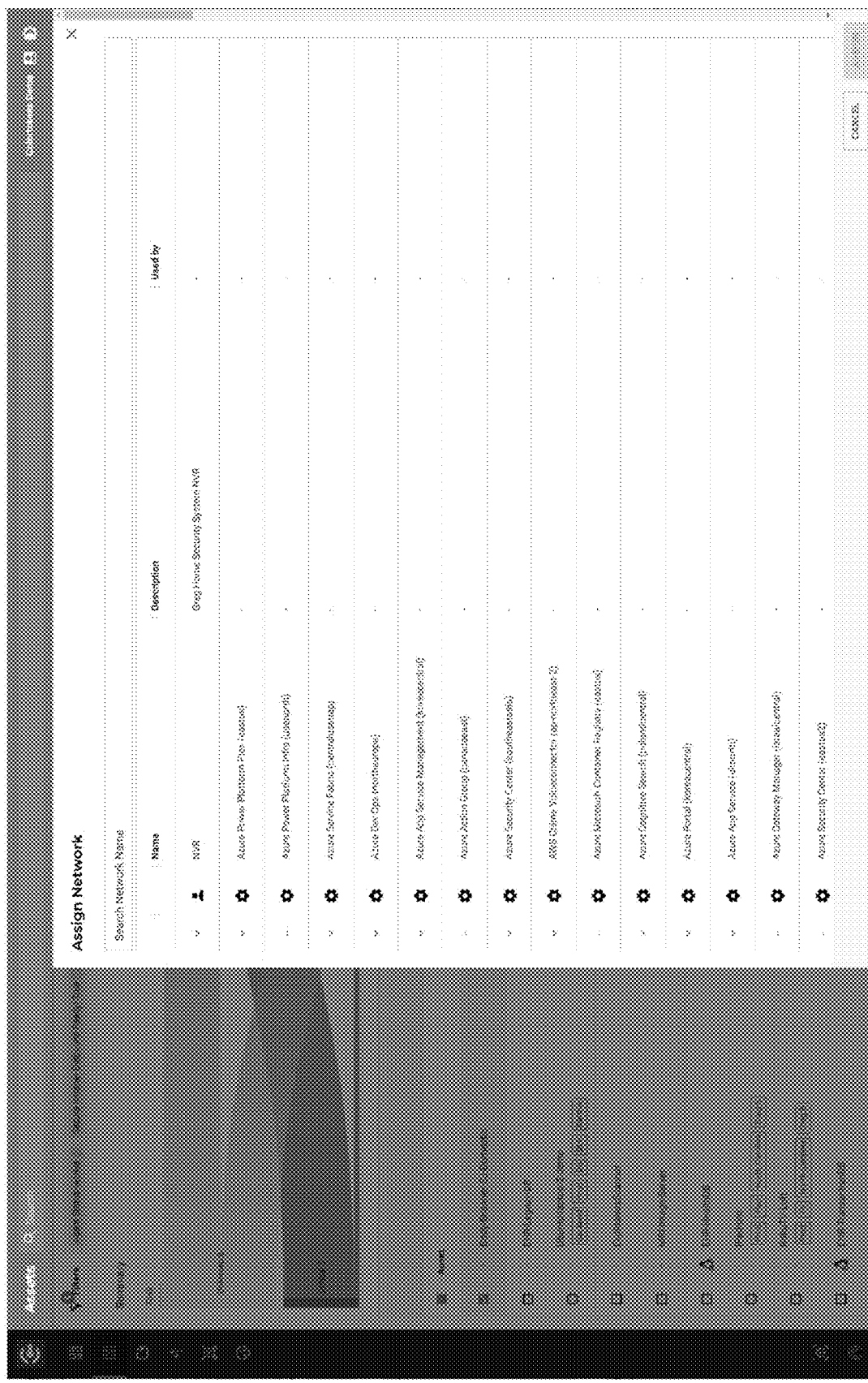
Figure 84:
Figure 85:
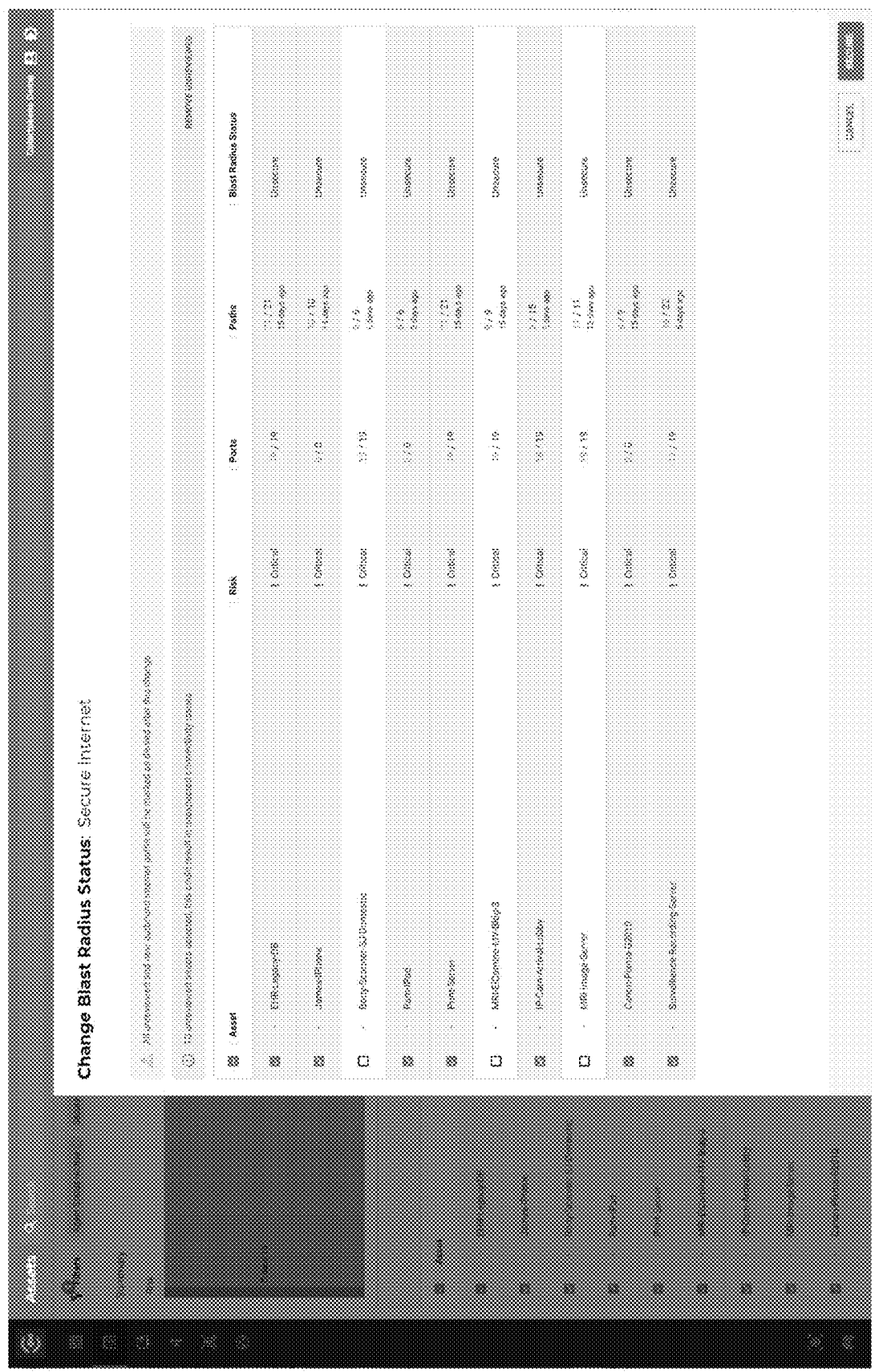
Figure 86:
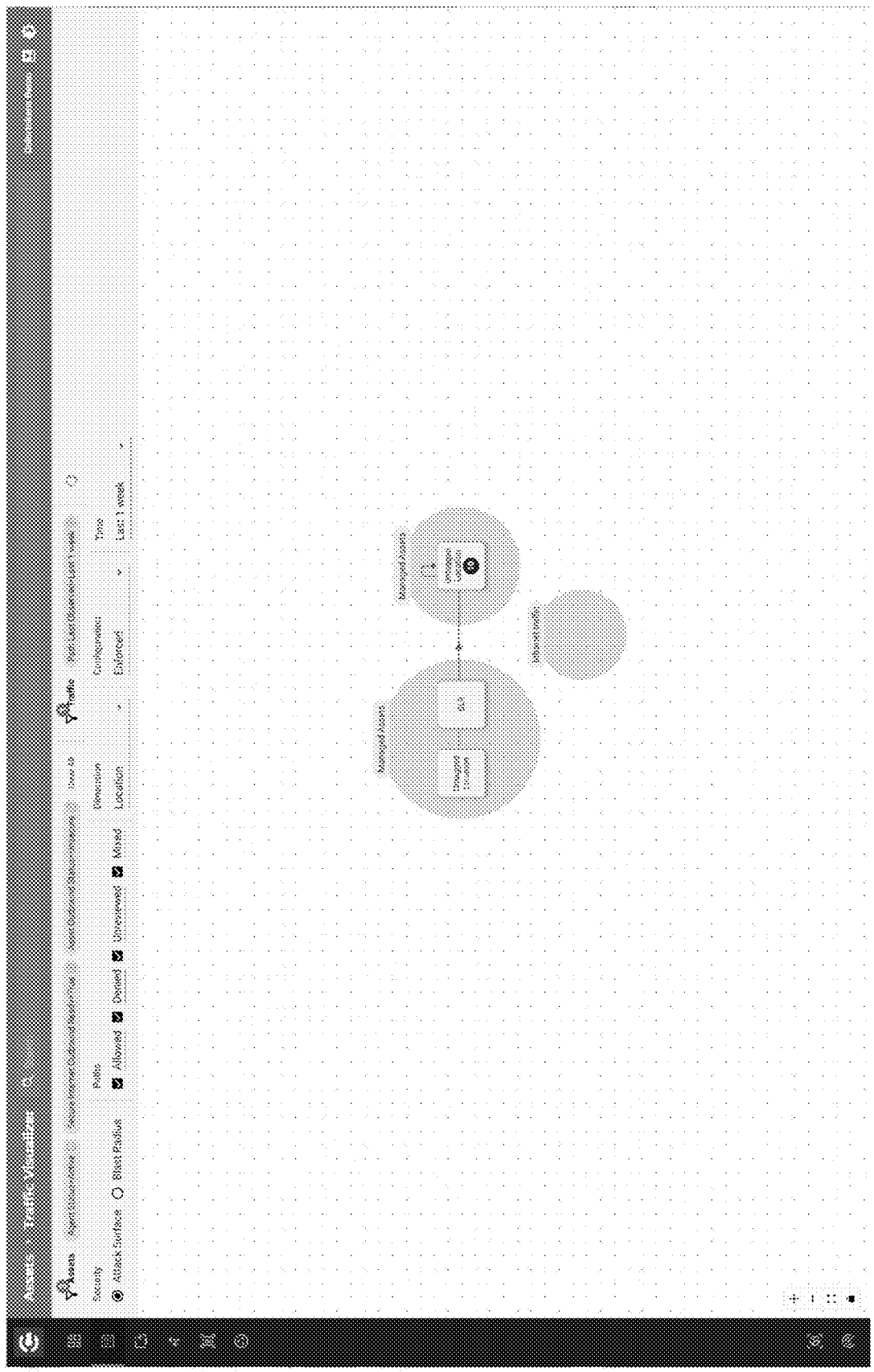
Figure 87:
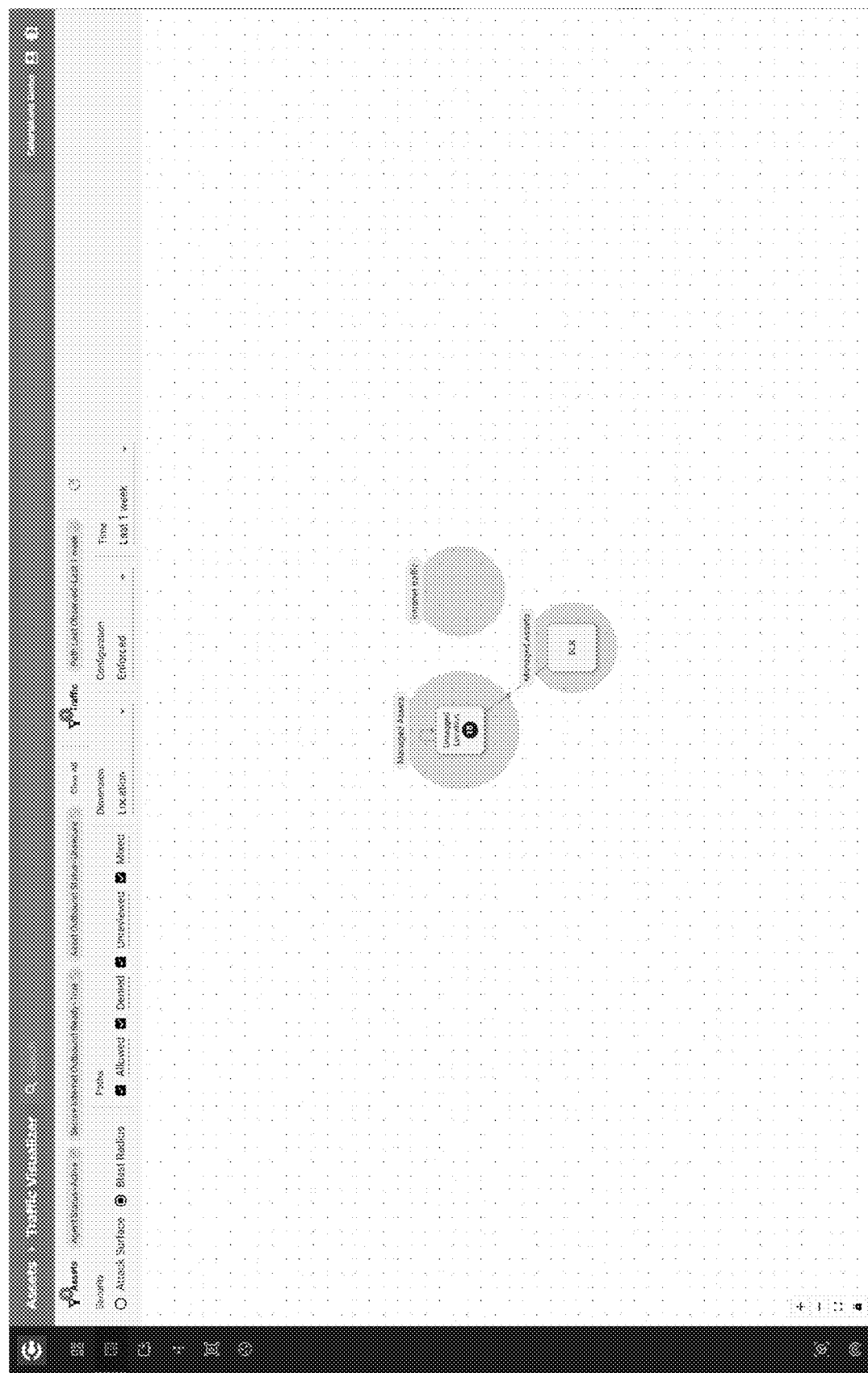
Figure 88:
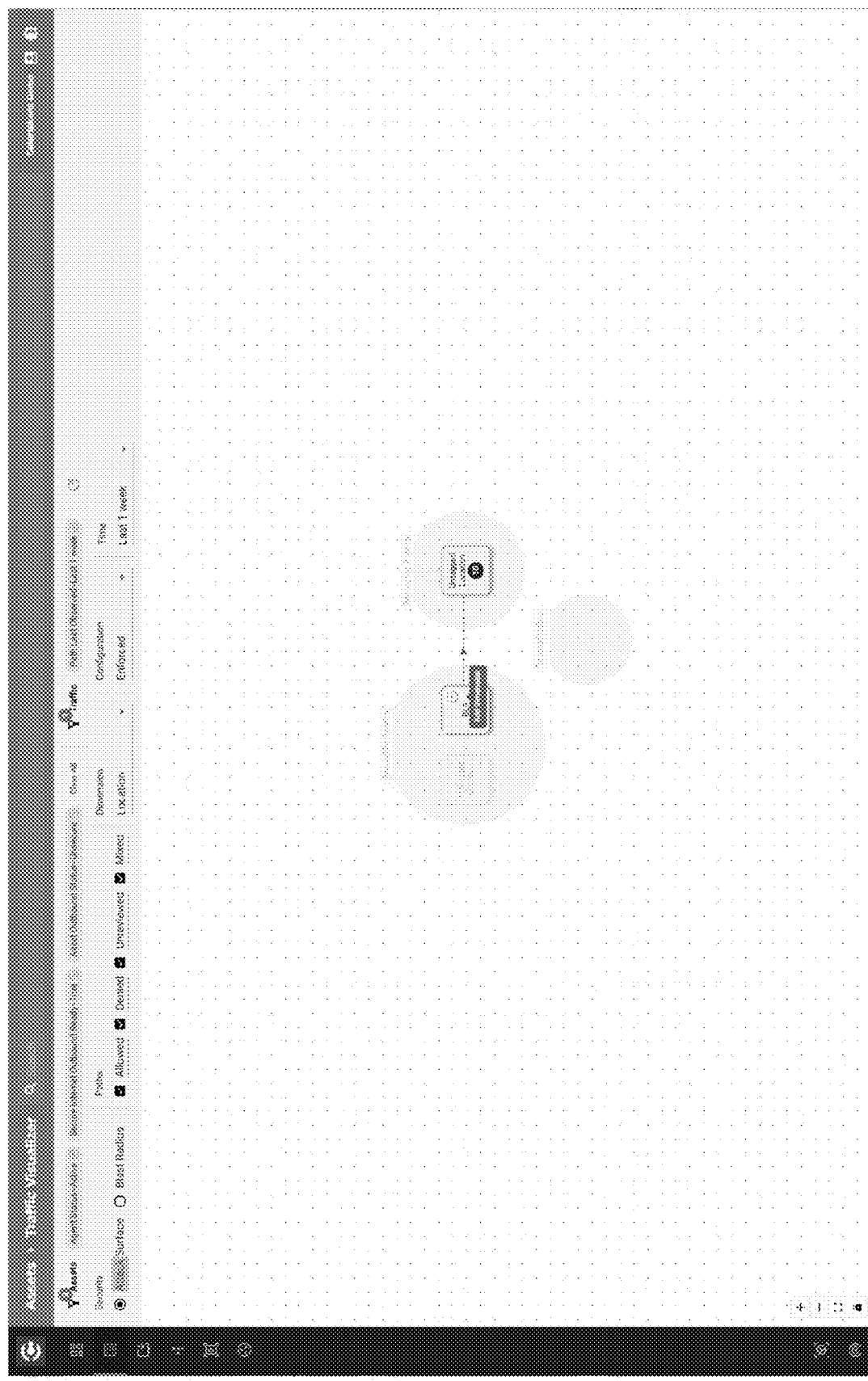
Figure 89:
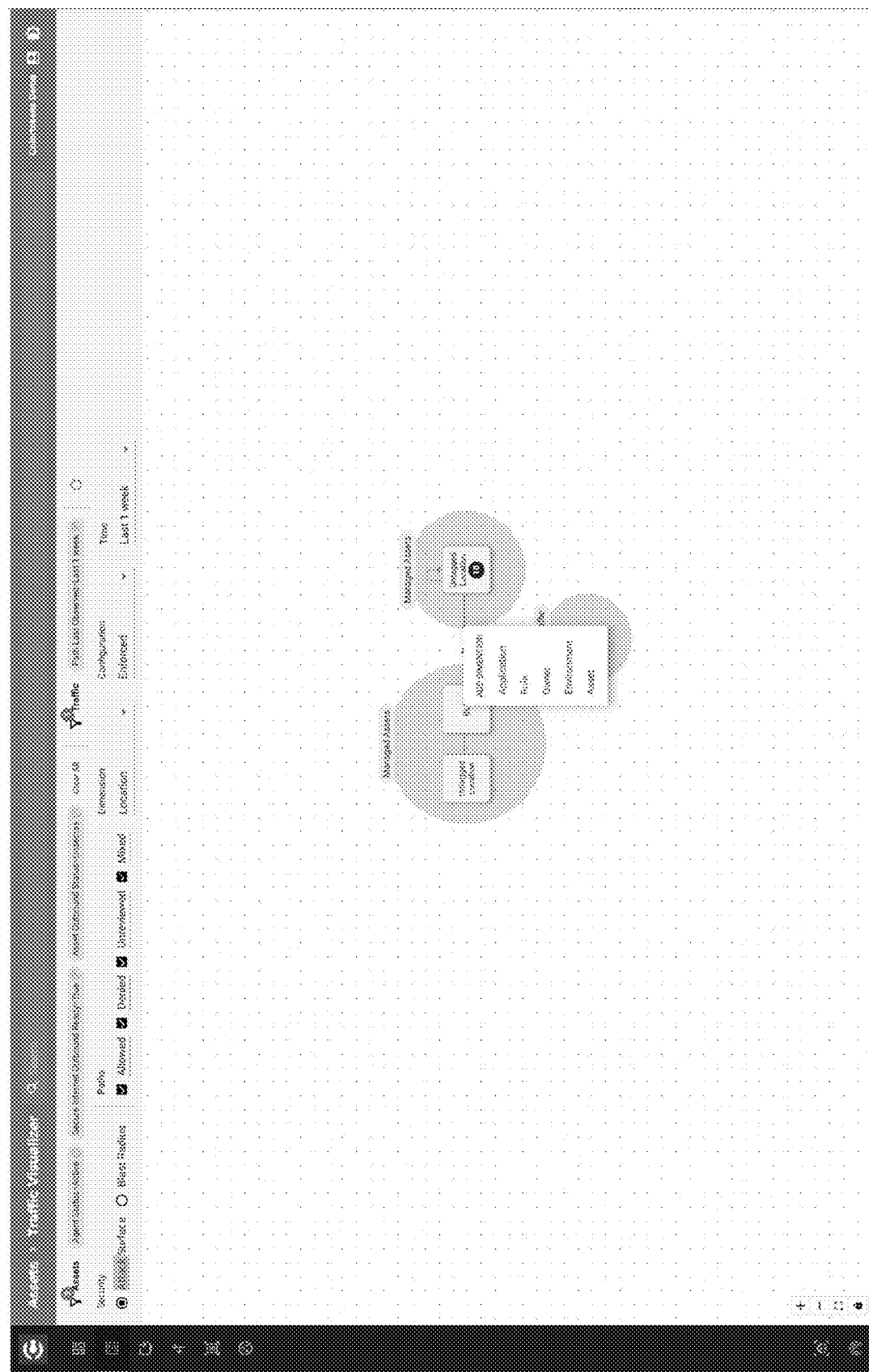
Figure 90:
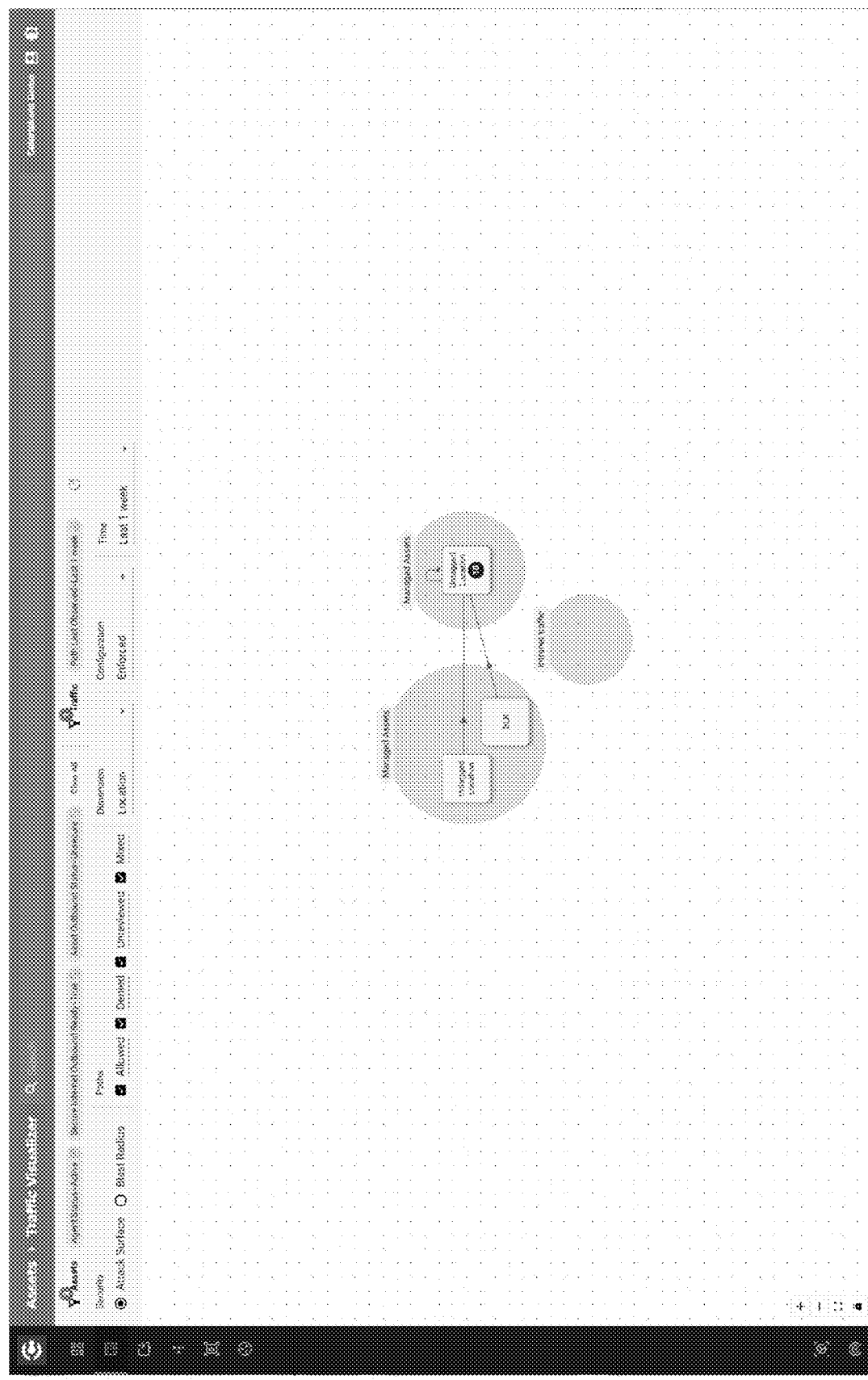
Figure 91:
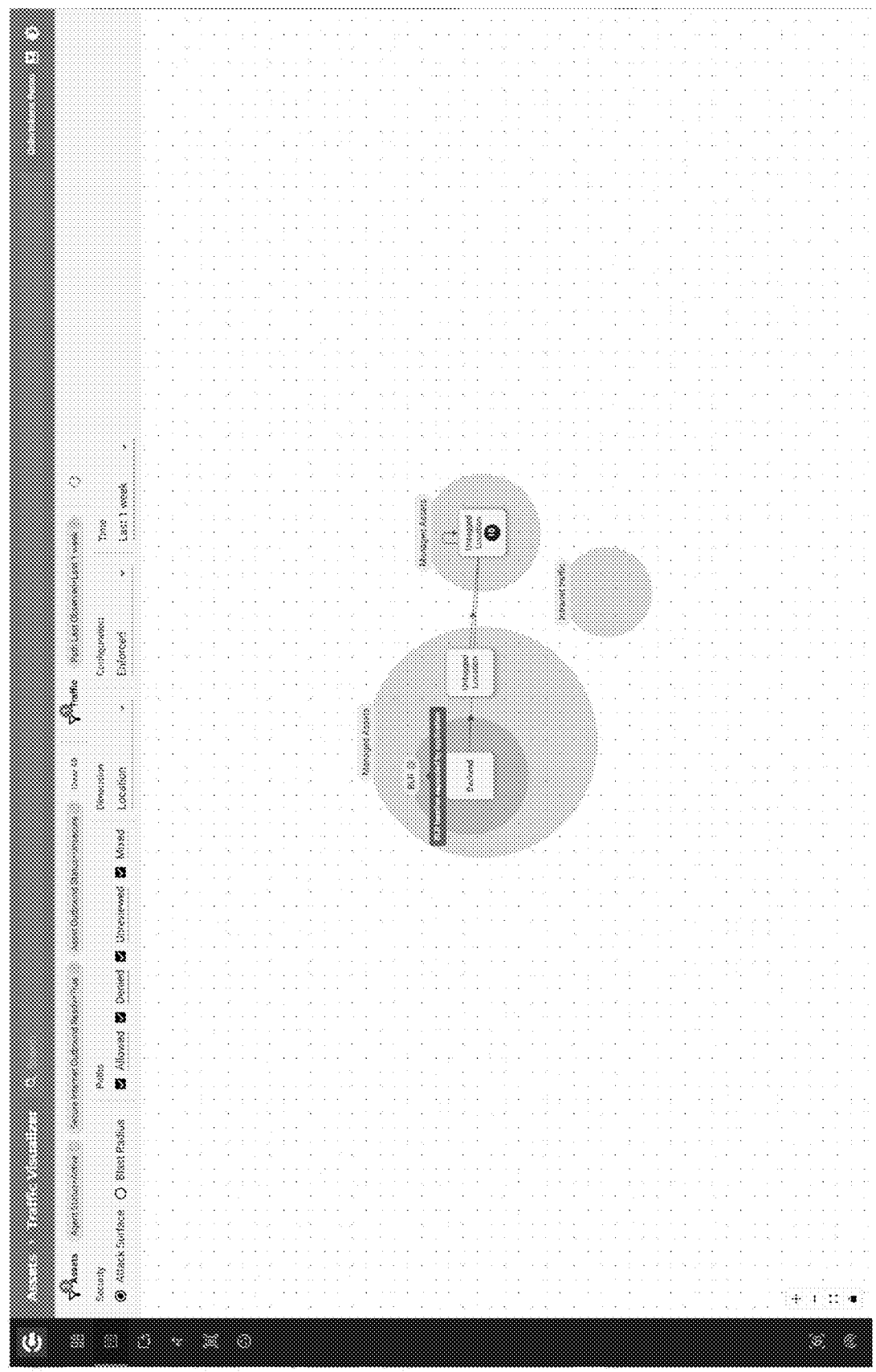

In one or more aspects, the recommendations 1002 be provided (e.g., displayed via I/O 119 and/or through a centralized management console) to one or more users on a graphical user interface (GUI), such as illustrated in FIGS. 10 and 11, and the user(s) or other user may modify the one or more communication policies (e.g., deny or allow a communication path and/or port) to modify the zero-trust policy. This allow/deny control may be used to create and/or modify the communication policies and adapt the zero-trust policy. Additional examples of a GUI illustrating a zero-trust network security application according to one or more aspects are illustrated in FIGS. 12-91. FIGS. 12-20 and 67-68 illustrate examples of a security risk dashboard including attack surface analysis, a blast radius analysis, and recommendations for possible adaptive actions. FIGS. 21-23 and 69-71 illustrate examples of an asset dashboard. FIGS. 24-32 illustrate examples of filtering techniques. FIGS. 33-37 illustrate examples of a traffic visualization for various assets. FIGS. 38-43 illustrate examples of a port dashboard and visualizations. FIGS. 44-52 illustrate examples of a template dashboard for creating policy templates. FIGS. 53-56 illustrate examples of a network dashboard and an interface for establishing new networks. FIGS. 57-58 illustrate examples of an application dashboard and associated log dashboard. FIGS. 59-63 illustrate examples of an agent dashboard and interface to facilitate the installation of one or more network agents. FIGS. 64-66 and 72-80 illustrate examples of asset and port dashboard for modifying network access, including allowing/denying access for a particular asset, path, and/or port. FIGS. 81-82 illustrate examples of an asset dashboard for creating and/or assign tags to one or more assets. FIG. 83 illustrates an example interface for assigning an asset to a particular network. FIG. 84 illustrates an example interface for assigning a template to an asset. FIG. 85 illustrates an example interface for adjusting the blast radius for one or more assets of the network, including adjusting access to the internet. FIGS. 86-91 illustrate examples of an asset and traffic visualizer, including modifying dimensional controls for one or more assets.

In one or more aspects, the zero-trust gatekeeper 300, 600 may be configured to identify approved and/or denied connections, create one or more policies, adjust one or more policies, update or adapt one or more policies, and/or remove one or more policies. In one or more aspects, the zero-trust gatekeeper 300, 600 may use heuristics and/or AI to perform the operation(s). These operations may be performed automatically by the zero-trust gatekeeper 300, 600 in one or more aspects. Additionally, or alternatively, the zero-trust gatekeeper 300, 600 may determine and provide recommendations 1002 for implementation of one or more policies, which may then be accepted, rejected, or ignored by the user (e.g., system or network administrator). For example, as illustrated in FIG. 10, recommendations 1102 may be determined and provided (e.g., displayed) to the user. The user may then choose to review one or more recommendations 1002 by selecting the review button 1004 on the GUI, which will provide actions that may be taken by the system (e.g. deny or allow a particular communication, etc.). The illustrated recommendations are examples and other recommendations are possible.

FIG. 11 illustrates an example GUI providing example ports 1102 in which access may be modified. The illustration of the ports may be displayed in response to the user selecting to review one of my recommendations 1002, such as the recommendation providing "12 open ports with no traffic for last 2 days. Consider denying them." The port information may include a selection 1106 for selecting ports to be modified, a listing 1108 of the available ports to be modified associated with the recommendation, corresponding data volume 1110 for the respective ports 1108, paths 1112 associated with the ports 1108, and the time 1114 since last observed activity on the respective ports 1108. In this illustrated example, TCP port 80 is selected as indicated by the filled selection box, but multiple ports may be selected in other examples. The user may then select the modify button 1104 to select an action regarding the selected port(s). In this example, the user may choose to limit the port to only intranet traffic by selecting "allow intranet only," restrict traffic on the port to only allowed paths by selecting "restrict to allowed paths," allow all traffic on the port by selecting "allow all," and deny all traffic on the port buy selecting "deny all." The illustrated actions are examples and other actions are possible.

Figure 7:
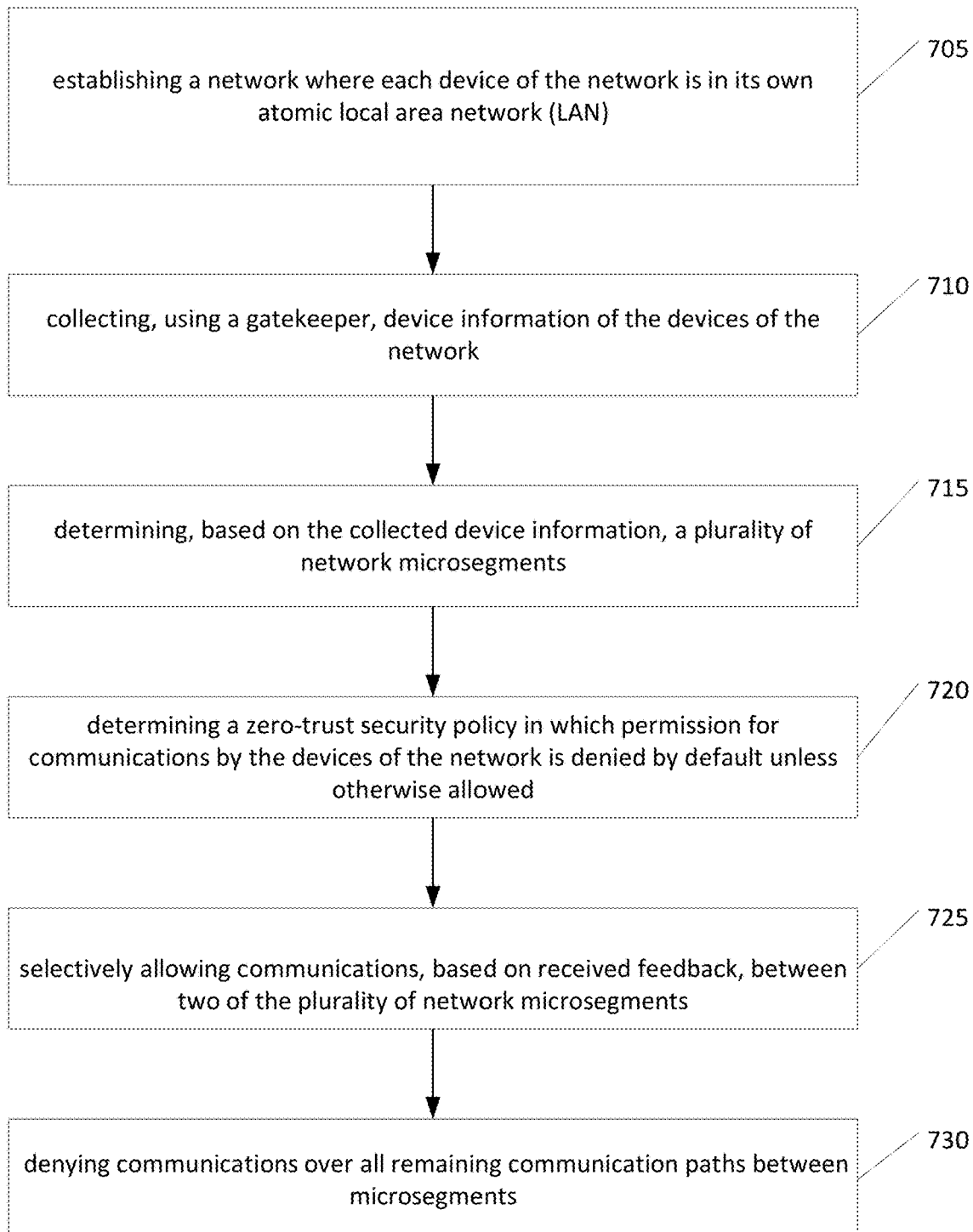
FIG. 7 illustrates a flowchart of a zero-trust network security method according to one or more aspects of the disclosure.

FIG. 7 illustrates a flowchart of a zero-trust method 700 according to one or more aspects of the disclosure. Two or more of the various operations of the method may be performed simultaneously in one or more aspects. Further, the order of the various operations is not limiting, and the operations may be performed in a different order in one or more aspects.

At operation 705, a network is established where each device of the network is in its own network of one (individualized subnet 301). For example, one or more DHCP operations may be performed to change the subnet of IP addresses of the device(s) prior to IP address allocation. The IP addresses may then be allocated to the devices 210 (FIG. 3). In one or more aspects, the zero-trust gatekeeper 300 may be configured to adjust the subnets for the IP addresses (e.g., "/32" subnet or utilize a subnet mask of "255.255.255.255") using the DHCP, and allocate the IP addresses to the various devices 210. The zero-trust gatekeeper 300 may set the gateway attribute of the allocated IP addresses to the IP address of the zero-trust gatekeeper 300.

At operation 710, information associated with the devices of the network is collected. For example, the gatekeeper 300 may analyze the network traffic traversing the gatekeeper 300 as a result of the "network of one" network structure to collect the information. In one or more aspects, the information is determined based on one or more tags associated with a particular device 210.

In one or more aspects, the information may include, for example, device information, such as operating system information, screen resolution information, and/or component manufacture information (e.g., the device serial number, manufacture date, manufacture location, etc.). Additionally, or alternatively, information may include software information (e.g. installed applications), operating system information, other device hardware and/or software information (e.g., processor information, memory information, storage information, network card information, installed drivers, firmware, BIOS, etc.), network information (e.g., IP address(es), one or more MAC addresses, source addresses, destination addresses, port numbers, etc.), geolocation information of the device 210, user information (e.g., user identification information of users associated with the device), information identifying an intended use of the device (e.g., server, etc.), and/or other identification information. The information may be included in one or more tags associated with the device(s), where the gatekeeper 300 may collect tag information that includes the information. The tag(s) may be associated with the device(s) by the user and/or associated with the device(s) based on one or more attributes. The tag(s) may be associated with the device(s) using one or more predefined templates.

At operation 715, one or more (e.g., a plurality of) microsegments are determined. The microsegment(s) may be determined based on the collected information. For example, the information may be used to identify one or more devices, one or more device types, one or more device attributes, one or more likely or intended uses of the devices, or other properties and/or attributes. Such devices that are determined to be similar or otherwise related may then be included in the same microsegment. In one or more aspects, the information may be used to identify the likely communication paths and/or ports, and/or other communication information for one or more devices, which may then be used to identify relationships that may leveraged in establishing the microsegment(s).

At operation 720, a zero-trust security policy is determined. The zero-trust security policy may be configured such that permission for communications by the devices of the network is denied by default unless otherwise allowed. For example, the policy may limit the network access for a respective device to only what is required for the device and/or user of the device to perform their respective tasks. In one or more aspects, the zero-trust policies may include one or more communication rules, which may be determined using logic and/or heuristics configured to detect network traffic patterns that may be suggestive of actionable enforcement principles. The gatekeeper 300 may be configured to identify approved and/or denied connections, create one or more policies, adjust one or more policies, update or adapt one or more policies, and/or remove one or more policies. These operations may be performed automatically by the zero-trust gatekeeper 300. For example, the zero-trust gatekeeper 300, based on the observations of network traffic, may detect an open server port that is listening for communication but the port has no current, recent, and/or historical communication activities. The logic and/or heuristics employed by the zero-trust gatekeeper 300 may then suggest closing the port.

At operation 725, communications may be selectively allowed between two of the plurality of network microsegments. The selective allowance of the communication(s) may be based on feedback received from a user (e.g., the network administrator). For example, one or more communication policies may be set and/or modified based on feedback (e.g., allow/deny decisions) received by the zero-trust gatekeeper 300 from the network administrator(s). The zero-trust gatekeeper 300 may be configured to identify approved connections, create one or more policies, adjust one or more policies, update one or more policies, and/or remove one or more policies based on the user feedback. The policies may then be used by the zero-trust gatekeeper 300 to control the communications amongst the various devices 210.

In one or more aspects, the zero-trust gatekeeper 300 may determine and provide recommendations 1002 for implementation of one or more policies, which may then be accepted, rejected, or ignored by the user (e.g., system or network administrator). For example, as illustrated in FIG. 10, recommendations 1102 may be determined and provided (e.g., displayed) to the user. The user may then choose to review one or more recommendations 1002 by selecting the review button 1004 on the GUI, which will provide actions that may be taken by the system (e.g. deny or allow a particular communication, etc.). The illustrated recommendations are examples and other recommendations are possible. As shown in FIG. 11, the user may select the modify button 1104 to modify a communication policy.

At operation 730, communications over all remaining communication paths between microsegments may be denied. For example, zero trust least privilege policy may limit the network access for a respective device to only what is required for the device and/or user of the device to perform their respective task, and all other access is denied.

Figure 8:
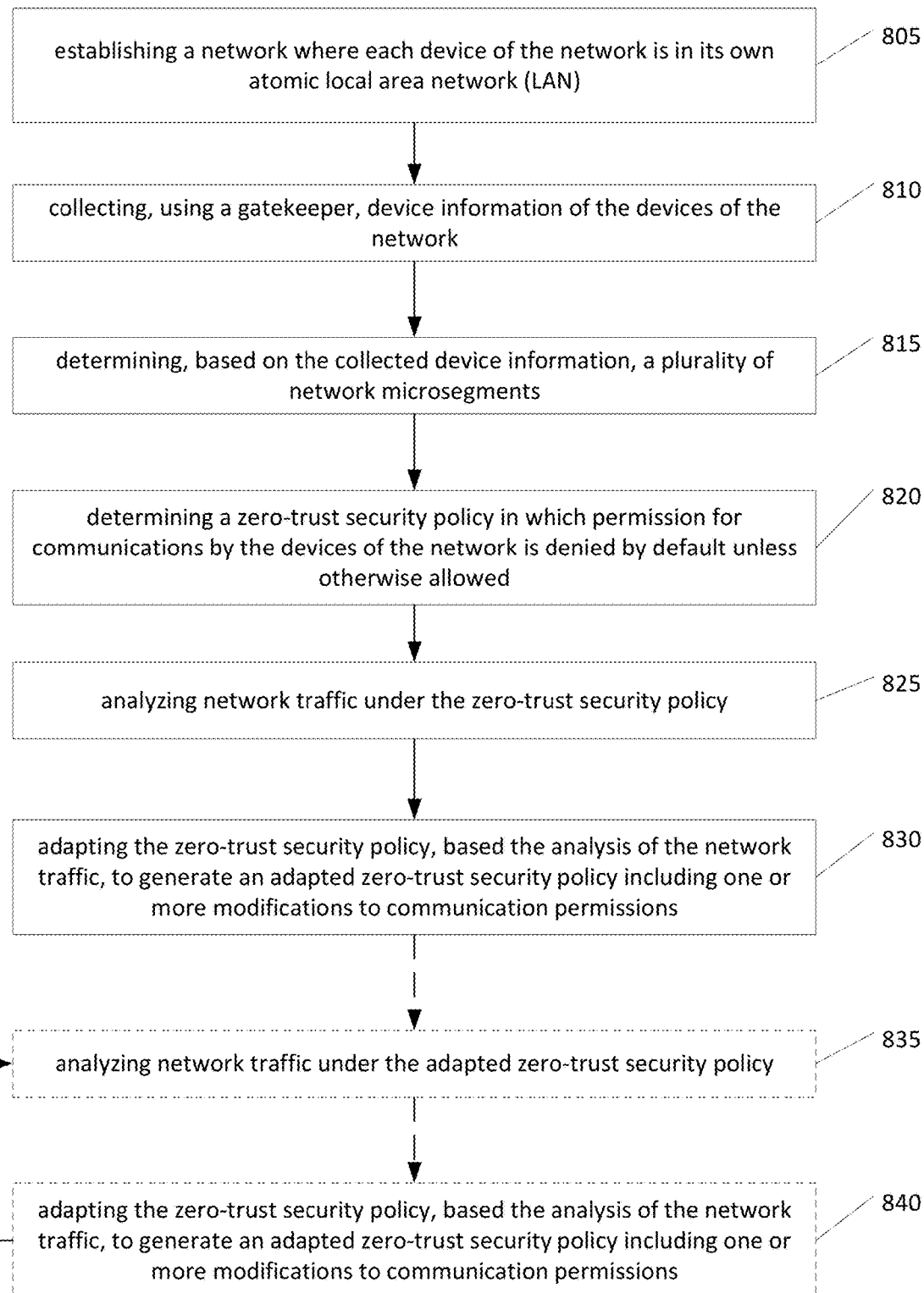
FIG. 8 illustrates a flowchart of a zero-trust network security method according to one or more aspects of the disclosure.

FIG. 8 illustrates a flowchart of a zero-trust method 800 according to one or more aspects of the disclosure. Two or more of the various operations of the method may be performed simultaneously in one or more aspects. Further, the order of the various operations is not limiting, and the operations may be performed in a different order in one or more aspects.

At operation 805, a network is established where each device of the network is in its own network of one (individualized subnet 301). For example, one or more DHCP operations may be performed to change the subnet of IP addresses of the device(s) prior to IP address allocation. The IP addresses may then be allocated to the devices 210 (FIG. 3). In one or more aspects, the zero-trust gatekeeper 300 may be configured to adjust the subnets for the IP addresses (e.g., "/32" subnet or utilize a subnet mask of "255.255.255.255") using the DHCP, and allocate the IP addresses to the various devices 210. The zero-trust gatekeeper 300 may set the gateway attribute of the allocated IP addresses to the IP address of the zero-trust gatekeeper 300.

At operation 810, information associated with the devices of the network is collected. For example, the gatekeeper 300 may analyze the network traffic traversing the gatekeeper 300 as a result of the "network of one" network structure to collect the information. In one or more aspects, the information is determined based on one or more tags associated with a particular device 210.

In one or more aspects, the information may include, for example, device information, such as operating system information, screen resolution information, and/or component manufacture information (e.g., the device serial number, manufacture date, manufacture location, etc.). Additionally, or alternatively, the information may include software information (e.g. installed applications), operating system information, other device hardware and/or software information (e.g., processor information, memory information, storage information, network card information, installed drivers, firmware, BIOS, etc.), network information (e.g., IP address(es), one or more MAC addresses, source addresses, destination addresses, port numbers, etc.), geolocation information of the device 210, user information (e.g., user identification information of users associated with the device), information identifying an intended use of the device (e.g., server, etc.), and/or other identification information. The information may be included in one or more tags associated with the device(s), where the gatekeeper 300 may collect tag information that includes the information. The tag(s) may be associated with the device(s) by the user and/or associated with the device(s) based on one or more attributes. The tag(s) may be associated with the device(s) using one or more predefined templates.

At operation 815, one or more (e.g., a plurality of) microsegments are determined. The microsegment(s) may be determined based on the collected information. For example, the information may be used to identify one or more devices, one or more device types, one or more device attributes, one or more likely or intended uses of the devices, or other properties and/or attributes. Such devices that are determined to be similar or otherwise related may then be included in the same microsegment. In one or more aspects, the information may be used to identify the likely communication paths and/or ports, and/or other communication information for one or more devices, which may then be used to identify relationships that may leveraged in establishing the microsegment(s).

At operation 820, a zero-trust security policy is determined. The zero-trust security policy may be configured such that permission for communications by the devices of the network is denied by default unless otherwise allowed. For example, the policy may limit the network access for a respective device to only what is required for the device and/or user of the device to perform their respective tasks. In one or more aspects, the zero-trust policies may include one or more communication rules, which may be determined using logic and/or heuristics configured to detect network traffic patterns that may be suggestive of actionable enforcement principles. The gatekeeper 300 may be configured to identify approved and/or denied connections, create one or more policies, adjust one or more policies, update or adapt one or more policies, and/or remove one or more policies. These operations may be performed automatically by the zero-trust gatekeeper 300. For example, the zero-trust gatekeeper 300, based on the observations of network traffic, may detect an open server port that is listening for communication but the port has no current, recent, and/or historical communication activities. The logic and/or heuristics employed by the zero-trust gatekeeper 300 may then suggest closing the port.

At operation 825, network traffic is analyzed under the zero-trust security policy. For example, the gatekeeper 300 may monitor and analyze the network traffic traversing the gatekeeper 300 as a result of the "network of one" network structure. The network communications may be monitored (e.g., by the zero-trust gatekeeper 300) to collect source addresses, destination addresses, and/or port numbers of network communications; frequency of network communications, including over one or more communication paths and/or ports; whether network traffic is allowed and/or restricted; and/or other network traffic information and/or attributes. The collected information may be used to determine network patterns for devices, users, and/or applications. In one or more aspects, the zero-trust gatekeeper 300, based on the observations of network traffic, may detect network activity and/or the lack of activity for one or more devices, for one or more communication paths, port(s), application(s), or the like. In one or more aspects, the analysis of the network traffic may include analyzing one or more logs, such as firewall logs. The analysis of the logs may identify blocked traffic that the system and/or user may want to allow, and/or allowed traffic that the system and/or user may want to deny.

At operation 830, the zero-trust security policy may be adapted to generate an adapted zero-trust security policy including one or more modifications to communication permissions. The zero-trust security policy may be adapted (e.g., by the gatekeeper 300) based the analysis of the network traffic. For example, based on a lack of traffic on a particular communication path and/or port, the policy may be adapted to restrict future access on that communication path and/or port. In one or more aspects, the zero-trust gatekeeper 300 may be configured to adjust one or more policies, update or adapt one or more policies, and/or remove one or more policies. These operations may be performed automatically by the gatekeeper 300. Additionally, or alternatively, the zero-trust gatekeeper 300, 600 may determine and provide recommendations for implementation of one or more policies, which may then be accepted, rejected, or ignored by the user (e.g., system or network administrator). For example, the gatekeeper 300, based on the observations of network traffic, may detect an open server port that is listening for communication but the port has no current, recent, and/or historical communication activities. The logic and/or heuristics employed by the zero-trust gatekeeper 300 may close the port and/or suggest closing the port to the user.

In one or more aspects, the method 800 may include operations 835 and 840, which provide an iterative analysis and adaptation of the zero-trust security policy. At operation 835, network traffic is analyzed under the adapted zero-trust security policy that was adapted in operation 830. At operation 840, the previously adapted zero-trust security policy may be adapted again based on the further analysis of the network traffic under the previously adapted zero-trust security policy. In this example, the method 800 provides a continuous zero-trust optimization process to adaptively adjust and improve the policies and communication rules included therein. This process may also be used to provide a progressive zero-trust approach that uses a progressive implementation that breaks down the zero-trust process into smaller steps, allowing for incremental improvements in security that yield visible results in a shorter period. The progressive enforcement may include enforcement on one or more dimensions, where the different dimensions may have different degrees of restrictiveness. The dimensions may include, but are not limited to: internet/intranet (e.g., allow only limited internet while you evaluate intranet, etc.); inbound/outbound (e.g., allow only outbound or inbound while evaluating the other); ports; paths; users; groups; intra-groups; inter-segment/intra-segment traffic; application-specific traffic; etc. Advantageously, by employing continuous and/or progressive zero-trust optimization, the security posture can more quickly deployed and refined. The result is a more robust and effective security approach that continually looks to refine the security polices (e.g. close open paths and allowing only what is essential for applications to function). This ongoing refinement of communication rules advantageously reduces the attack surface (e.g., the amount of potential vulnerabilities that may be exposed and exploited) and blast radius (e.g., if exploited, the severity and spread of such exploit), thereby improving the overall security posture while maintaining the least privilege access control principle.

Figure 9:
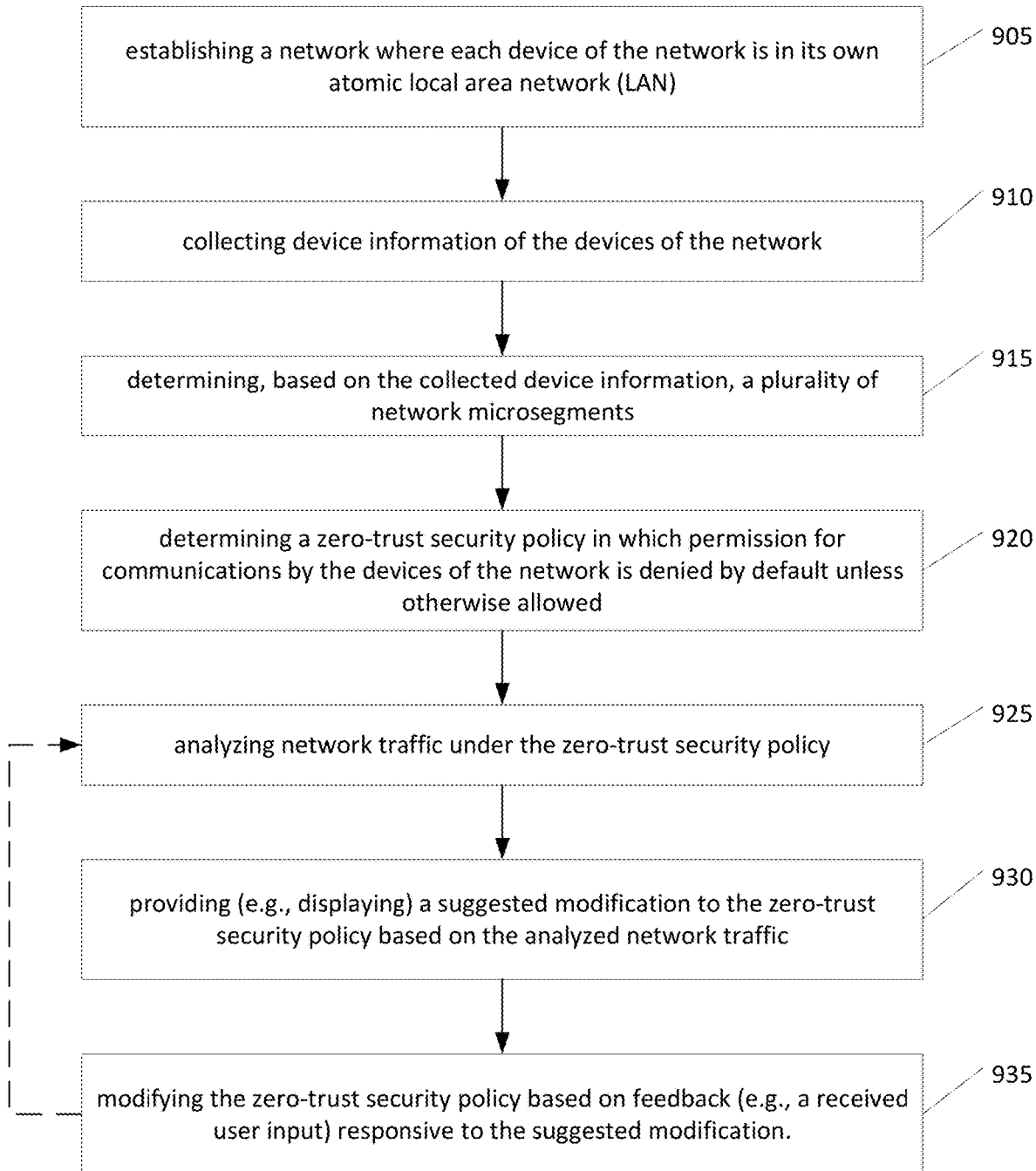
FIG. 9 illustrates a flowchart of a zero-trust network security method according to one or more aspects of the disclosure.

FIG. 9 illustrates a flowchart of a zero-trust method 900 according to one or more aspects of the disclosure. Two or more of the various operations of the method may be performed simultaneously in one or more aspects. Further, the order of the various operations is not limiting, and the operations may be performed in a different order in one or more aspects.

At operation 905, a network is established where each device of the network is in its own network of one (individualized subnet 301). For example, one or more DHCP operations may be performed to change the subnet of IP addresses of the device(s) prior to IP address allocation. The IP addresses may then be allocated to the devices 210 (FIG. 3). In one or more aspects, the zero-trust gatekeeper 300 may be configured to adjust the subnets for the IP addresses (e.g., "/32" subnet or utilize a subnet mask of "255.255.255.255") using the DHCP, and allocate the IP addresses to the various devices 210. The zero-trust gatekeeper 300 may set the gateway attribute of the allocated IP addresses to the IP address of the zero-trust gatekeeper 300.

At operation 910, information associated with the devices of the network is collected. For example, the gatekeeper 300 may analyze the network traffic traversing the gatekeeper 300 as a result of the "network of one" network structure to collect the information. In one or more aspects, the information is determined based on one or more tags associated with a particular device 210.

In one or more aspects, the information may include, for example, device information, such as operating system information, screen resolution information, and/or component manufacture information (e.g., the device serial number, manufacture date, manufacture location, etc.). Additionally, or alternatively, the information may include software information (e.g. installed applications), operating system information, other device hardware and/or software information (e.g., processor information, memory information, storage information, network card information, installed drivers, firmware, BIOS, etc.), network information (e.g., IP address(es), one or more MAC addresses, source addresses, destination addresses, port numbers, etc.), geolocation information of the device 210, user information (e.g., user identification information of users associated with the device), information identifying an intended use of the device (e.g., server, etc.), and/or other identification information. The information may be included in one or more tags associated with the device(s), where the gatekeeper 300 may collect tag information that includes the information. The tag(s) may be associated with the device(s) by the user and/or associated with the device(s) based on one or more attributes. The tag(s) may be associated with the device(s) using one or more predefined templates.

At operation 915, one or more (e.g., a plurality of) microsegments are determined. The microsegment(s) may be determined based on the collected information. For example, the information may be used to identify one or more devices, one or more device types, one or more device attributes, one or more likely or intended uses of the devices, or other properties and/or attributes. Such devices that are determined to be similar or otherwise related may then be included in the same microsegment. In one or more aspects, the information may be used to identify the likely communication paths and/or ports, and/or other communication information for one or more devices, which may then be used to identify relationships that may leveraged in establishing the microsegment(s).

At operation 920, a zero-trust security policy is determined. The zero-trust security policy may be configured such that permission for communications by the devices of the network is denied by default unless otherwise allowed. For example, the policy may limit the network access for a respective device to only what is required for the device and/or user of the device to perform their respective tasks. In one or more aspects, the zero-trust policies may include one or more communication rules, which may be determined using logic and/or heuristics configured to detect patterns that may be suggestive of actionable enforcement principles. The gatekeeper 300 may be configured to identify approved and/or denied connections, create one or more policies, adjust one or more policies, update or adapt one or more policies, and/or remove one or more policies. These operations may be performed automatically by the zero-trust gatekeeper 300. For example, the zero-trust gatekeeper 300, based on the observations of network traffic, may detect an open server port that is listening for communication but the port has no current, recent, and/or historical communication activities. The logic and/or heuristics employed by the zero-trust gatekeeper 300 may then suggest closing the port.

At operation 925, network traffic is analyzed under the zero-trust security policy. For example, the gatekeeper 300 may monitor and analyze the network traffic traversing the gatekeeper 300 as a result of the "network of one" network structure. The network communications may be monitored (e.g., by the zero-trust gatekeeper 300) to collect source addresses, destination addresses, and/or port numbers of network communications; frequency of network communications, including over one or more communication paths and/or ports; whether network traffic is allowed and/or restricted; and/or other network traffic information and/or attributes. The collected information may be used to determine network patterns for devices, users, and/or applications. In one or more aspects, the zero-trust gatekeeper 300, based on the observations of network traffic, may detect network activity and/or the lack of activity for one or more devices, for one or more communication paths, port(s), application(s), or the like.

At operation 930, a recommended or suggested modification of the zero-trust security policy may be provided (e.g., displayed). The recommendation/suggestion may be determined based on the analyzed network traffic. For example, one or more communication policies may be set and/or modified based on feedback (e.g., allow/deny decisions) received by the zero-trust gatekeeper 300 from the user. The zero-trust gatekeeper 300 may be configured to identify approved connections, create one or more policies, adjust one or more policies, update one or more policies, and/or remove one or more policies based on the user feedback. The policies may then be used by the zero-trust gatekeeper 300 to control the communications amongst the various devices 210. In one or more aspects, the zero-trust gatekeeper 300 may determine and provide recommendations 1002 for implementation of one or more policies, which may then be accepted, rejected, or ignored by the user (e.g., system or network administrator). For example, as illustrated in FIG. 10, recommendations 1102 may be determined and provided (e.g., displayed) to the user. The user may then choose to review one or more recommendations 1002 by selecting the review button 1004 on the GUI, which will provide actions that may be taken by the system (e.g. deny or allow a particular communication, etc.).

At operation 935, the zero-trust security policy is modified based on feedback (e.g., a received user input) responsive to the suggested modification. For example, example paths and/or ports may be illustrated in which access may be modified (FIG. 11). The user may then select the modify button 1104 to select an action regarding the selected path(s) and/or port(s).

In one or more aspects, the operations 925, 930, and 935 may be repeated to provide an iterative analysis, recommended modification(s), and modification (based on received feedback) of the zero-trust security policy. For example, after the modification of the policy based on feedback received from the user, the modified/adapted policy may be again analyzed, where the analysis is then used to determine and provide a new suggested/recommended modification at operation 930. In this example, the method 900 provides a continuous zero-trust optimization process to adaptively adjust and improve the policies and communication rules included therein based on the user feedback. This advantageously enhances security by closing unnecessary holes and prioritizing access control measures. The result is a more robust and effective security approach that continually looks to refine the security polices (e.g. close open paths and allowing only what is essential for applications to function). This ongoing refinement of communication rules advantageously reduces the attack surface (e.g., the amount of potential vulnerabilities that may be exposed and exploited) and blast radius (e.g., if exploited, the severity and spread of such exploit), thereby improving the overall security posture while maintaining the least privilege access control principle.

EXAMPLES

The following examples pertain to various aspects of the present disclosure.

Example 1 relates to a zero-trust microsegmentation method comprising: establishing a network where each device of the network is in its own network of one with a gatekeeper being a default gateway for the devices; collecting, using the gatekeeper, information associated with the devices of the network; determining, based on the collected information, a plurality of network microsegments; determining a zero-trust security policy in which permission for communications by the devices of the network is denied by default unless otherwise allowed; selectively allowing communications, based on received feedback, between two of the plurality of network microsegments; and denying communications over all remaining communication paths between microsegments.

Example 2 is the method of Example 1, further comprising, iteratively: determining network traffic patterns; and adapting the selectively allowed communications and the denied communications based on the determined network traffic patterns.

Example 3 is the method of Example 2, wherein determining the network traffic patterns comprises analyzing firewall logs to analyze allowed and/or denied communications.

Example 4 is the method of any of Examples 1-3, wherein determining the zero-trust security policy comprises: allowing communications as previously permitted; determining, by the gatekeeper, network traffic patterns based on analysis of communications traversing the gatekeeper; provide the determined traffic patterns to a user; and selectively allow or deny one or more communications between the two of the plurality of network microsegments based on the received feedback from the user.

Example 5 is the method of any of Examples 1-4, further comprising analyzing communications traversing the gatekeeper using heuristics to determine the plurality of network microsegments and/or the zero-trust security policy.

Example 6 is the method of any of Examples 1-5, further comprising analyzing communications traversing the gatekeeper using a machine learning (ML) algorithm to determine the plurality of network microsegments and/or the zero-trust security policy.

Example 7 is the method of any of Examples 1-6, wherein selectively allowing communications between the two of the plurality of network microsegments comprises allowing communication on a selected communication path and/or port.

Example 8 is the method of any of Examples 1-7, wherein selectively allowing communications between the two of the plurality of network microsegments comprises providing a communication template that includes one or more predefined allowed communication paths and/or ports.

Example 9 is the method of any of Examples 1-8, further comprising continually observing denied network traffic and providing a notification of the denied network traffic to a user, wherein the received feedback is received in response to the generated notification.

Example 10 is the method of Example 9, wherein observing the denied network traffic comprises analyzing firewall logs to determine the denied network traffic.

Example 11 is the method of any of Examples 1-10, further comprising: analyzing the selectively allowed communications; determining recommendations for one or more additional network control actions based on the analysis of the selectively allowed communications; and adapting the selectively allowed communications based on received feedback responsive to the determined recommendations.

Example 12 is the method of Example 11, further comprising displaying the determined recommendations to the user, wherein the received feedback includes an input from the user.

Example 13 is the method of any of Examples 11-12, wherein the selectively allowed communications are analyzed using heuristics to determine the recommendations.

Example 14 is the method of any of Examples 11-13, wherein the selectively allowed communications are analyzed using a machine learning (ML) algorithm to determine the recommendations.

Example 15 is the method of Example 14, wherein the selectively allowed communications are automatically adapted based on the one or more received inputs which are generated by the ML algorithm based on the determined recommendations.

Example 16 is the method of any of Examples 11-15, wherein the one or more received inputs are automatically generated based on the determined recommendations so as to automatically adapt the selectively allowed communications.

Example 17 is the method of any of Examples 1-16, wherein the networks of one are configured to cause all device traffic to traverse the gatekeeper.

Example 18 is the method of any of Examples 1-17, wherein establishing the network comprises implementing a subnet mask of 255.255.255.255 to establish the respective network of one for each of the devices of the network, the networks of one causing all device traffic to traverse the gatekeeper.

Example 19 is the method of any of Examples 1-18, wherein establishing the network comprises implementing a subnet mask /32 to establish the respective network of one for each of the devices of the network, the atomic LANs causing all device traffic to traverse the gatekeeper.

Example 20 is the method of any of Examples 1-19, wherein establishing the network comprises using a software-defined firewalled network to establish the respective network of one for each of the devices to cause all device traffic to traverse the gatekeeper.

Example 21 is the method of any of Examples 1-20, wherein the information comprises: device information of one or more of the devices; network information; geolocation information of one or more of the devices; and/or user information of one or more users associated with one or more of the devices.

Example 22 is the method of any of Examples 1-21, wherein the devices of the network are free of local zero-trust agents configured to provide zero-trust least-privilege micro-segmentation.

Example 23 is the method of any of Examples 1-22, wherein the respective networks of one are formed by configuring each of the network devices in a respective virtual LAN (VLAN).

Example 24 is a computer-readable storage medium with an executable program stored thereon, that when executed, instructs a processor to perform the method of any of Examples 1-23.

Example 25 is an apparatus comprising: a processor; and a memory for storing computer readable instructions that, when executed by the processor, cause the apparatus to perform the method of any of Examples 1-23.

Example 26 is an apparatus comprising: a processor; and a memory for storing computer readable instructions that, when executed by the processor, cause the apparatus to: establish a network where each device of the network is in its own network of one; determine a plurality of network microsegments based on information associated with the devices of the network collected by a gatekeeper deployed in the established network; determine a zero-trust security policy in which permission for communications by the devices of the network is denied by default unless otherwise allowed; selectively allow communications, based on received feedback, between two of the plurality of network microsegments; and deny communications over all remaining communication paths between microsegments.

Example 27 is the apparatus of Example 26, wherein, to determining the zero-trust security policy comprises: allowing communications as previously permitted; determining network traffic patterns based on analysis of communications traversing the gatekeeper; provide the determined traffic patterns to a user; and selectively allow or deny one or more communications between the two of the plurality of network microsegments based on the received feedback from the user.

Example 28 is the apparatus of any of Examples 26-27, wherein the networks or one of the respective devices are established using subnet masking that causes all device traffic to traverse the gatekeeper.

Example 29 is the apparatus of any of Examples 26-28, wherein the instructions, when executed, cause the apparatus to control the gatekeeper to collect the information associated with the devices of the network.

Example 30 is a network gatekeeper comprising: a processor; and a memory for storing computer readable instructions that, when executed by the processor, cause the gatekeeper to: establish a network where each device of the network is in its own network of one, the gatekeeper being a default gateway for the devices, wherein the established network is configured to cause all device traffic to traverse the gatekeeper; collect information associated with the devices of the network; determine, based on the collected information, a plurality of network microsegments; determine a zero-trust security policy in which permission for communications by the devices of the network is denied by default unless otherwise allowed; selectively allow communications, based on received feedback, between two of the plurality of network microsegments; and deny communications over all remaining communication paths between microsegments.

Example 31 is a zero-trust micro-segmentation method comprising: establishing a network where each device of the network is in its own network of one; collecting information associated with the devices of the network; determining, based on the collected information, a plurality of network microsegments; determining an initial zero-trust security policy in which permission for communications by the devices of the network is denied by default unless otherwise allowed; analyzing network traffic under the initial zero-trust security policy; and adapting the initial zero-trust security policy, based on the analysis of the network traffic, to generate an adapted zero-trust security policy including one or more modifications to communication permissions.

Example 32 is the method of Example 31, further comprising: analyzing network traffic under the adapted zero-trust security policy; and adapting the adapted zero-trust security policy, based the analysis of the network traffic under the adapted zero-trust security policy, to generate a further adapted zero-trust security policy including one or more modifications to the communication permissions; and implementing the further adapted zero-trust security policy.

Example 33 is the method of Example 32, further comprising iteratively performing: the analyzing network traffic under the adapted zero-trust security policy, the adapting the adapted zero-trust security policy, and the implementing the further adapted zero-trust security policy.

Example 34 is the method of any of Examples 31-33, wherein adapting the initial zero-trust security policy comprises progressively increasing a restrictiveness of the initial zero-trust security policy to generate the adapted zero-trust security policy, wherein between each progressive increase in restrictiveness, an incremental zero-trust security policy is implemented for a current progression, network traffic under the incremental zero-trust security policy is analyzed, and a next progression with increased restrictiveness is based on the analysis of the network traffic under the incremental zero-trust security policy.

Example 35 is the method of any of Examples 31-34, wherein the one or more modifications to communication permissions comprise: opening and/or closing one or more ports, and/or opening and/or closing one or more communication paths.

Example 36 is the method of any of Examples 31-35, wherein adapting the initial zero-trust security policy comprises adjusting a degree of enforcement of the permission for communications.

Example 37 is the method of Example 36, wherein adjusting the degree of enforcement of the permission for communications comprises adjusting enforcement of different dimensions of communication.

Example 38 is the method of Example 37, wherein the dimensions include: intranet traffic with respect to internet traffic; inbound traffic with respect to outbound traffic; inter-segment traffic with respect to intra-segment traffic; restrictiveness based on ports; restrictiveness based on communication paths; restrictiveness based on users; restrictiveness based on groups of users restrictiveness based on inter-group traffic; restrictiveness on intra-group traffic; and/or application-specific traffic.

Example 39 is the method of any of Examples 31-38, wherein determining the initial zero-trust security policy comprises: allowing communications as previously permitted; determining the plurality of network microsegments and the zero-trust security policy based on analysis of communications traversing a gatekeeper deployed in the network; providing the determined plurality of network microsegments and the zero-trust security policy to a user; and selectively allowing or denying one or more communications between the two of the plurality of network microsegments based on received feedback from the user.

Example 40 is the method of Example 39, wherein the communications traversing the gatekeeper are analyzed using heuristics to determine the plurality of network microsegments and the zero-trust security policy.

Example 41 is the method of any of Examples 39-40, wherein the plurality of network microsegments and the zero-trust security policy are determined by analyzing, using a machine learning (ML) algorithm, the communications traversing the gatekeeper.

Example 42 is the method of any of Examples 31-41, further comprising continually observing denied network traffic and providing a notification of the denied network traffic to the user, wherein the received feedback is received in response to the notification.

Example 43 is the method of Example 42, wherein observing the denied network traffic comprises analyzing firewall logs to determine the plurality of network microsegments and the zero-trust security policy.

Example 44 is the method of any of Examples 31-43, wherein the networks of one are configured to cause all device traffic to traverse a gatekeeper deployed in the network and configured as a default gateway of the devices.

Example 45 is the method of any of Examples 31-44, wherein establishing the network comprises implementing a subnet mask of 255.255.255.255 to establish the respective network of one for each of the devices of the network, the networks of one causing all device traffic to traverse a gatekeeper deployed in the network.

Example 46 is the method of any of Examples 31-45, wherein establishing the network comprises implementing a subnet mask /32 to establish the respective network of one for each of the devices of the network, the networks of one causing all device traffic to traverse a gatekeeper deployed in the network.

Example 47 is the method of any of Examples 31-46, wherein establishing the network comprises using a software-defined firewalled network to establish the respective network of one for each of the devices to cause all device traffic to traverse a gatekeeper deployed in the network.

Example 48 is the method of any of Examples 31-47, wherein the respective networks of one are formed by configuring each of the network devices in a respective virtual LAN (VLAN).

Example 49 is the method of any of Examples 31-48, wherein the devices of the network are free of local zero-trust agents configured to provide zero-trust least-privilege micro-segmentation.

Example 50 is the method of any of Examples 31-49, wherein the information associated with the devices of the network is collected using a gatekeeper deployed in the network and configured as a default gateway for the devices of the network, the networks of one causing all device traffic to traverse the gatekeeper.

Example 51 is an apparatus comprising: a processor; and a memory for storing computer readable instructions that, when executed by the processor, cause the apparatus to perform the method of any of Examples 31-50.

Example 52 is a computer-readable storage medium with an executable program stored thereon, that when executed, instructs a processor to perform the method of any of Examples 31-50.

Example 53 is an apparatus comprising: a processor; and a memory for storing computer readable instructions that, when executed by the processor, cause the apparatus to: establish a network where each device of the network is in its own network of one; determine a plurality of network microsegments based on collected information associated with the devices of the network; determine an initial zero-trust security policy in which permission for communications by the devices of the network is denied by default unless otherwise allowed; analyze network traffic under the initial zero-trust security policy; and adapt the initial zero-trust security policy, based on the analysis of the network traffic, to generate an adapted zero-trust security policy including one or more modifications to communication permissions.

Example 54 is the apparatus of Example 53, wherein the instructions, when executed, cause the apparatus to: analyze network traffic under the adapted zero-trust security policy; and adapt the adapted zero-trust security policy, based the analysis of the network traffic under the adapted zero-trust security policy, to generate a further adapted zero-trust security policy including one or more modifications to the communication permissions; and implement the further adapted zero-trust security policy.

Example 55 is the apparatus of Example 54, wherein the instructions, when executed, cause the apparatus to iteratively perform: the analyzing network traffic under the adapted zero-trust security policy, the adapting the adapted zero-trust security policy, and the implementing the further adapted zero-trust security policy.

Example 56 is the apparatus of any of Examples 53-55, wherein adapting the initial zero-trust security policy comprises progressively increasing a restrictiveness of the initial zero-trust security policy to generate the adapted zero-trust security policy, wherein between each progressive increase in restrictiveness, an incremental zero-trust security policy is implemented for a current progression, network traffic under the incremental zero-trust security policy is analyzed, and a next progression with increased restrictiveness is based on the analysis of the network traffic under the incremental zero-trust security policy.

Example 57 is a network gatekeeper comprising: a processor; and a memory for storing computer readable instructions that, when executed by the processor, cause the gatekeeper to: establish a network where each device of the network is in its own network of one; collect information associated with the devices of the network; determine, based on the collected information, a plurality of network microsegments; determine an initial zero-trust security policy in which permission for communications by the devices of the network is denied by default unless otherwise allowed; analyze network traffic under the initial zero-trust security policy; and adapt the initial zero-trust security policy, based on the analysis of the network traffic, to generate an adapted zero-trust security policy including one or more modifications to communication permissions.

Example 58 is a zero-trust micro-segmentation method comprising: establishing a network where each device of the network is in its own network of one; collecting information associated with the devices of the network; determining, based on the collected information, a plurality of network microsegments; determining a zero-trust security policy in which permission for communications by the devices of the network is denied by default unless otherwise allowed; analyzing network traffic under the zero-trust security policy; providing a suggested modification to the zero-trust security policy based on the analyzed network traffic; and modifying the zero-trust security policy based on feedback responsive to the suggested modification.

Example 59 is the method of Example 58, further comprising iteratively performing: the analyzing network traffic, providing the suggested modification, and modifying the zero-trust security policy.

Example 60 is the method of any of Examples 58-59, wherein providing the suggested modification to the zero-trust security policy comprises displaying a suggestion to modify the zero-trust security policy to a user.

Example 61 is the method of Example 60, wherein the suggestion is displayed on a graphical user interface (GUI) and the feedback is submitted using the GUI.

Example 62 is the method of any of Examples 60-61, wherein the feedback comprises acceptance or rejection of the suggestion to modify the zero-trust security policy by the user.

Example 63 is the method of any of Examples 58-62, wherein the suggested modification to the zero-trust security policy comprises a suggestion to allow or deny communication on a communication path and/or port.

Example 64 is the method of any of Examples 58-62, wherein the zero-trust security policy is determined at least partially based on a communication template that includes one or more predefined allowed communication paths and/or ports, and/or one or more predefined denied communication paths and/or ports.

Example 65 is the method of any of Examples 58-64, wherein analyzing the network traffic comprises analyzing firewall logs to analyze allowed and/or denied communications.

Example 66 is the method of any of Examples 58-65, wherein determining the zero-trust security policy comprises: allowing communications as previously permitted; determining, by a gatekeeper, network traffic patterns based on analysis of communications traversing the gatekeeper; and provide the determined traffic patterns to a user; and selectively allow or deny one or more communications between the two of the plurality of network microsegments based on received feedback from the user.

Example 67 is the method of Example 66, wherein the communications traversing the gatekeeper are analyzed using heuristics to determine the network traffic patterns.

Example 68 is the method of any of Examples 58-67, wherein the network traffic is analyzed by a gatekeeper enforcing the zero-trust security policy.

Example 69 is the method of any of Examples 58-68, wherein the respective networks of one cause all traffic of the network to traverse a gatekeeper, and wherein the information is collected by the gatekeeper based on the traffic traversing the gatekeeper.

Example 70 is the method of any of Examples 58-69, wherein the establishment of the respective networks of one causes all traffic of the network to traverse a gatekeeper, the network traffic governed by the zero-trust security policy being analyzed by the gatekeeper, and the suggested modification being provided by the gatekeeper.

Example 71 is the method of any of Examples 58-70, wherein the network traffic under the zero-trust security policy is analyzed using heuristics to provide the suggested modification to the zero-trust security policy based on the analyzed network traffic.

Example 72 is the method of any of Examples 58-71, wherein the networks of one are configured to cause all device traffic to traverse a gatekeeper configured as a default gateway for the devices.

Example 73 is the method of any of Examples 58-72, wherein establishing the network comprises implementing a subnet mask of 255.255.255.255 to establish the respective network of one for each of the devices of the network, the networks of one causing all device traffic to traverse a gatekeeper.

Example 74 is the method of any of Examples 58-73, wherein establishing the network comprises implementing a subnet mask /32 to establish the respective network of one for each of the devices of the network, the networks of one causing all device traffic to traverse a gatekeeper.

Example 75 is the method of any of Examples 58-74, wherein establishing the network comprises using a software-defined firewalled network to establish the respective network of one for each of the devices to cause all device traffic to traverse a gatekeeper.

Example 76 is the method of any of Examples 58-75, wherein the respective networks of one are formed by configuring each of the network devices in a respective virtual LAN (VLAN).

Example 77 is the method of any of Examples 58-76, wherein the devices of the network are free of local zero-trust agents configured to provide zero-trust least-privilege network management.

Example 78 is an apparatus comprising: a processor; and a memory for storing computer readable instructions that, when executed by the processor, cause the apparatus to perform the method of any of Examples 58-77.

Example 79 is a computer-readable storage medium with an executable program stored thereon, that when executed, instructs a processor to perform the method of any of Examples 58-77.

Example 80 is an apparatus comprising: a processor; and a memory for storing computer readable instructions that, when executed by the processor, cause the apparatus to: establish a network where each device of the network is in its own network of one; determine a plurality of network microsegments based on collected information associated with the devices of the network; determine a zero-trust security policy in which permission for communications by the devices of the network is denied by default unless otherwise allowed; analyze network traffic under the zero-trust security policy; provide a suggested modification to the zero-trust security policy based on the analyzed network traffic; and modify the zero-trust security policy based on feedback responsive to the suggested modification.

Example 81 is the apparatus of Example 80, wherein the instructions, when executed, cause the apparatus to iteratively perform: the analyzing network traffic, providing the suggested modification, and modifying the zero-trust security policy.

Example 82 is the apparatus of any of Examples 80-81, wherein providing the suggested modification to the zero-trust security policy comprises displaying a suggestion to modify the zero-trust security policy to a user.

Example 83 is the apparatus of any of Examples 80-82, wherein the suggestion is displayed on a graphical user interface (GUI) and the feedback is submitted using the GUI.

Example 84 is a network gatekeeper comprising: a processor; and a memory for storing computer readable instructions that, when executed by the processor, cause the gatekeeper to: establish a network where each device of the network is in its own network of one; collect information associated with the devices of the network; determine, based on the collected information, a plurality of network microsegments; determine a zero-trust security policy in which permission for communications by the devices of the network is denied by default unless otherwise allowed; analyze network traffic under the zero-trust security policy; provide a suggested modification to the zero-trust security policy based on the analyzed network traffic; and modify the zero-trust security policy based on feedback responsive to the suggested modification.

Example 85 is a non-transitory computer-readable storage medium with an executable program stored thereon, that when executed, instructs a processor to perform a method as shown and described.

Example 86 is an apparatus as shown and described.

Example 87 a method as shown and described.

Although the subject matter has been described in language specific to structural features and/or methodological acts, it is to be understood that the subject matter defined in the appended claims is not necessarily limited to the specific features or acts described above. Rather, the specific features and acts described above are disclosed as illustrative forms of implementing the claims.

The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

We claim:

1. A zero-trust microsegmentation method comprising:
   determining, based on information associated with devices of a network, a zero-trust security policy in which communication permissions for the devices of the network are denied by default unless otherwise allowed, each device of the network being a respective network-of-one causing all device traffic to traverse a gatekeeper configured as a default gateway for the devices; and
   iteratively performing:

analyzing network traffic under the zero-trust security policy;

adapting the zero-trust security policy, based on the analysis of the network traffic, to adjust the communication permissions by modifying a communication dimension to provide the zero-trust security policy including one or more modifications to the communication permissions; and implementing the zero-trust security policy including the one or more modifications to the communication permissions.

2. The method of claim 1, wherein, the one or more communication dimensions includes an internet-intranet dimension defining a restrictiveness distinction between internet traffic and intranet traffic.

3. The method of claim 1, wherein, the one or more communication dimensions includes an input-output dimension defining a restrictiveness distinction between input traffic and output traffic.

4. The method of claim 1, wherein, the one or more communication dimensions includes a segment dimension defining a restrictiveness distinction between inter-segment traffic and intra-segment traffic.

5. The method of claim 1, wherein, the one or more communication dimensions includes a port dimension defining a port-based traffic restrictiveness distinction.

6. The method of claim 1, wherein, the one or more communication dimensions includes a path dimension defining a communication path-based traffic restrictiveness distinction.

7. The method of claim 1, wherein, the one or more communication dimensions includes a user dimension defining a user-based traffic restrictiveness distinction and/or a user group-based traffic restrictiveness distinction.

8. The method of claim 1, wherein, the one or more communication dimensions includes: an inter-group dimension defining an inter-group traffic restrictiveness distinction, and/or an intra-group dimension defining an intra-group traffic restrictiveness distinction.

9. The method of claim 1, wherein, the one or more communication dimensions includes an application dimension defining an application-based traffic restrictiveness distinction.

10. The method of claim 1, wherein adapting the zero-trust security policy comprises progressively increasing a restrictiveness of one or more of the communication permissions for the zero-trust security policy to provide the zero-trust security policy including the one or more modifications to the communication permissions.

11. The method of claim 1, wherein adapting the zero-trust security policy comprises adjusting a degree of enforcement of the communication permissions.

12. The method of claim 1, further comprising continually observing denied network traffic and providing a notification of the denied network traffic to a user, wherein feedback is receivable in response to the notification.

13. The method of claim 1, wherein one or more of the devices of the network comprise a respective local zero-trust agent configured to provide zero-trust least-privilege network management.

14. The method of claim 2, wherein the internet traffic is subject to more restrictions than intranet traffic.

15. An apparatus comprising:
one or more processors; and
a memory for storing computer readable instructions that, when executed by the one or more processors, cause the apparatus to:
determine, based on information associated with devices of a network, a zero-trust security policy in which communication permissions for the devices of the network are denied by default unless otherwise allowed, each device of the network being a respective network-of-one configured to cause all device traffic to traverse a gatekeeper configured as a default gateway for the devices; and
iteratively:
analyze network traffic under the zero-trust security policy; and
adapt the zero-trust security policy, based on the analysis of the network traffic, to adjust the communication permissions by modifying a communication dimension to provide the zero-trust security policy including one or more modifications to the communication permissions, wherein the gatekeeper is configured to apply the zero-trust security policy to the device traffic traversing the gatekeeper.

16. The method of claim 1, further comprising determining, based on the information associated with one or more devices of the network, a plurality of network microsegments, wherein one or more of the plurality of network microsegments comprises at least one of the devices within the respective network-of-one.

17. The method of claim 1, further comprising analyzing, by the gatekeeper, the device traffic traversing the gatekeeper to determine the information associated with the devices.

18. The method of claim 1, further comprising applying, by the gatekeeper, the zero-trust security policy to the device traffic traversing the gatekeeper.

19. The method of claim 1, wherein establishing each device as a respective network-of-one comprises: assigning an individualized subnet to each device, wherein the individualized subnets cause all of the device traffic to traverse the gatekeeper.

20. The method of claim 19, wherein assigning the individualized subnet comprises assigning a /32 subnet or a 255.255.255.255 subnet mask to each device.

* * * * *